(12) United States Patent
Kobayashi et al.

(10) Patent No.: US 9,025,123 B2
(45) Date of Patent: May 5, 2015

(54) LIQUID CRYSTAL DISPLAY DEVICE

(71) Applicant: Sony Corporation, Tokyo (JP)

(72) Inventors: Chikashi Kobayashi, Kanagawa (JP);
Shunichi Suwa, Kanagawa (JP);
Masashi Miyakawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 41 days.

(21) Appl. No.: 14/051,585

(22) Filed: Oct. 11, 2013

(65) Prior Publication Data

US 2014/0111753 A1    Apr. 24, 2014

(30) Foreign Application Priority Data

Oct. 18, 2012    (JP) ................. 2012-230659

(51) Int. Cl.
*G02F 1/1343*    (2006.01)
*G02F 1/1337*    (2006.01)

(52) U.S. Cl.
CPC .... *G02F 1/133753* (2013.01); *G02F 1/133707* (2013.01); *G02F 2001/133742* (2013.01); *G02F 2001/133757* (2013.01); *G02F 2001/133776* (2013.01)

(58) Field of Classification Search
CPC ............ G02F 1/1337; G02F 1/133711; G02F 1/134363; G02F 1/133788; G02F 1/133753; G02F 1/133734; G02F 2001/133742; G02F 1/134336; G02F 1/1393; G02F 1/133707

USPC .................. 349/146, 123, 124, 125
See application file for complete search history.

(56) References Cited

U.S. PATENT DOCUMENTS 5,859,678 A * 1/1999 Fujikawa et al. ............... 349/52
2001/0019391 A1* 9/2001 Kim et al. .................... 349/139

FOREIGN PATENT DOCUMENTS

| JP | Hei 05-232473 A | 9/1993 | |
|---|---|---|---|
| JP | 2002-357830 A | 12/2002 | |
| JP | 2011-232736 A | 11/2011 | |
| JP | 2011232736 A * | 11/2011 | ............ G02F 1/1337 |

* cited by examiner

*Primary Examiner* — Mike Qi
(74) *Attorney, Agent, or Firm* — Wolf, Greenfield & Sacks, P.C.

(57) ABSTRACT

A liquid crystal display device includes a plurality of pixels arranged in a matrix, each pixel having: first and second substrates; a first electrode formed on an opposing face of the first substrate opposing the second substrate; a first alignment film covering the first electrode and the opposing face of the first substrate; a second electrode formed on the opposing face of the second substrate opposing the first substrate; a second alignment film covering the second electrode and the opposing face of the second substrate, and a liquid crystal layer which is provided between the first alignment film and the second alignment film and includes liquid crystal molecules, where a pretilt is imparted on the liquid crystal molecules, a plurality of uneven portions is formed on the first electrode, and a width of a portion of the convex portions provided on the first electrode becomes narrower toward the tip portion.

9 Claims, 40 Drawing Sheets

LIQUID CRYSTAL DISPLAY DEVICE

CROSS REFERENCE TO RELATED APPLICATIONS

This application claims the benefit of priority under 35 U.S.C. §119 from Japanese Priority Patent Application JP 2012-230659 filed Oct. 18, 2012, the entire contents of which are incorporated herein by reference.

BACKGROUND

The present disclosure relates to a liquid crystal display device including a liquid crystal display element in which a liquid crystal layer is sealed between a pair of substrates having alignment films on the opposing faces thereof.

SUMMARY

In recent years, liquid crystal displays (LCD; Liquid Crystal Display) are often used as display monitors of liquid crystal television receivers, notebook personal computers, car navigation devices or the like. These liquid crystal displays are classified into various display modes (methods) by the molecular arrangement (alignment) of liquid crystal molecules included in the liquid crystal layer interposed between the substrates. As the display mode, for example, a TN (Twisted Nematic) mode in which liquid crystal molecules are twisted and aligned in a state in which no voltage is applied is well known. In the TN mode, liquid crystal molecules have positive dielectric anisotropy, that is, characteristics of the dielectric constant in the long-axis direction of the liquid crystal molecules being greater than in the short-axis direction. Therefore, in a parallel face with respect to the substrate face, the liquid crystal molecules attain a structure arranged in rows in a direction perpendicular to the substrate face while being sequentially rotated in the alignment direction of the liquid crystal molecules.

On the other hand, attention has increased with respect to a VA (Vertical Alignment) mode in which liquid crystal molecules are aligned perpendicularly with respect to the substrate face in a state in which a voltage is not applied. In the VA mode, the liquid crystal molecules have negative dielectric anisotropy, that is, characteristics of the dielectric constant in the long-axis direction of the liquid crystal molecules being shorter than in the short-axis direction, and it is possible to realize a wider viewing able compared to the TN mode.

In such a VA mode liquid crystal display, when a voltage is applied, the liquid crystal molecules aligned in the perpendicular direction with respect to the substrate attain a configuration in which light is transmitted by responding such that the liquid crystal molecules fall in the parallel direction with respect to the substrate due to negative dielectric anisotropy. However, because the direction in which the liquid crystal molecules aligned in the perpendicular direction with respect to the substrate fall is arbitrary, the alignment of the liquid crystal molecules is disturbed by the application of the voltage, and accordingly, becomes a factor in the deterioration in response characteristics with respect to the voltage.

Here, as a method of regulating the alignment of the liquid crystal molecules during voltage application, various proposals have been made thus far. For example, methods using an MVA (Multi-domain Vertical Alignment) method, a PVA (Patterned Vertical Alignment) method or an optical alignment film have been proposed (for example, refer to Japanese Unexamined Patent Application Publication No. 5-232473). In the MVA method, a large viewing angle is realized while performing alignment control by using a slit or a rib (projection). Recently, in addition thereto, a structure (also referred to as a fine slit structure) as a so-called solid electrode in which a plurality of fine slits is provided on an electrode (specifically, a pixel electrode) formed on one substrate, and no slits are provided on an electrode formed on the other substrate (specifically, a counter electrode) has been proposed (for example, refer to Japanese Unexamined Patent Application Publication No. 2002-357830). However, in the fine slit structure, since parts in which an electric field is not applied are present in the slit formed of fine lines and spaces, and furthermore, the liquid crystal molecules in an aligned state have a twisted structure during voltage application in the vicinity of the edge of a line, there is a problem in that the light transmissivity deteriorates.

A technology for resolving such a problem, that is, a technology forming uneven portions instead of providing a plurality of fine slits on the pixel electrode, has been proposed in Japanese Unexamined Patent Application Publication No. 2011-232736.

The technology proposed in Japanese Unexamined Patent Application Publication No. 2011-232736 is able to effectively suppress the occurrence of the above-described problem in the fine slit structure; however, there is demand to further reduce the occurrence of dark lines, that is, strong demand with respect to realizing high light transmissivity with improved uniformity.

Accordingly, it is desirable to provide a liquid crystal display device able to realize high light transmissivity with improved uniformity.

According to an embodiment of the present disclosure, there is provided a liquid crystal display device including a plurality of pixels arranged in a matrix, each pixel having: a first substrate and a second substrate; a first electrode formed on an opposing face of the first substrate opposing the second substrate; a first alignment film covering the first electrode and an opposing face of the first substrate; a second electrode formed on the opposing face of the second substrate opposing the first substrate; a second alignment film covering the second electrode and the opposing face of the second substrate; and a liquid crystal layer which is provided between the first alignment film and the second alignment film and includes liquid crystal molecules, in which a pretilt is imparted on the liquid crystal molecules, a plurality of uneven portions is formed on the first electrode, and a width of a portion of a convex portion provided on the first electrode becomes narrower toward the tip portion.

In the liquid crystal display device of the present disclosure, a plurality of uneven portions is formed on the first electrode, and the width of a portion of a convex portion provided on the first electrode becomes narrower towards the tip portion. Thereby, it is possible to further decrease the occurrence of dark lines. That is, it is possible to realize high light transmissivity with improved uniformity, and suppress the occurrence of dark lines.

DETAILED DESCRIPTION OF EMBODIMENTS

Figure 1:
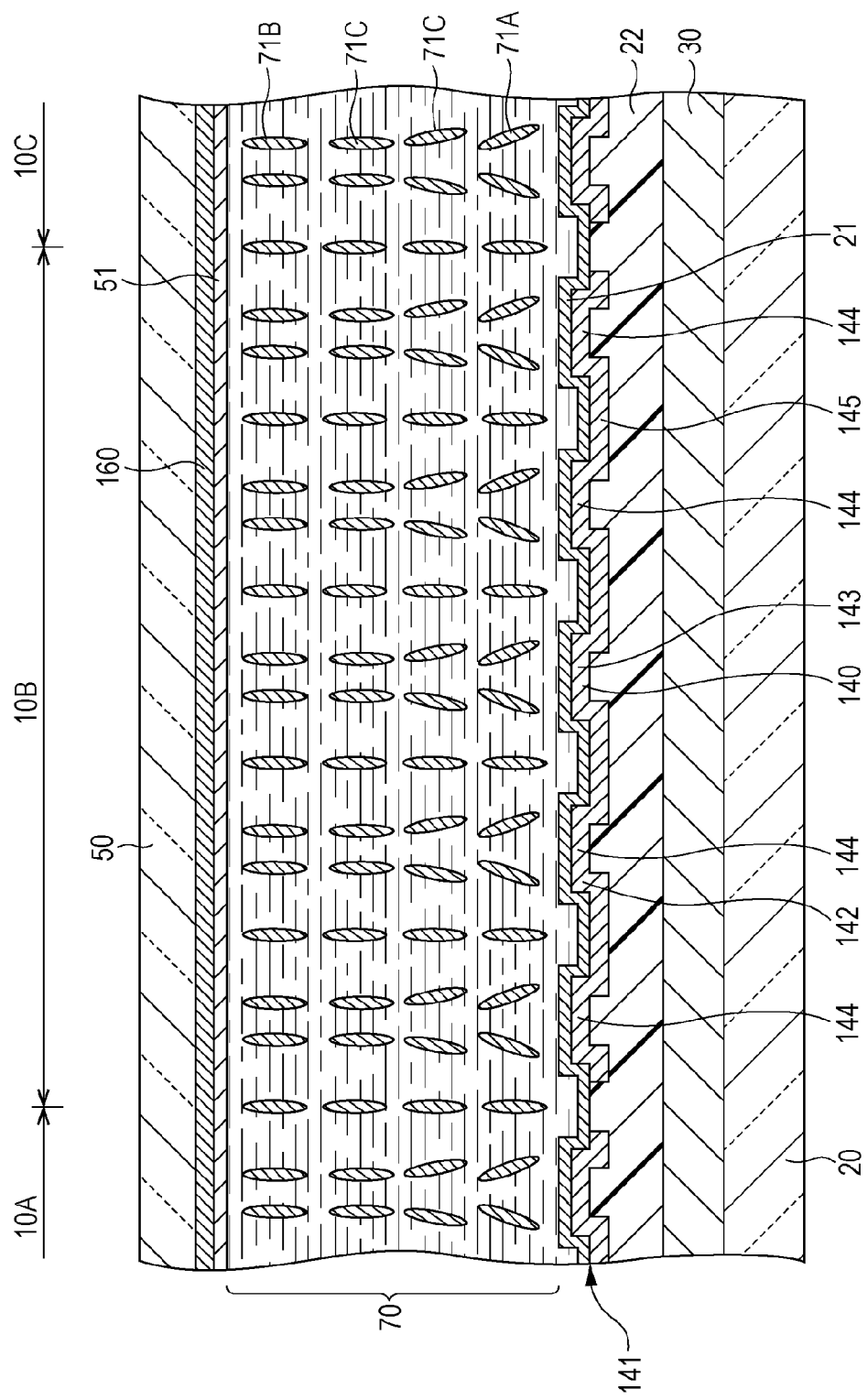
FIG. 1 is a schematic partial end face view of a liquid crystal display device of Embodiment 1.

Below, the present disclosure will be described based on the embodiments with reference to the diagrams; however, the present disclosure is not limited to the embodiments, and various numerical values or materials are given as examples in the Embodiments. Further, the description will be performed in the following order.

1. Description relating to the overall liquid crystal display device of the present disclosure
2. Embodiment 1 (Liquid crystal display device of the present disclosure, liquid crystal display device according to a first configuration of the present disclosure)
3. Embodiment 2 (Modification of Embodiment 1)
4. Embodiment 3 (Separate modification of Embodiment 1, liquid crystal display device according to second configuration of the present disclosure)
5. Embodiment 4 (Modification of Embodiment 3)
6. Embodiment 5 (Separate modification of Embodiment 1, liquid crystal display device according to configuration 3-A of the present disclosure)
7. Embodiment 6 (Modification of Embodiment 5)
8. Embodiment 7 (separate modification of Embodiment 5)
9. Embodiment 8 (Separate modification of Embodiment 5, liquid crystal display device according to configuration 3-B of the present disclosure)
10. Embodiment 9 (Modification of Embodiment 8)
11. Embodiment 10 (Modification of Embodiment 9)
12. Embodiment 11 (Modification of Embodiments 1 to 2, and Embodiments 5 to 7, liquid crystal display device according to configuration 4-A of the present disclosure)
13. Embodiment 12 (Modification of Embodiments 3 to 4 and Embodiments 8 to 10, liquid crystal display device according to configuration 4-B of the present disclosure), Others Description Relating to the Overall Liquid Crystal Display Device of the Present Disclosure A liquid crystal display device of the present disclosure may include uneven portions configured from trunk convex portions extending through the central portion of the pixel in a cross-shape; and a plurality of branch convex portions extending from the trunk convex portion toward the pixel peripheral portion, in which the plurality of branch convex portions corresponds to one portion of convex portions provided on the first electrode, and the width of the branch convex portions is the widest at the part of the branch convex portion joining the trunk convex portion and becomes narrower from the part joining the trunk convex portion toward the tip portion. Such a form is referred to as "a liquid crystal display device according to a first configuration of the present disclosure", as a matter of convenience. In addition, two opposing sides of the branch convex portion from the part joining the trunk convex portion up to the tip portion are referred to as "lateral edges", as a matter of convenience.

The liquid crystal display device according to a first configuration of the present disclosure may employ a form in which, when an (X, Y) coordinate system in which trunk convex portions extending in a cross-shape are respectively set as the X-axis and the Y-axis is assumed, a plurality of branch convex portions occupying the first quadrant extends in parallel in a direction in which the value of the Y-coordinate increases when the value of the X-coordinate is increased, a plurality of branch convex portions occupying the second quadrant extends in parallel in a direction in which the value of the Y-coordinate increases when the value of the X-coordinate is decreased, a plurality of branch convex portions occupying the third quadrant extends in parallel in a direction in which the value of the Y-coordinate decreases when the value of the X-coordinate is decreased, and a plurality of branch convex portions occupying the fourth quadrant extends in parallel in a direction in which the value of the Y-coordinate decreases when the value of the X-coordinate is increased. The same applies to a liquid crystal display device according to a configuration 3-A of the present disclosure and a liquid crystal display device according to a configuration 4-A of the present disclosure described later. Such an arrangement state of the branch convex portions is called a multi-domain electrode structure, and, it is possible to achieve improved viewing angle characteristics because regions in which the directions in which the branch convex portions extend are different are formed in one pixel.

Moreover, it is preferable that the plurality of branch convex portions occupying the first quadrant be extended by the axial lines thereof forming a 45° angle with the X-axis, the plurality of branch convex portions occupying the second quadrant be extended by the axis lines thereof forming a 135° angle with the X-axis, the plurality of branch convex portions occupying the third quadrant be extended by the axial lines thereof forming a 225° angle with the X-axis, and the plurality of branch convex portions occupying the fourth quadrant be extended by the axial lines thereof forming a 315° angle with the X-axis; however, there is no limitation to these values (angles).

Alternatively, the liquid crystal display device may include the uneven portions which are configured from a trunk convex portion formed in a frame-shape at the pixel peripheral portion and a plurality of branch convex portions extending from the trunk convex portion towards the pixel interior, in which the plurality of branch convex portions corresponds to a portion of the convex portions provided on the first electrode, the width of the branch convex portions is the widest at the part of the branch convex portion joining the trunk convex portion, and becomes narrower from the part joining the trunk convex portion toward the tip portion. A device having such a configuration is referred to as "a liquid crystal display device according to a second configuration of the present disclosure", as a matter of convenience.

The liquid crystal display device according to the second configuration of the present disclosure may employ a form in which, when an (X, Y) coordinate system in which straight lines parallel to the pixel peripheral portion passing through the central portion of the pixel are respectively set as the X-axis and the Y-axis is assumed, a plurality of branch convex portions occupying the first quadrant extends in parallel in a direction in which the value of the Y-coordinate increases when the value of the X-coordinate is increased, a plurality of branch convex portions occupying the second quadrant extends in parallel in a direction in which the value of the Y-coordinate increases when the value of the X-coordinate is decreased, a plurality of branch convex portions occupying the third quadrant extends in parallel in a direction in which the value of the Y-coordinate decreases when the value of the X-coordinate is decreased, and a plurality of branch convex portions occupying the fourth quadrant extends in parallel in a direction in which the value of the Y-coordinate decreases when the value of the X-coordinate is increased. The same applies to a liquid crystal display device according to a configuration 3-B of the present disclosure and a liquid crystal display device according to a configuration 4-B of the present disclosure described later.

Moreover, it is preferable that the plurality of branch convex portions occupying the first quadrant be extended by the axial lines thereof forming a 45° angle with the X-axis, the plurality of branch convex portions occupying the second quadrant be extended by the axial lines thereof forming a 135° angle with the X-axis, the plurality of branch convex portions occupying the third quadrant be extended by the axial lines thereof forming a 225° angle with the X-axis, and the plurality of branch convex portions occupying the fourth quadrant be extended by the axial lines thereof forming a 315° angle with the X-axis; however, there is no limitation to these values (angles).

The liquid crystal display device according to the first configuration or the second configuration of the present disclosure may employ a form in which the width of the branch convex portions becomes narrower in a straight line from the part joining the trunk convex portion towards the tip portion (each lateral edge configuring the branch convex portion is configured from one line segment, the rate of change in the width is constant); however, there is no particular limitation thereto, and a form in which the width of the branch convex portions becomes narrower in a curved line (a form in which each lateral edge configuring the branch convex portion is configured of a single smooth curve, the rate of change in the width changes) may also be employed, a form in which each lateral edge configuring the branch convex portions is configured from 2 or more line segments or curves may also be employed, or a form in which each lateral edge becomes narrower step-wise may be employed (each lateral edge configuring the branch convex portions is step-wise).

In the liquid crystal display device according to the first configuration of the present disclosure including the above-described preferred forms, an alignment regulating portion is formed in a part of the second electrode corresponding to the trunk convex portion. In this way, if the alignment regulating portion is formed in a part of the second electrode corresponding to the trunk convex portion, distortion in the vicinity of the alignment regulating portion of the electric field generated by the second electrode or the direction in which liquid crystal molecules fall in the vicinity of the alignment regulating portion is regulated. As a result, it is possible to strengthen the alignment regulating force with respect to the liquid crystal molecules in the vicinity of the alignment regulating portion, and it is possible to reliably regulate the tilt state of the liquid crystal molecules in the vicinity of the alignment regulating portion. Thereby, during image display, it is possible to reliably suppress the occurrence of the problem of dark lines occurring in a part of the image corresponding to the trunk convex portion. That is, it is possible to provide a liquid crystal display device able to realize high light transmissivity with improved uniformity while maintaining good voltage response characteristics, possible to achieve cost reductions and reduced power consumption in the light source configuring a backlight, and further to achieve improvements in the reliability of a TFT.

In the liquid crystal display device according to the second configuration of the present disclosure including the above-described preferred forms, a slit portion or projection may be formed on the first electrode parallel to the pixel peripheral portion passing through the central portion of the pixel. Moreover, an electrode is not formed on the slit portion or the projection. Next, in this way, if a slit portion or a projection is formed on the first electrode parallel to the pixel peripheral portion passing through the central portion of the pixel, distortion of the electric field generated by the first electrode in the vicinity of the slit portion or the direction in which the liquid crystal molecules fall in the vicinity of the projection is regulated, compared to a case in which a flat concave portion in which neither a slit portion nor a projection is present is formed on the first electrode. As a result, it is possible to strengthen the alignment regulating force with respect to the liquid crystal molecules in the vicinity of the slit portion or the projection, and it is possible to reliably regulate the tilt state of the liquid crystal molecules in the vicinity of the slit portion or the projection. Thereby, during image display, it is possible to reliably suppress the occurrence of the problem of dark lines occurring in a part of the image corresponding to the trunk convex portion. That is, it is possible to provide a liquid crystal display device able to realize high light transmissivity with improved uniformity while maintaining good voltage response characteristics, possible to achieve cost reductions and reduced power consumption in the light source configuring a backlight, and further to achieve improvements in the reliability of a TFT.

In addition, in the liquid crystal display device according to the present disclosure, a form in which a plurality of step-difference portions is formed on the convex portion provided on the first electrode may be employed. Moreover, such a form is referred to as "a liquid crystal display device according to a third configuration of the present disclosure", as a matter of convenience. In this way, if a plurality of step-difference portions (height difference) is formed on the convex portion, strengthening and weakening of the electric field in the convex portion occurs, or a lateral electric field occurs. As a result, it is possible to strengthen the alignment regulating force with respect to the liquid crystal molecules in the convex portion, and it is possible to reliably regulate the tilt state of the liquid crystal molecules in the convex portion. Therefore, during image display, it is possible to reliably suppress the occurrence of the problem of dark lines occurring in a part of the image corresponding to the trunk convex portion. That is, it is possible to provide a liquid crystal display device able to realize high light transmissivity with improved uniformity while maintaining good voltage response characteristics, possible to achieve cost reductions and reduced power consumption in the light source configuring a backlight, and further to achieve improvements in the reliability of a TFT.

Alternatively, a liquid crystal display device of the present disclosure may include a convex structure formed from a part of a first substrate positioned between pixels across a part of the first substrate corresponding to a pixel peripheral portion, and a peripheral portion of an uneven portion formed on the convex structure. Moreover, such a form is referred to as "a liquid crystal display device according to a fourth configuration of the present disclosure", as a matter of convenience. Then, in this way, if the peripheral portion of the uneven portion is formed on the convex structure, a much stronger electric field occurs at the peripheral portion of the uneven portion compared to a case where the peripheral portion of the uneven portion is flat. As a result, it is possible to strengthen the alignment regulating force with respect to the liquid crystal molecules in the peripheral portion of the uneven portion, and possible to reliably regulate the tilt state of the liquid crystal molecules in the peripheral portion of the uneven portion. Therefore, it is possible to maintain good voltage response characteristics.

The liquid crystal display device according to the third configuration of the present disclosure may include an uneven portion configured from a trunk convex portion extending in a cross-shape passing through the central portion of the pixel and a plurality of branch convex portions extending from the trunk convex portion towards the pixel peripheral portion. Moreover, such a form is referred to as "a liquid crystal display device according to the configuration 3-A of the present disclosure", as a matter of convenience. Moreover, the liquid crystal display device according to the configuration 3-A of the present disclosure is practically a combination of the liquid crystal display device according to the first configuration of the present disclosure and the liquid crystal display device according to the third configuration of the present disclosure.

Then, the liquid crystal display device according to the configuration 3-A of the present disclosure including the above-described preferred forms may have a trunk convex portion with a cross-sectional shape when the trunk convex portion is cut along a virtual perpendicular plane orthogonal to the direction in which the trunk convex portion extends in which the step-difference portions become lower towards the edge of the cross-sectional shape of the trunk convex portion from the center of the cross-sectional shape of the trunk convex portion. Then, the liquid crystal display device according to the configuration 3-A of the present disclosure including the above-described various preferred forms may include a trunk convex portion with a cross-sectional shape when cut along a virtual perpendicular plane parallel to the direction in which the trunk convex portion extends in which the step-difference portions become lower from the central portion of the cross-sectional shape of the trunk convex portion towards the end portion of the cross-sectional shape of the trunk convex portion.

Furthermore, the liquid crystal display device according to the configuration 3-A of the present disclosure including the above-described various preferred forms may include branch convex portions with a cross-sectional shape when cut along a virtual perpendicular plane parallel to the direction in which the branch convex portion extends in which the step-difference portions become lower from the central portion of the cross-sectional shape of the branch convex portion towards the edge of the cross-sectional shape of the branch convex portion. Then, the liquid crystal display device according to the configuration 3-A of the present disclosure including the above-described various preferred forms may include branch convex portions with a cross-sectional shape when cut along a parallel virtual perpendicular plane in the direction in which the branch convex portion extends in which the step-difference portions become lower from the trunk convex portion side of the cross-sectional shape of the branch convex portion towards the end portion of the cross-sectional shape of the branch convex portion.

Furthermore, the liquid crystal display device according to the configuration 3-A of the present disclosure including the above-described preferred forms may include an alignment regulating portion formed in a part of the second electrode corresponding to the trunk convex portion. The liquid crystal display device according to the first configuration of the present disclosure or configuration 3-A of the present disclosure may include an alignment regulating portion formed from a slit portion provided on the second electrode, or formed from a projection provided on the second electrode, or configured from a projection-like part of the second electrode. The projection, for example, is formed from a resist material, and a second electrode is not formed thereupon. In order to provide the projection-like part of the second electrode, a convex portion may be formed on the lower side of the second electrode, or the projection-like part of the second electrode may be provided by the same method as the method of forming the convex portion of the uneven portion on the first electrode. The liquid crystal display device according to the configuration 3-A of the present disclosure preferably includes a slit portion or a projection-like part of the second electrode with a width narrower than the width of the trunk convex portion. The same applies to a liquid crystal display device according to a configuration 4-A of the present disclosure described later.

Alternatively, the liquid crystal display device according to the third configuration of the present disclosure may include an uneven portion configured from a trunk convex portion formed in a frame-shape on the pixel peripheral portion and a plurality of branch convex portions extending from the trunk convex portion towards the pixel interior. Moreover, such a form is referred to as "a liquid crystal display device according to the configuration 3-B of the present disclosure", as a matter of convenience. Moreover, the liquid crystal display device according to the configuration 3-B of the present disclosure is practically a combination of the liquid crystal display device according to the second configuration of the present disclosure and the liquid crystal display device according to the third configuration of the present disclosure.

Then, the liquid crystal display device according to the configuration 3-B of the present disclosure including the above-described preferred forms may have a trunk convex portion with a cross-sectional shape when the trunk convex portion is cut along a virtual perpendicular plane orthogonal to the direction in which the trunk convex portion extends in which the step-difference portions become lower towards the inside of the edge of the cross-sectional shape of the trunk convex portion from the outside of the edge of the cross-sectional shape of the trunk convex portion.

Then, the liquid crystal display device according to the configuration 3-B of the present disclosure including the above-described various preferred forms may include a branch convex portion with a cross-sectional shape when cut along a virtual perpendicular plane orthogonal to the direction in which the branch convex portion extends in which the step-difference portions become lower from the central portion of the cross-sectional shape of the branch convex portion towards the edge portion of the cross-sectional shape of the branch convex portion. Then, the liquid crystal display device according to the configuration 3-B of the present disclosure including the above-described various preferred forms may include branch convex portions with a cross-sectional shape when cut along a parallel virtual perpendicular plane in the direction in which the branch convex portion extends in which the step-difference portions become lower from the trunk convex portion side of the cross-sectional shape of the branch convex portion side towards the end portion of the cross-sectional shape of the branch convex portion.

Furthermore, the liquid crystal display device according to the configuration 3-B of the present disclosure including the above-described various preferred forms, a slit portion or projection may be formed on the first electrode parallel to the pixel peripheral portion passing through the central portion of the pixel. Moreover, an electrode is not formed on the slit portion or the projection. The liquid crystal display device according to the second configuration of the present disclosure or configuration 3-B of the present disclosure includes a projection formed from, for example, a resist material. Alternatively, the cross-shaped convex portion passing through the central portion of the pixel may be formed surrounding the concave portion. Such a cross-shaped convex portion may be provided by forming the cross-shaped convex portion on the lower side of the first electrode, or may be provided with the same method as the method of forming the uneven portion on the first electrode. Alternatively, instead of providing the slit portion or the projection (rib), a cross-shaped concave portion passing through the central portion of the pixel may be provided. The same applies to a liquid crystal display device according to a configuration 4-B of the present disclosure described later.

Furthermore, a liquid crystal display device according to the third configuration of the present disclosure including the above-described various preferred forms may include a convex structure formed from a part of a first substrate positioned between pixels across a part of the first substrate corresponding to a pixel peripheral portion, and a peripheral portion of an uneven portion formed on the convex structure. Moreover, the convex structure may be formed based on a black matrix formed from an existing material. The convex structure may be the same as in the liquid crystal display device according to the fourth configuration of the present disclosure including the above-described various preferred forms.

In addition, the liquid crystal display device according to the fourth configuration of the present disclosure may include an uneven portion configured from a trunk convex portion extending in a cross-shape passing through the central portion of the pixel and a plurality of branch convex portions extending from the trunk convex portion towards the pixel peripheral portion. Moreover, such a form is referred to as "a liquid crystal display device according to the configuration 4-A of the present disclosure", as a matter of convenience. Moreover, the liquid crystal display device according to the configuration 4-A of the present disclosure is practically a combination of the liquid crystal display device according to the first configuration of the present disclosure and the liquid crystal display device according to the third configuration of the present disclosure and the liquid crystal display device according to the fourth configuration of the present disclosure.

Then, the liquid crystal display device according to the configuration 4-A of the present disclosure including the above-described preferred forms may include an alignment regulating portion formed in a part of the second electrode corresponding to the trunk convex portion. Here, the alignment regulating portion may be formed from a slit portion provided on the second electrode, or may be formed from a projection provided on the second electrode.

Alternatively, the liquid crystal display device according to the fourth configuration of the present disclosure may include an uneven portion configured from a trunk convex portion formed in a frame-shape on the pixel peripheral portion and a plurality of branch convex portions extending from the trunk convex portion towards the pixel interior. Moreover, such a form is referred to as "a liquid crystal display device according to the configuration 4-B of the present disclosure", as a matter of convenience. Moreover, the liquid crystal display device according to the configuration 4-B of the present disclosure is practically a combination of the liquid crystal display device according to the second configuration of the present disclosure, the liquid crystal display device according to the third configuration and the liquid crystal display device according to the fourth configuration of the present disclosure.

Then, the liquid crystal display device according to the configuration 4-B of the present disclosure including the above-described preferred forms may include a slit portion or projection be formed on the first electrode parallel to the pixel peripheral portion passing through the central portion of the pixel.

In addition, a liquid crystal display device according to a form of the present disclosure may include a black matrix formed such that a projection image of a part of the first substrate positioned between pixels are overlapped, and a black matrix is formed such that a projection image of a region extending from a part of the first substrate positioned between pixels to the end portion of the uneven portion.

The liquid crystal display apparatus the present disclosure including the above-described various preferred forms may include liquid crystal molecules having negative dielectric anisotropy.

The liquid crystal display device or liquid crystal display element according to the present disclosure may be obtained by a method of manufacturing a liquid crystal display device or liquid crystal display element, the method including forming a first electrode on a first substrate, and forming a first alignment film on an opposite face of the first substrate opposing a second substrate and on the first electrode; forming a second electrode on the second substrate, and forming a second alignment film on an opposite face of the second substrate opposing the first substrate and on the second electrode; arranging the first substrate and the second substrate such that the first alignment film and second alignment film are opposed, and sealing a liquid crystal layer between the first alignment film and the second alignment film; and aligning the liquid crystal molecules by applying a predetermined electric field.

Then, in this case, it is preferable that an electric field be applied such that the liquid crystal molecules are arranged in an oblique direction with respect to the surface of at least one substrate of the pair of substrates. Moreover, basically, the azimuth angle (deflection angle) of the liquid crystal molecules when a pretilt is imparted is regulated by the direction and strength of the electric field and the molecular structure of the alignment film material, and the polar angle (zenith angle) is regulated by the strength of the electric field and the molecular structure of the alignment film material.

Moreover, aligning the liquid crystal molecules by applying a predetermined electric field includes aligning the liquid crystal molecules and imparting a pretilt by an alignment control material being reacted while applying the predetermined electric field with respect to the liquid crystal layer including liquid crystal molecules and the alignment control material. Moreover, the method of manufacturing such a liquid crystal display device is referred to as a Polymer Stabilized Alignment Method (PSA method). Alternatively, aligning the liquid crystal molecules by applying a predetermined electric field includes the liquid crystal molecule being aligned and a pretilt being imparted by the alignment control material being reacted while applying the predetermined electric field with respect to the liquid crystal layer in a state in which an alignment film including the alignment control material is formed on an opposing face of at least one substrate and on an electrode. Moreover, the method of manufacturing such a liquid crystal display device is referred to as a Field-induced Photo-reactive Alignment Method (FPA method).

The pair of substrates is configured from a substrate having a pixel electrode and a substrate having a counter electrode; however, the substrate having a pixel electrode may be set as the first substrate and the substrate having a counter electrode may be set as the second substrate. A color filter layer is formed on side of the substrate having a counter electrode (second substrate), or the color filter layer is formed on the side of the substrate having a pixel electrode (first substrate). A circuit for driving TFT pixels or the like is provided on the substrate having a pixel electrode (first substrate). Moreover, the layer including the circuit for driving TFT pixels or the like may be referred to as a "TFT layer". In a case in which the color filter layer is formed on the side of the substrate having a counter electrode (second substrate), a planarizing layer is formed on the TFT layer, and a first electrode is formed on the planarizing layer. In a case in which the color filter layer is formed on the side of the substrate having a pixel electrode (first substrate) side, the color filter layer is formed on the TFT layer, and a first electrode is formed on the color filter layer or on an overcoating layer formed on the color filter layer or on a passivation film formed from an inorganic material. In the liquid crystal display device, in a case in which a pixel is configured from a plurality of subpixels, pixel may be read as subpixel. The first electrode and the second electrode may be configured from a material having transparency, such as ITO (Indium Tin Oxide), IZO, ZnO or SnO, for example. In addition, the second electrode may be set as a so-called solid electrode (electrode not subjected to patterning). For example, a first polarization plate is adhered to the outer face of the first substrate and a second polarization plate is adhered to the outer face of the second substrate. The first polarization plate and the second polarization plate are arranged such that their respective absorption axes are orthogonal. It is preferable that the absorption axis of the first polarization plate be parallel to the X-axis or the Y-axis, and the absorption axis of the second polarization plate be parallel to Y-axis or the X-axis; however, the present disclosure is not limited thereto.

Figure 39:
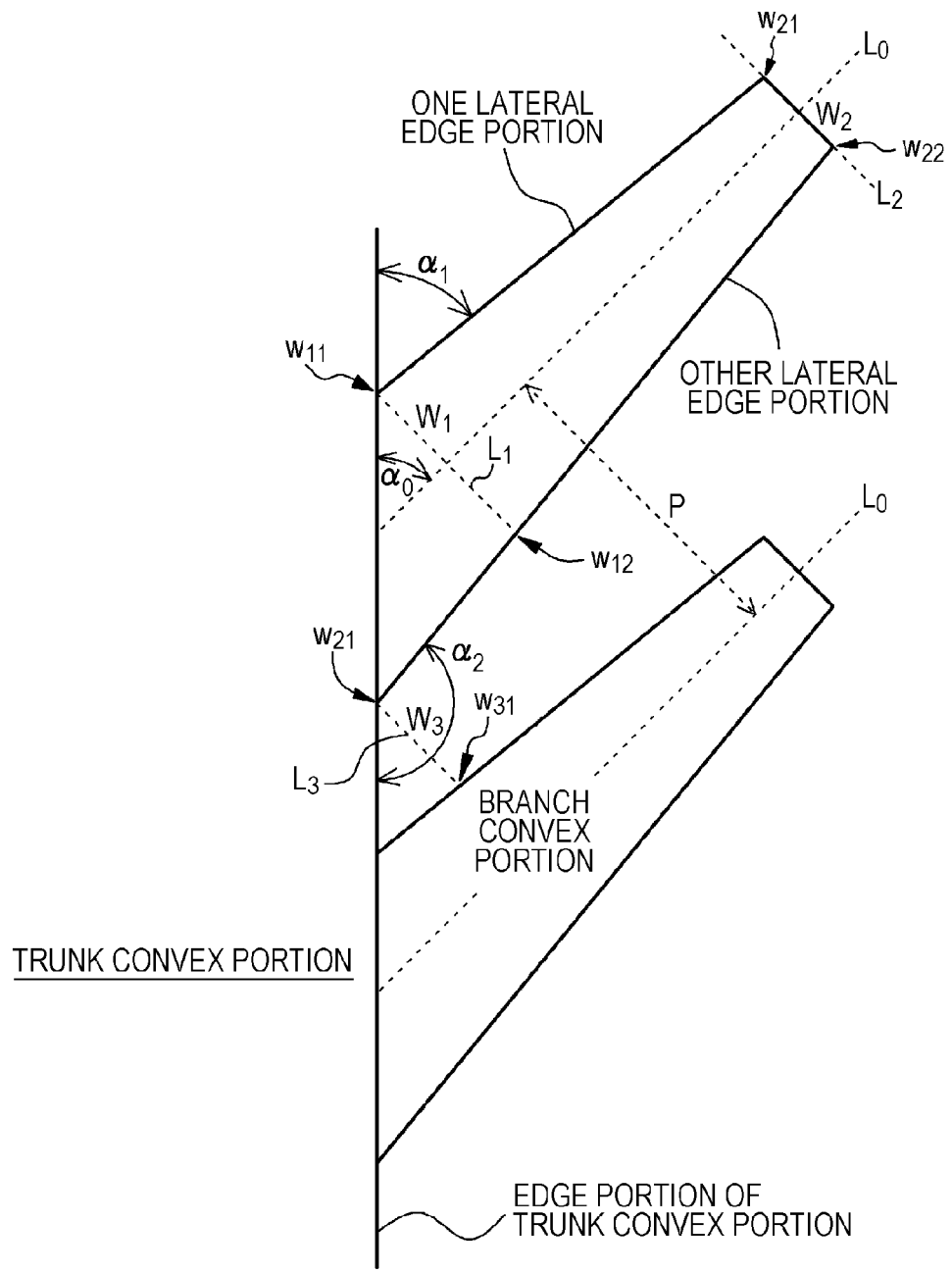
FIG. 39 is a schematic plan view of a portion of a trunk convex portion and a branch convex portion for explaining the formation pitch of the branch convex portion, the width of a part of the branch convex portion joining the trunk convex portion and the width of tip portion of the branch convex portion.
Figure 40:
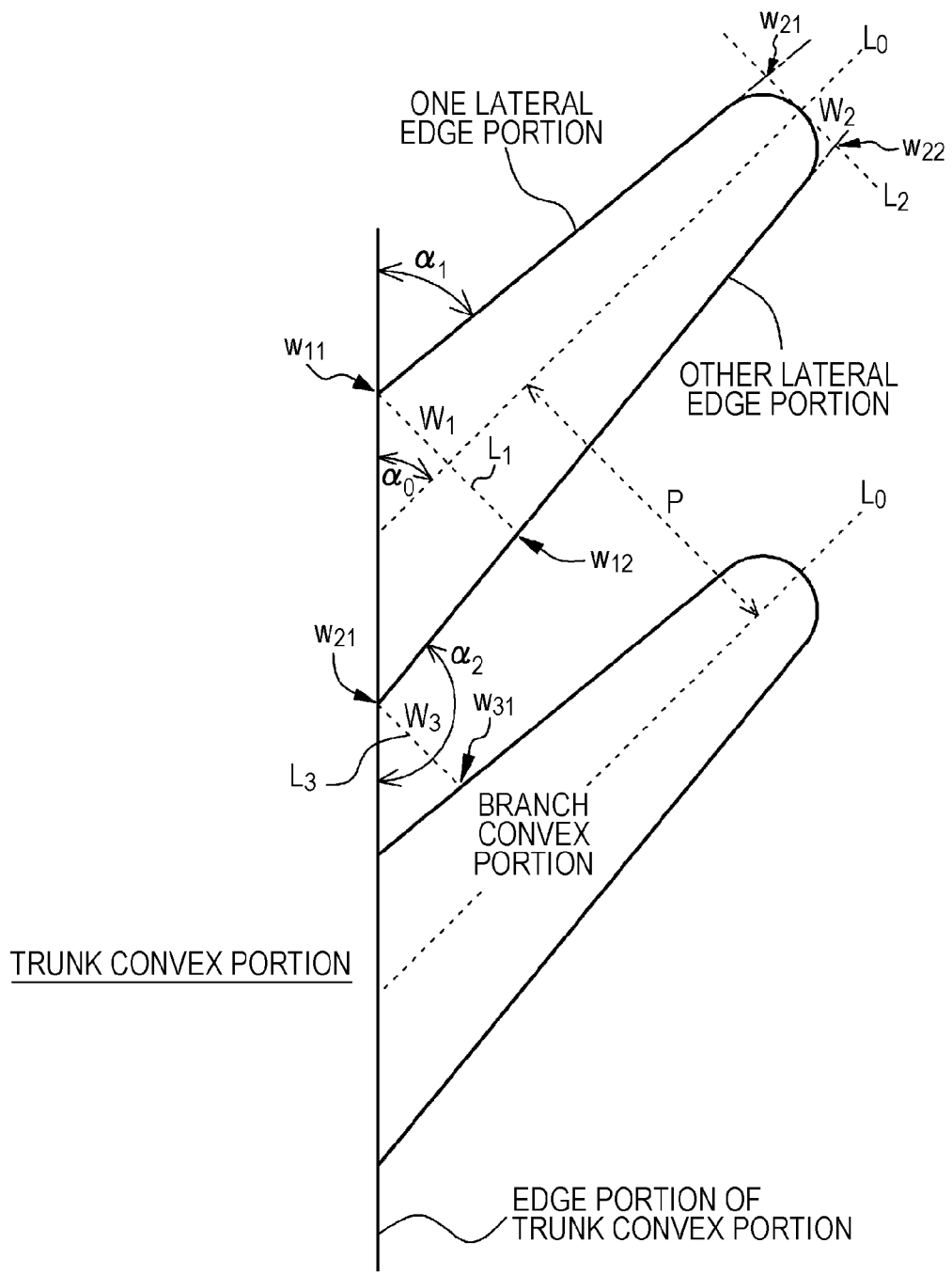
FIG. 40 is a schematic plan view of a portion of a trunk convex portion and a branch convex portion for explaining the formation pitch of the branch convex portion, the width of a part of the branch convex portion joining the trunk convex portion and the width of tip portion of the branch convex portion.

The liquid crystal display device according to the first configuration or the second configuration of the present disclosure preferably includes branch convex portions, the width of which is the widest at the part of the branch convex portion (referred to as a "root portion of the branch convex portion", as a matter of convenience) joining the trunk convex portion, and becomes narrower from the part joining the trunk convex portion toward the tip portion. Here, the formation pitch of the branch convex portions is set to "P", the width of the part of the branch convex portion joining the trunk convex portion (width of the root portion of the branch convex portion) to "$W_1$", and the width of the tip portion of the branch convex portion to "$W_2$". As shown in FIGS. 39 and 40, when angle formed by the edge portion of the trunk convex portion joining the trunk convex portion and the branch convex portion and one edge portion of the branch convex portion (lateral edge portion) is set to $\alpha_1$, and the angle formed by the outer edge of the trunk convex portion joining the trunk convex portion and the branch convex portion and the other lateral edge portion of the branch convex portion to $\alpha_2$, the angle $\alpha_0$ formed by axial line $L_0$ of the branch convex portion and the outer edge of the trunk convex portion may be represented by $$\alpha_0=\{\alpha_1+(180-\alpha_2)\}/2$$

Wherein, $0<\alpha_1\leq 90°$, $90\leq\alpha_2<180°$. Then, in such a case, when the intersection of the outer edge of the trunk convex portion and one lateral edge portion of the branch convex portion is set to $w_{11}$, and the point at which the straight line $L_1$ orthogonal to the axial line $L_0$ of the branch convex portion passing through the intersection $w_{11}$ crosses the other lateral edge portion of the branch convex portion is set to $w_{12}$, the distance from the intersection to the intersection $w_{12}$ is defined as the width (width of the root portion of the branch convex portion) $W_1$ of the part of the branch convex portion joining the trunk convex portion. In addition, in a straight line orthogonal to the axial line $L_0$ of the branch convex portion, when intersection of the straight line $L_2$ contacting the tip portion of the branch convex portion and one lateral edge portion of the branch convex portion (or the intersection of an extension line of the one lateral edge portion of the branch convex portion) is set to $w_{21}$, and the intersection of the straight line $L_2$ and the other lateral edge portion of the branch convex portion (or the intersection of an extension line of the other lateral edge portion of the branch convex portion) is set to $w_{22}$, the distance from the intersection $w_{21}$ to the intersection $w_{22}$ is defined as the $W_2$, the width of the tip portion of the branch convex portion. Moreover, in FIG. 40, the extension line of the lateral edge portion is shown as a dashed line. Furthermore, distance to the axial line $L_0$ of adjacent branch convex portions is defined as the formation pitch P of the branch convex portion. In addition, when point at which the straight line $L_3$ parallel to the straight line $L_1$ and passing through the intersection $w_{12}$ and one lateral edge portion of the branch convex portion opposing (adjacent to) the other lateral edge portion of the branch convex portion is set to $w_{31}$, the distance from the intersection $w_{12}$ to the intersection $w_{31}$ is defined as the distance $W_3$ between branch convex portions. The overall taper width TP of the branch convex portion may be defined as, $$TP=W_1-W_2$$

In addition, the average width $W_{ave1}$ of the branch convex portion and the average width $W_{ave2}$ of the concave portion may be defined as, $$W_{ave1}=(w_1+w_2)/2$$

$$W_{ave2}=P-W_{ave1}$$

Here, examples of the value of $W_3$ include 1 μm to 10 μm, and preferably 2 μm to 5 μm; examples of the value of $W_2$ include 1 μm to 10 μm, and preferably 2 μm to 5 μm; and examples of the value of P include 2 μm to 20 μm and preferably 2 μm to 10 μm. In addition, examples of the value of TP may be from 0.1 times to 10 times that of $W_3$. Moreover, these values may be applied with respect to the length of the longest branch convex portion.

Examples of the average minimum width and the average maximum width of the branch convex portion and concave portion include 1 μm and 25 μm, and preferably 2 μm and 20 μm respectively. If the average minimum width of the branch convex portions and the concave portions is less than 1 μm, forming the branch convex portions and the concave portions becomes difficult and there is concern that it may become difficult to secure a sufficient manufacturing yield. On the other hand, if the average maximum width of the branch convex portions and the concave portions is greater than 20 μm, when a driving voltage is applied to the first electrode and the second electrode, there is concern that it may be difficult to generate a satisfactory oblique lateral electric field between the first electrode and the second electrode. Examples of the width of the trunk convex portion include $2\times10^{-6}$ m to $2\times10^{-5}$ m, and preferably $4\times10^{-6}$ m to $1.5\times10^{-5}$ m. Examples of the height from the concave portion to the convex portion closest to the concave portion include $5\times10^{-8}$ m to $1\times10^{-6}$ m, preferably $1\times10^{-7}$ m to $1\times10^{-6}$ m, more preferably $2\times10^{-7}$ m to $6\times10^{-7}$ m. Examples of the height of each step-difference in the convex portion (height difference between adjacent top surfaces of convex portions configuring the step-difference portions) include $5\times10^{-8}$ m to $1\times10^{-6}$ m, and preferably $1\times10^{-7}$M to $5\times10^{-7}$ m. Then, thereby, good alignment control becomes possible, and it is possible to prevent lowering of the light transmissivity and extension of the processing time, along with securing sufficient manufacturing yield.

The liquid crystal display device is illuminated by an existing planar illumination device (backlight). The planar illumination device may be a direct-type planar light source device, and an edge light-type planar light source device (also referred to as a side-light type) is also possible. Here, the direct-type surface light source device is configured from, for example, a light source arranged in a housing, a reflection member arranged at a part of the housing positioned below the light source and reflecting emitted light from the light source upwards, and a diffusing plate attached to a housing opening positioned above the light source causing emitted light from the light source and reflection light from the reflection member to pass through while being diffused. On the other hand, the edge light-type planar light source device, for example, is configured from a light guiding plate and a light source arranged at the lateral face of the light guiding plate. Moreover, a reflection member is arranged below the light guiding plate, and a diffusing sheet and a prism sheet are arranged above the light guiding plate. The light source formed from a cold cathode type fluorescent lamp, and emits white light. Alternatively, the light source may be formed of a light-emitting element, such as an LED or semiconductor laser element. By controlling the transmission of light from the planar illumination device (backlight) by the liquid crystal display device, it is possible to display an image in the liquid crystal display device.

Embodiment 1

Figure 2:
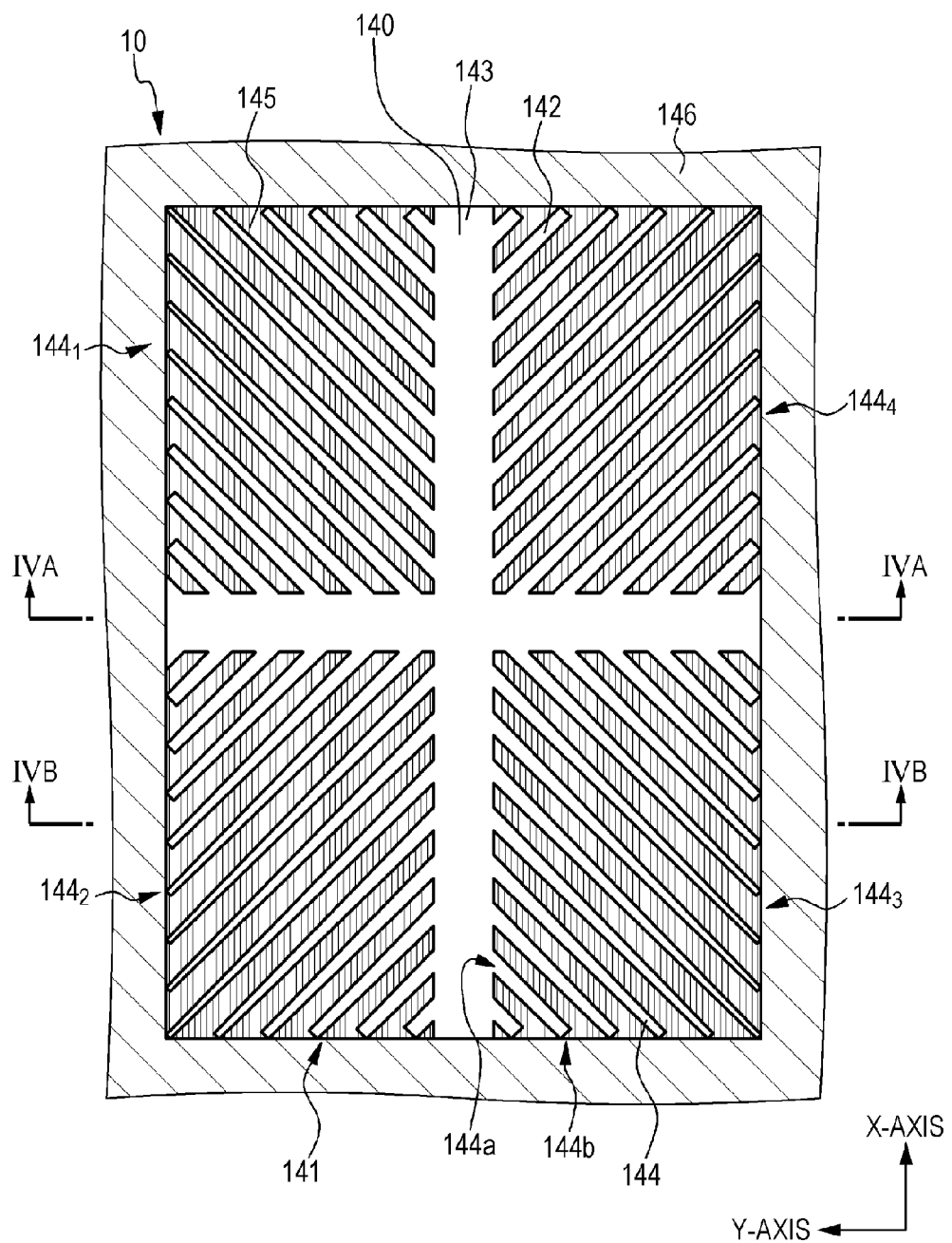
FIG. 2 is a schematic plan view of a single pixel portion of a first electrode configuring the liquid crystal display device of Embodiment 1.
Figure 3A:
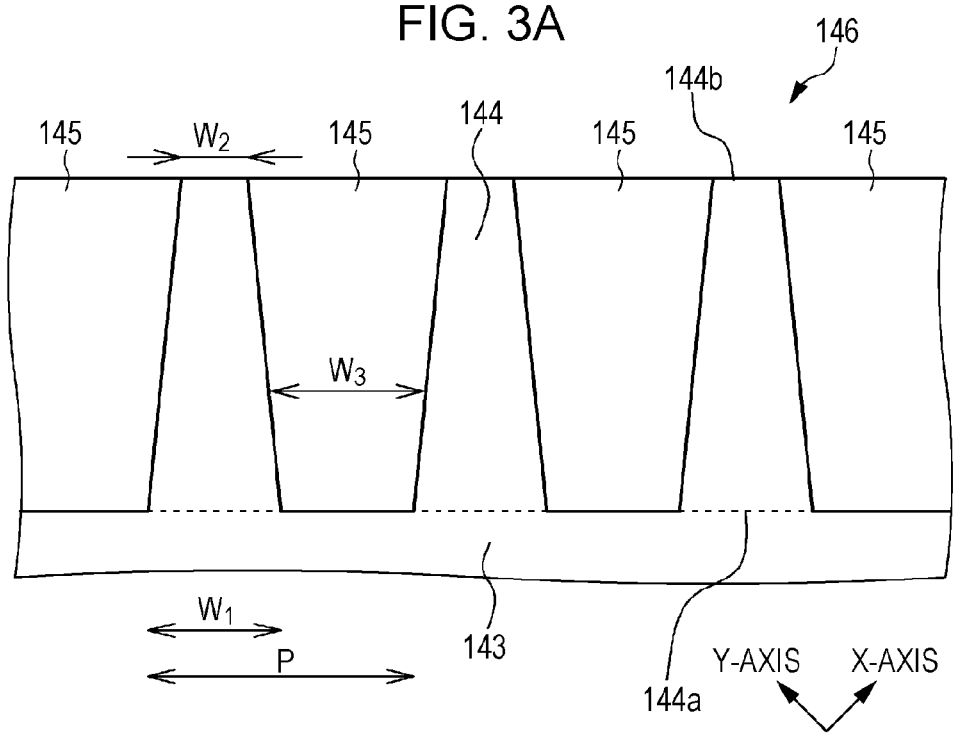
FIG. 3A is an enlarged schematic plan view of a part of a single pixel portion of the first electrode configuring the liquid crystal display device of Embodiment 1.
Figure 4A:
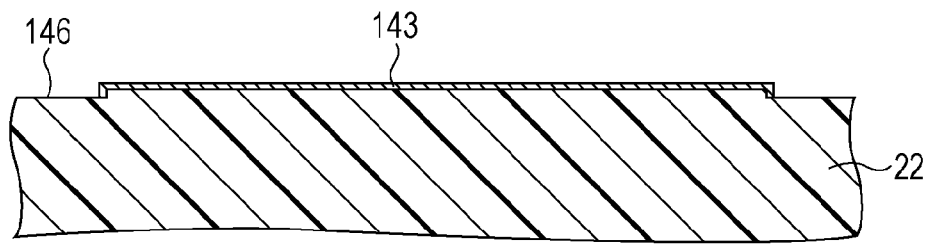
FIGS. 4A and 4B are schematic partial cross-sectional views of a first electrode in the liquid crystal display device of Embodiment 1 taken along lines IVA-IVA and IVB-IVB in FIG. 2.
Figure 4B:
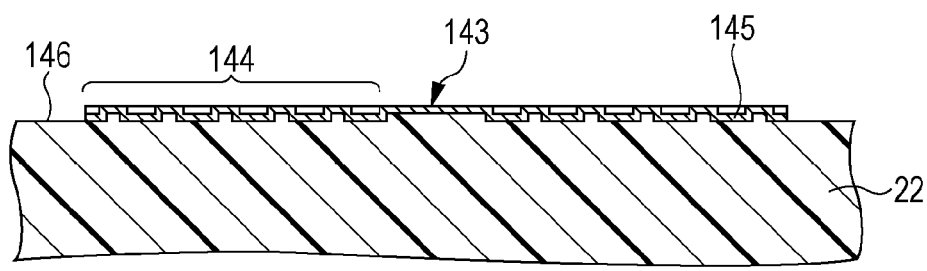
Figure 4C:
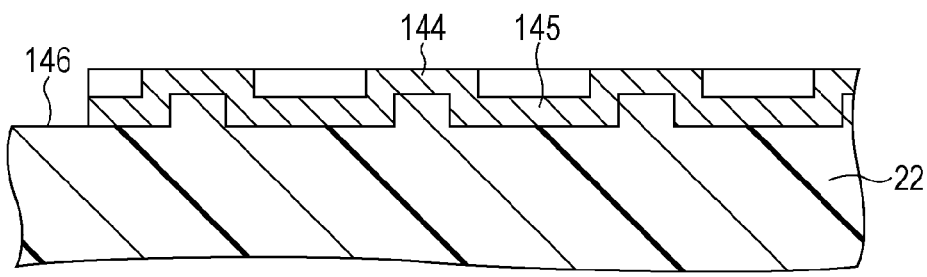
FIG. 4C is an enlarged schematic partial cross-sectional view of a portion of FIG. 4B.

Example 1 relates to a liquid crystal display device of the present disclosure, and, more specifically, to a liquid crystal display device according to the first configuration of the present disclosure. FIG. 1 shows a schematic partial end face view of the liquid crystal display device of Embodiment 1, FIG. 2 shows a schematic plan view of one pixel portion of a first electrode configuring the liquid crystal display device of Embodiment 1; FIG. 3A shows an enlarged schematic plan view of one pixel portion of the first electrode configuring the liquid crystal display device of Embodiment 1; FIGS. 4A and 4B show schematic partial cross-sectional views of a first electrode or the like taken along lines IVA-IVA and IVB-IVB in FIG. 2; and FIG. 4C shows an enlarged schematic partial cross-sectional view of one portion of FIG. 4B.

The liquid crystal display device of Embodiment 1 or Embodiments 2 to 12 described later includes a plurality of pixels arranged in a matrix, each pixel 10 (10A, 10B and 10C) having a first substrate 20 and a second substrate 50; first electrodes (pixel electrodes) 140, 240, 340 and 440 formed on an opposing face of the first substrate 20 opposing the second substrate 50; a first alignment film 21 covering the first electrode 140, 240, 340 and 440 and the opposing face of the first substrate 20; a second electrode (counter electrodes) 160 formed on the opposing face of the second substrate 50 opposing the first substrate 20; a second alignment film 51 covering the second electrode 160 and the opposing face of the second substrate 50, and; a liquid crystal layer 70 which is provided between the first alignment film 21 and the second alignment film 51 and includes liquid crystal molecules 71A, 71B and 71C, and in which a pretilt is imparted on the liquid crystal molecules. Specifically, a pretilt is imparted on the liquid crystal molecules on at least the first alignment film 21 side. Moreover, the liquid crystal molecules have negative dielectric anisotropy. Then, a plurality of uneven portions 141, 241, 341 and 441 is formed on the first electrodes 140, 240, 340 and 440, and the width of a portion of convex portions 142, 242, 342 and 442 provided on the first electrodes 140, 240, 340 and 440 becomes narrower towards the tip. Moreover, in the diagrams, hatching extending in the vertical direction is applied to the concave portions 145, 245, 345 and 445.

Figure 36A:
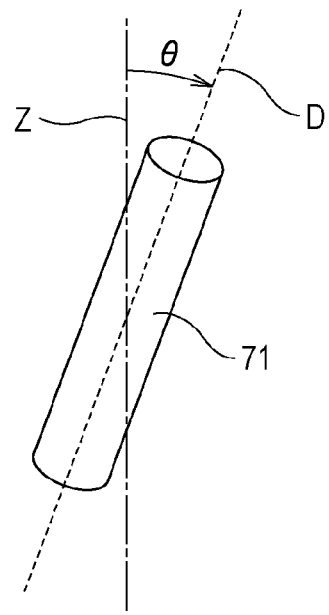
FIG. 36A is a schematic view for describing the pretilt of the liquid crystal molecules; and 36B and 36C are conceptual diagrams showing the behavior of liquid crystal molecules in a liquid crystal display device of Embodiment 2.

The liquid crystal molecules 71 are classified into liquid crystal molecules 71A maintained by the first alignment film 21 in the vicinity of the interface with the first alignment film 21, liquid crystal molecules 71B maintained by the second alignment film 51 in the vicinity of the second alignment film 51, and liquid crystal molecules 71C other than these. The liquid crystal molecules 71C are positioned in an intermediate region in the thickness direction of the liquid crystal layer 70, and are arranged such that longitudinal axes (director) of the liquid crystal molecules 71C are substantially perpendicular with respect to the first substrate 20 and the second substrate 50 in a state in which the driving voltage is off. Here, when the driving voltage becomes on, the director of the liquid crystal molecules 71C are aligned by tilting so as to become parallel with respect to the first substrate 20 and the second substrate 50. Such a behavior is a factor in the liquid crystal molecules 71C having characteristics of a smaller dielectric constant in the long-axis direction than in the short-axis direction. Since the liquid crystal molecules 71A and 71B have the same characteristics, basically the same behaviors as the liquid crystal molecules 71C are exhibited according to changes in the state of the driving voltage from on to off. However, in the off state of the driving voltage, a pretilt $\theta_1$ is imparted on the liquid crystal molecules 71A by the first alignment film 21, or a pretilt $\theta_1$ is imparted by a monomer mixed into the liquid crystal in advanced, and the directors thereof attain a posture inclined from the normal line of the first substrate 20 and the second substrate 50. Similarly, a pretilt $\theta_2$ is imparted on the liquid crystal molecules 71B by the second alignment film 51 or the pretilt $\theta_2$ is imparted by a monomer mixed into the liquid crystal in advance, and the directors thereof attain a posture inclined from the normal line of the first substrate 20 and the second substrate 50. Moreover, here, "maintained" represents regulating of the liquid crystal molecules 71 without fixing of the alignment films 21 and 51 with the liquid crystal molecules 71A and 71B. In addition, "pretilt $\theta$ ($\theta_1$, $\theta_2$) indicates the incline angle of the directors D of the liquid crystal molecules 71 (71A, 71B) with respect to the Z direction in the off state of the driving voltage, in a case in which a direction perpendicular to the surface of the first substrate 20 and second substrate 50 (normal line direction) is set as Z, as shown in FIG. 36A.

The liquid crystal layer 70 has a value greater than 0° for both the pretilt $\theta_1$ and pretilt $\theta_2$. In the liquid crystal layer 70, the pretilt $\theta_1$ and pretilt $\theta_2$ may have the same angle ($\theta_1=\theta_2$) or may have differing angles ($\theta_1 \neq \theta_2$), and among these, it is preferable that pretilt $\theta_1$ and pretilt $\theta_2$ have differing angles. In so doing, it is possible to obtain substantially the same contrast as a case where both pretilt $\theta_1$ and pretilt $\theta_2$ are 0° while better improving the response speed with respect to the application of the driving voltage than in a case in which both pretilt $\theta_1$ and pretilt $\theta_2$ are 0°. Accordingly, it is possible to reduce the transmission amount of light during black display while improving the response characteristics, and possible to improve the contrast. In a case in which pretilt $\theta_1$ and pretilt $\theta_2$ have differing angles, it is more desirable that the larger pretilt $\theta$ among pretilt $\theta_1$ and pretilt $\theta_2$ be 1° or more to 4° or less. A particularly high effect is obtained by the larger pretilt $\theta$ being in the above-described range.

Moreover, a TFT layer 30 (described in detail later) is formed on the first substrate 20, a planarizing layer 22 formed of an organic material, such as a photosensitive polyimide resin or acrylic resin, is formed on the TFT layer 30, and first electrodes 140, 240, 340 and 440 are formed on the planarizing layer 22. Reference numbers 146, 246, 346 and 446 represent a portion of the first substrate positioned between pixels. The planarizing layer 22 may be formed of an inorganic material, such as $SiO_2$, SiN, or SiON.

Then, in the liquid crystal display device according to the first embodiment, the uneven portion 141 is configured of a trunk convex portion (main convex portion) 143 extending in a cross-shape passing through the central portion of the pixel and a plurality of branch convex portions (sub-convex portions) 144 extending from the trunk convex portion 143 towards the pixel peripheral portion. Here, the plurality of branch convex portions 144 corresponds to a portion of the convex portions provided on the first electrode 140. The width of the branch convex portion 144 is the widest at the part 144a of the branch convex portion joining the trunk convex portion 143, and becomes narrower from the part 144a joining the trunk convex portion 143 towards the tip portion 144b (specifically, becomes narrower in a straight line). More specifically, when the (X,Y) coordinate system in which the trunk convex portions 143 extending in a cross-shape are defined respectively as the X-axis and Y-axis is assumed, a plurality of branch convex portions $144_1$ occupying the first quadrant extends in parallel in a direction in which the value of the Y-coordinate increases when the value of the X-coordinate is increased, a plurality of branch convex portions $144_2$ occupying the second quadrant extends in parallel in a direction in which the value of the Y-coordinate increases when the value of the X-coordinate is decreased, a plurality of branch convex portions $144_3$ occupying the third quadrant extends in parallel in a direction in which the value of the Y-coordinate decreases when the value of the X-coordinate is decreased, and a plurality of branch convex portions $144_4$ occupying the fourth quadrant extends in parallel in a direction in which the value of the Y-coordinate decreases when the value of the X-coordinate is increased. Moreover, the plurality of branch convex portions $144_1$ occupying the first quadrant are extended by the lines thereof forming a 45° angle with the X-axis, the plurality of branch convex portions $144_2$ occupying the second quadrant are extended by the lines thereof forming a 135° angle with the X-axis, the plurality of branch convex portions $144_3$ occupying the third quadrant are extended by the lines thereof forming a 225° angle with the X-axis, and the plurality of branch convex portions $144_4$ occupying the fourth quadrant are extended by the lines thereof forming a 315° angle with the X-axis.

A first polarization plate (not shown) is adhered to the outer face of the first substrate 20 and a second polarization plate (not shown) is adhered to the outer face of the second substrate 50. The first polarization plate and the second polarization plate are arranged such that their respective absorption axes are orthogonal. The absorption axis of the first polarization plate is parallel to the X-axis or the Y-axis, and the absorption axis of the second polarization plate is parallel to the Y-axis or the X-axis.

The side face (sidewall) of the trunk convex portion or the branch convex portions may be a perpendicular face, a forward taper may be conferred, or a reverse taper may be conferred. The same applied to the liquid crystal display device of Embodiments 2 to 12, described later.

Figure 37:
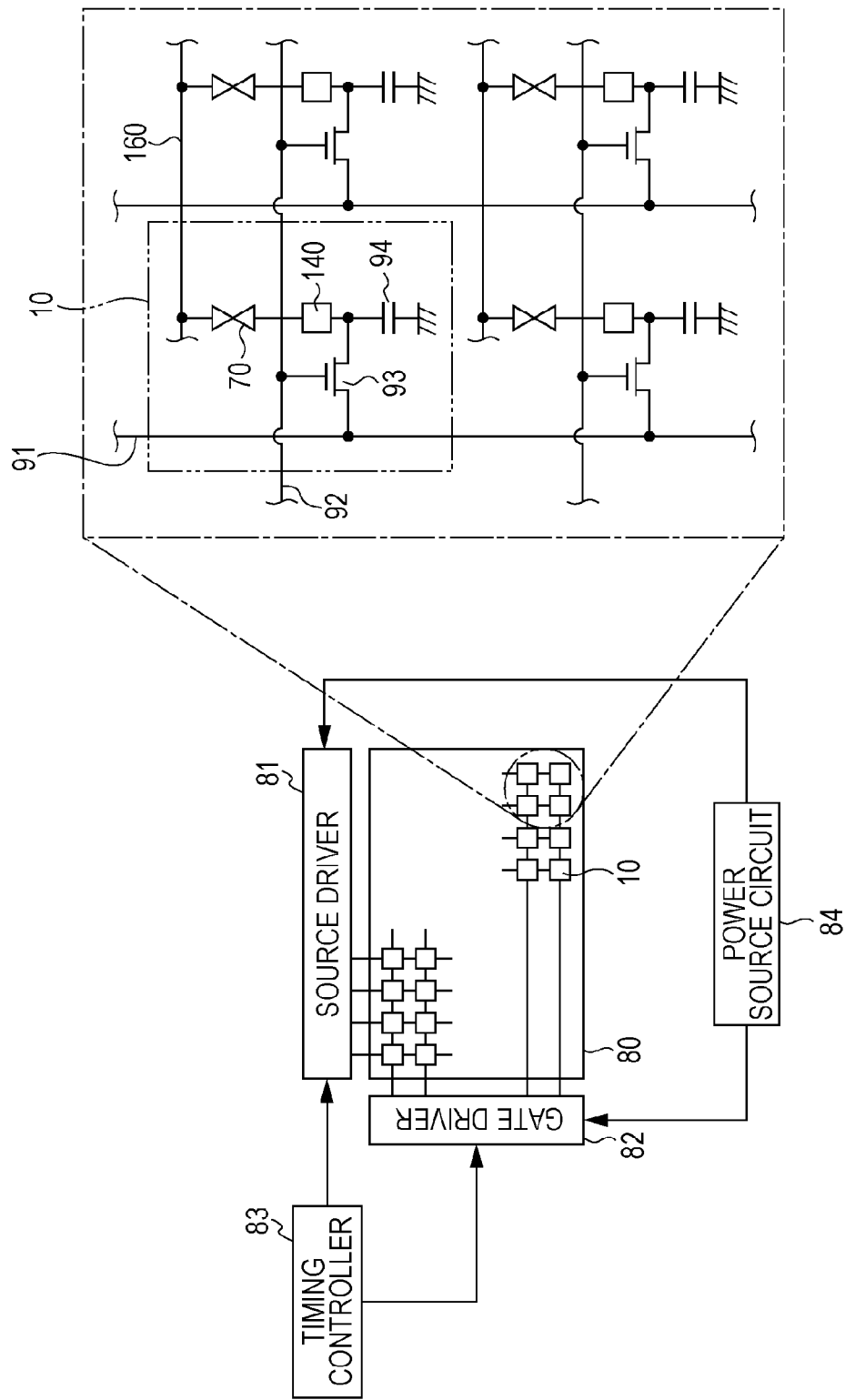
FIG. 37 is a circuit configuration diagram of a liquid crystal display device shown in FIG. 1.

FIG. 37 shows a circuit configuration in a liquid crystal display device shown in FIG. 1 or a liquid crystal display device of Embodiment 2 to Embodiment 12 described later.

As shown in FIG. 37, the liquid crystal display device is configured including liquid crystal display element having a plurality of pixels 10 provided in a display region 80. In the liquid crystal display device, a source driver 81 and gate driver 82, a timing controller 83 controlling the source driver 81 and the gate driver 82, and a power source circuit 84 supplying power to the source driver 81 and the gate driver 82 are provided at the periphery of the display region 80.

The display region 80 is a region in which a video image is displayed, and is a region configured to be able to display a video image by a plurality of pixels 10 being arranged in a matrix shape. Moreover, in FIG. 37, in addition to showing the display region 80 including a plurality of pixels 10, regions corresponding 4 pixels 10 are separately enlarged and shown.

In the display region 80, a plurality of gate lines 92 is arranged in columns along with a plurality of source line 91 arranged in rows, and the pixels 10 are respectively arranged at positions at which the source line 91 and the gate lines 92 intersect each other. Each pixel 10 is configured including a TFT 93 and a capacitor 94 along with a first electrode 140 and liquid crystal layer 70. In each TFT 93, a source electrode is connected to the source line 91, a gate electrode is connected to the gate line 92, and a drain electrode is connected to the capacitor 94 and first electrode 140. Each source line 91 is connected to source driver 81 and supplies an image signal from a source driver 81. Each gate line 92 is connected to a gate driver 82, and sequentially supplies a scanning signal from the gate driver 82.

The source driver 81 and the gate driver 82 select a specific pixel 10 from the plurality of pixels 10.

The timing controller 83, for example, outputs the image signal (for example, the respective RGB video image signals corresponding to red, green and blue) and a source driver control signal for controlling the operation of the source driver 81 to the source driver 81. In addition, the timing controller 83, for example, outputs a gate driver control signal for controlling the operation of the gate driver 82 to the gate driver 82. Examples of the source driver control signal include, for example, a horizontal synchronization signal, a start pulse signal or a clock signal for a source driver. Examples of the gate driver control signal include, for example, a perpendicular synchronization signal or a clock signal for a gate driver.

In manufacturing of a liquid crystal display device of Embodiment 1, first a TFT based on a method described below is formed, and further a transparent conductive material layer formed from ITO is formed on the opposing face of a first substrate 20 on which a planarizing layer 22 is formed. Moreover, the first substrate 20 is formed from a glass substrate with a thickness of 0.7 mm.

Figure 38A:
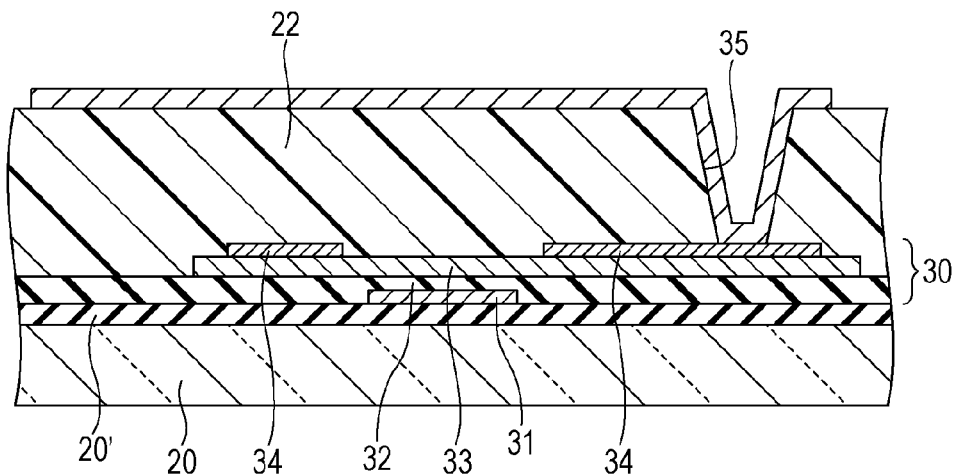
FIGS. 38A and 38B are schematic partial end face views of a first substrate on which a TFT or the like is formed and before uneven portions are formed on the first electrode.

That is, as shown in FIG. 38A, a gate electrode 31 is formed on an insulating film 20' formed on the first substrate 20, and a gate insulating layer 32 is formed on the gate electrode 31 and the insulating film 20'. The gate insulating layer 32 is formed of, for example, a metal oxide, such as $SiO_2$, SiN, or SiON. Next, after a semiconductor layer 33 becoming a channel formation region is formed on the gate insulating layer 32, a source/drain electrode 34 is formed on the semiconductor layer 33. The semiconductor layer 33 is formed of, for example, polysilicon or amorphous silicon, and the source/drain electrode 34 is formed of, for example, a metal film, such as titanium, chromium, aluminum, molybdenum, tantalum, tungsten or copper, or an alloy film or laminated film thereof. Thereby, it is possible to obtain a TFT layer 30. The formation of the above TFT layer 30 may be performed based on an existing method. Moreover, the TFT is not limited to such a so-called bottom gate/top contact type, and may be a bottom gate/bottom contact type, may be a top gate/top contact type or may be a top gate/bottom contact type. Next, after a planarizing layer 22 with a thickness of 2.5 μm is formed over the entire face, a connection hole 35 is formed in the planarizing layer 22 above one of the source/drain electrodes 34.

Next, after a resist material layer is formed on the planarizing layer 22, an uneven portion (depth of concave portion 0.28 μm) is formed in the resist material layer by performing exposure and development. Then, by performing etchback of the resist material layer and the planarizing layer 22, an uneven portion may be formed in the planarizing layer 22. Thereafter, by forming a transparent conductive material layer with a thickness of 0.05 μm formed of ITO over the entire face, it is possible to obtain the uneven portion 141 (trunk convex portion 143, branch convex portion 144, and concave portion 145). Then, by performing patterning of the transparent conductive material layer based on an existing method, the first electrodes 140 may be provided in a matrix-shape. The specifications of the trunk convex portion 143, branch convex portion 144 and concave portion 145 are as shown in Table 1 below. Moreover, the width of the trunk convex portion 143 is set to 8.0 μm. In addition, in the Comparative Example 1a, Comparative Example 1b and Comparative Example 1c in Table 1, a taper is not conferred on the branch convex portions. Moreover, the angle $\alpha_0$ (for example, refer to FIG. 39) formed by the axial line of the branch convex portion and the outer edge of the trunk convex portion is set to 45°.

Meanwhile, in the second substrate 50, a color filter is formed on the second substrate 50 formed from a glass substrate with a thickness of 0.7 mm, and a second electrode 160 as a so-called solid electrode is formed on the color filter.

Thereafter, a first alignment film 21 is formed on the first electrode 140, and a second alignment film 51 is formed on the second electrode 160. Specifically, an alignment film material is subjected to heat treatment after being coated or printed on each of the first electrode 140 and the second electrode 160. The temperature of the heat treatment is preferably 80° C. or higher, and more preferably 150° C. or higher to 200° C. or lower. In addition, for the heat treatment, the heating temperature may be changed step-wise. In so doing, a solvent included in the coated or printed alignment film material is evaporated, and alignment films 21 and 51 including a high molecular compound are formed. Thereafter, a process such as rubbing may be performed as necessary. More specifically, as the first alignment film 21 and the second alignment film 51, a perpendicular alignment film material is coated on the first electrode 140 and second electrode 160 based on a spin coating method. Then, after a drying step is performed at 80° C. for 80 seconds on a hotplate, backing was performed at 200° C. for 60 minutes in a clean oven with a nitrogen atmosphere, thereby obtaining the first alignment film 21 and the second alignment film 51.

Next, the first substrate 20 and the second substrate 50 are arranged such that the alignment film 21 and the alignment film 51 are opposed, and a liquid crystal layer 70 including liquid crystal molecules 71 is sealed between the alignment film 21 and the alignment film 51. Specifically, a spacer projection material for securing a cell gap, such as plastic beads with a diameter of 3.2 μm is dispersed with respect to either one of the faces of the first substrate 20 or second substrate 50 on which the alignment films 21 and 51 are formed, and a seal portion is formed at the outer edge on the

TABLE 1

|  | Example | | | | Comparative Example |
|---|---|---|---|---|---|
|  | 1A | 1B | 1C | 1D | 1a |
| Formation pitch P of branch convex portion | | | 6.0 | | |
| Width $W_2$ of end portion of branch convex portion | | | 3.0 | | |
| Width $W_1$ of root portion of branch convex portion | 5.5 | 5.0 | 4.5 | 4.0 | 3.0 |
| Distance $W_3$ between branch convex portions | 0.5 | 1.0 | 1.5 | 2.0 | 3.0 |
| Average width $W_{ave1}$ of branch convex portion | 4.25 | 4.0 | 3.75 | 3.5 | 3.0 |
| Overall taper width TP of branch convex portion | 2.5 | 2.0 | 1.5 | 1.0 | 0.0 |
| Increased value of transmissivity (%) | 0.209 | 0.403 | 0.559 | 0.581 | 0.0 |

|  | Example | | | | Comparative Example |
|---|---|---|---|---|---|
|  | 1E | 1F | 1G | 1H | 1b |
| Formation pitch P of branch convex portion | | | 7.0 | | |
| Width $W_2$ of end portion of branch convex portion | | | 3.5 | | |
| Width $W_1$ of root portion of branch convex portion | 6.5 | 6.0 | 5.5 | 5.0 | 3.5 |
| Distance $W_3$ between branch convex portions | 0.5 | 1.0 | 1.5 | 2.0 | 3.5 |
| Average width $W_{ave1}$ of branch convex portion | 5.0 | 4.75 | 4.5 | 4.25 | 3.5 |
| Overall taper width TP of branch convex portion | 3.0 | 2.5 | 2.0 | 1.5 | 0.0 |
| Increased value of transmissivity (%) | 0.053 | 0.330 | 0.660 | 1.000 | 0.0 |

|  | Example | | | | Comparative Example |
|---|---|---|---|---|---|
|  | 1I | 1J | 1K | 1L | 1c |
| Formation pitch P of branch convex portion | | | 8.0 | | |
| Width $W_2$ of end portion of branch convex portion | | | 4.0 | | |
| Width $W_1$ of root portion of branch convex portion | 7.5 | 7.0 | 6.5 | 6.0 | 4.0 |
| Distance $W_3$ between branch convex portions | 0.5 | 1.0 | 1.5 | 2.0 | 4.0 |
| Average width $W_{ave1}$ of branch convex portion | 5.75 | 5.5 | 5.25 | 5.0 | 4.0 |
| Overall taper width TP of branch convex portion | 3.5 | 3.0 | 2.5 | 2.0 | 0.0 |
| Increased value of transmissivity (%) | 0.258 | 0.573 | 0.945 | 1.346 | 0.0 | second substrate 50 by using an ultraviolet curable resin including silica particles with a particle size of 3.5 µm using a screen printing process. Then, a liquid crystal material in which 0.3 mass % of a polymerizable monomer (specifically, an acrylic monomer) is mixed was injected dropwise as a negative liquid crystal into parts surrounded by the seal portion. Moreover, a method of manufacturing such as liquid crystal display device is referred to as a PSA method. Thereafter, the first substrate 20 and the second substrate 50 are adhered together and the seal portion is cured. In so doing, the liquid crystal layer 70 is sealed. Next, a voltage is applied between the first electrode 140 and second electrode 160 using a voltage application unit. The voltage is, for example, from 3 volts to 30 volts, and specifically, for example, is an alternating current electrical field (60 Hz) with a rectangular wave form with an effective voltage value of 7 volts. At the same time, in order for the polymerizable monomer to be reacted, a heat treatment is performed or ultraviolet rays are irradiated, depending on the polymerizable monomer used. In so doing, an electric field (electric field) with a direction forming a predetermined angle with respect to the surfaces of the first substrate 20 and the second substrate 50 occurs, and the liquid crystal molecules 71 are aligned by being inclined in a predetermined direction from the perpendicular direction of the first substrate 20 and the second substrate 50. That is, the azimuth angle (deflection angle) of the liquid crystal molecules 71 at this time is regulated by the strength and direction of the electric field and the polymerizable monomer mixed into the liquid crystal, and the polar angle (zenith angle) is regulated by the strength of the electric field and the polymerizable monomer mixed into the liquid crystal. Accordingly, it is possible to control the pretilt $\theta_1$ and $\theta_2$ of the liquid crystal molecules 71A and 71B by appropriately adjusting the value of the voltage. Moreover, an oblique electric field is applied between the first substrate 20 and the second substrate 50 by the uneven portion 141 formed on the first electrode 140. In addition, a polymer layer is formed in the vicinity of the opposing face of the substrate by the reaction of the polymerizable monomer mixed in to the liquid crystal. Then, the direction in which the liquid crystal molecules 71 are to react due to the polymer layer thus formed is regulated, and the pretilt state of the liquid crystal molecules 71 in the vicinity of the first substrate 20 and the second substrate 50 is fixed by the reaction product of the polymerizable monomer. Due to the above, it is possible to complete a liquid crystal cell.

Meanwhile, after an alignment film having a function of recording the pretilt is formed by coating on at least one electrode, in the FPA method injecting and sealing a negative liquid crystal, a liquid crystal material formed from a negative liquid crystal is injected dropwise into parts surrounded by the seal portion after the seal portion is formed. Then, the first substrate 20 and the second substrate 50 are adhered together, and the seal portion is cured using ultraviolet rays with a wavelength of 410 mm. Next, a voltage is applied between the first electrode 140 and second electrode 160 using a voltage application unit. The voltage is, for example, from 3 volts to 30 volts, and specifically, for example, is an alternating current electrical field (60 Hz) with a rectangular wave form with an effective voltage value of 7 volts. In so doing, an electric field (electric field) with a direction forming a predetermined angle with respect to the surfaces of the first substrate 20 and the second substrate 50 occurs, and the liquid crystal molecules 71 are aligned by being inclined in a predetermined direction from the perpendicular direction of the first substrate 20 and the second substrate 50. That is, the azimuth angle (deflection angle) of the liquid crystal molecules 71 at this time is regulated by the direction and strength of the electric field and the molecular structure of the alignment film material, and the polar angle (zenith angle) is regulated by the strength of the electric field and the molecular structure of the alignment film material. Accordingly, it is possible to control the pretilt $\theta_1$ and $\theta_2$ of the liquid crystal molecules 71A and 71B by appropriately adjusting the value of the voltage. Then, energy beams (specifically, ultraviolet rays UV), for example, uniform ultraviolet rays of 10 J (measured at a wavelength of 360 nm), are irradiated with respect to the alignment films 21 and 51 from the outside of the first substrate 20, with the state of the voltage being applied being continued. That is, the ultraviolet rays are irradiated while applying an electric field or magnetic field such that the liquid crystal molecules 71 are arranged in an oblique direction with respect to the surface of the pair of substrates 20 and 50. Thereby, a cross-linkable functional group or polymerizable functional group having a high molecular compound in the alignment films 21 and 51 is reacted, and cross-linked. Moreover, an oblique electric field is applied between the first substrate 20 and the second substrate 50 by the uneven portion 141 formed on the first electrode 140. Thereby, the direction in which the liquid crystal molecules 71 are to be reacted is recorded due to the high molecular compound, and a pretilt is imparted on the liquid crystal molecules 71 in the vicinity of the alignment films 21 and 51. Then, as a result, in an undriven state, pretilt $\theta_1$ and $\theta_2$ are imparted on the liquid crystal molecules 71A and 71B positioned in the vicinity of the interface between the alignment films 21 and 51 in the liquid crystal layer 70. As the ultraviolet rays UV, ultraviolet rays including a high proportion of light components with wavelengths of approximately 295 nm to 365 nm. In so doing, when ultraviolet rays including high proportions of light components in the short wavelength region are used, there is concern of the liquid crystal molecules 71 being photo-degraded and deteriorating. Moreover, here, the ultraviolet rays UV are irradiated from outside of the first substrate 20; however, the rays may be irradiated from the outside of the second substrate 50, or may be irradiated from the outside of both of the first substrate 20 and second substrate 50. In this case, it is preferable to irradiate the ultraviolet rays UV from the side of the substrate with the higher light transmissivity. In addition, In a case in which the ultraviolet rays UV are irradiated from the outside of the second substrate 50, there is concern of the cross-linking reaction being difficult due to absorption by the color filter, depending on the wavelength region of the ultraviolet rays UV. Therefore, irradiation from the outside of the first substrate 20 (substrate side having the pixel electrode) is preferable.

By the above steps, it is possible for the liquid crystal display device (liquid crystal display element) shown in FIG. 1 in which the liquid crystal molecules 71A of the first substrate 20 and second substrate 50 side form a pretilt to be completed. Finally, on the outside of the liquid crystal display device, a pair of polarization plates (not shown) are adhered such that their absorption axes are orthogonal. Moreover, the liquid crystal display device in Embodiments 2 to 12 described below may be manufactured with substantially similar methods.

In the operation of the liquid crystal display device (liquid crystal display element), when a driving voltage is applied in the selected pixel 10, the alignment state of the liquid crystal molecules 71 included in the liquid crystal layer 70 changes according to the potential difference between the first electrode 140 and the second electrode 160. Specifically, in the liquid crystal layer 70, from the state before application of the driving voltage shown in FIG. 1, the liquid crystal molecules 71A and 71B positioned in the vicinity of the alignment films 21 and 51 rotate and fall from their inclined direction, and this operation propagates to the other liquid crystal molecules 71C. As a result, the liquid crystal molecules 71 respond so as to assume a posture substantially level (horizontal) with respect to the first substrate 20 and the second substrate 50. In so doing, the optical characteristics of the liquid crystal layer 70 change, incident light on the liquid crystal display element becomes modulated emitted light, and a video image is displayed by grayscale being expressed based on the emitted light.

In the liquid crystal display device, an image is displayed by applying a driving voltage between the first electrode (pixel electrode) 140 and the second electrode (counter electrode) 160 with the gist below. Specifically, through input of a source driver control signal from the timing controller 83, the source driver 81 supplies a separate image signal to a predetermined source line 91 based on the image signal input from the same timing controller 83. Along with this, the gate driver 82 sequentially supplies a scanning signal to the gate line 92 with a predetermined timing through input of a gate driver control signal from the timing controller 83. In so doing, a pixel 10 positioned at the intersection of the source line 91 to which the image signal is supplied and the gate line 92 to which the scanning signal is supplied is selected, and a driving voltage is applied to the pixel 10.

Figure 7A:
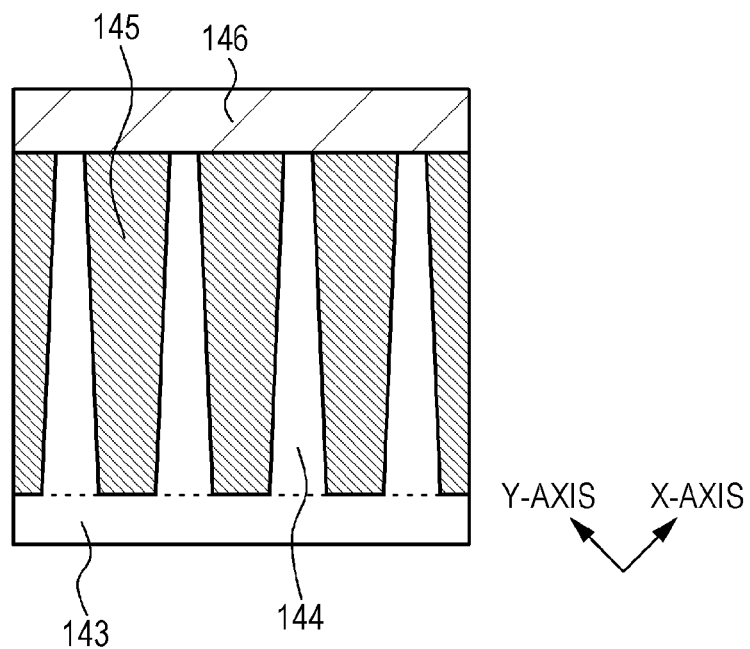
FIGS. 7A and 7B are diagrams schematically showing the shape of a branch convex portion when a light transmissivity simulation is performed on the branch convex portion of each of Embodiment 1 and Comparative Example 1.
Figure 7B:
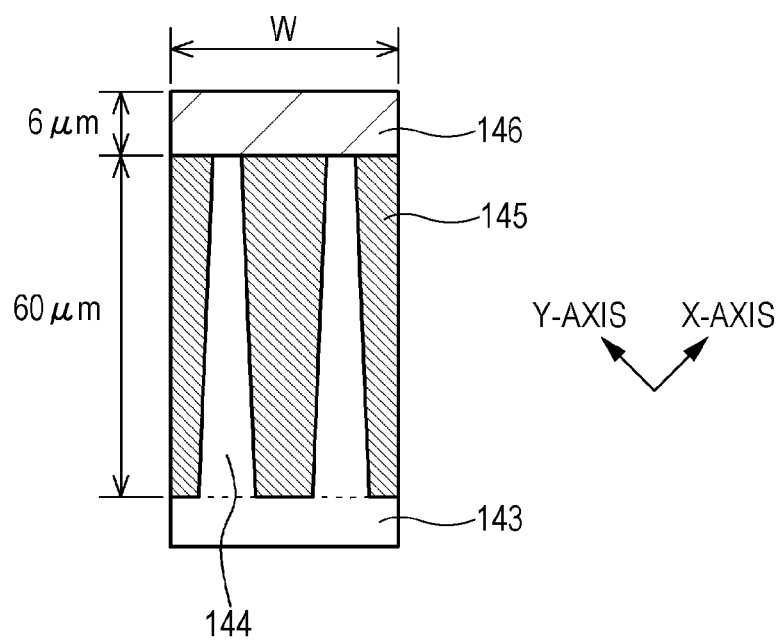

A light transmissivity simulation was performed based on the parameter values of various branch convex portions shown in Table 1. Moreover, as schematically shown in FIG. 7A, a light transmissivity simulation was performed on the branch convex portion and trunk convex portion provided in a 30 μm×30 μm region. Moreover, the potential difference between the first electrode and the second electrode is assumed to be 7.5 volts. In FIGS. 7A and 7B, the part with fine hatching represents the concave portion 145, the part with coarse hatching represents the part 146 of the first substrate positioned between pixels. The plurality of branch convex portions 144 occupies the first quadrant.

Figure 3B:
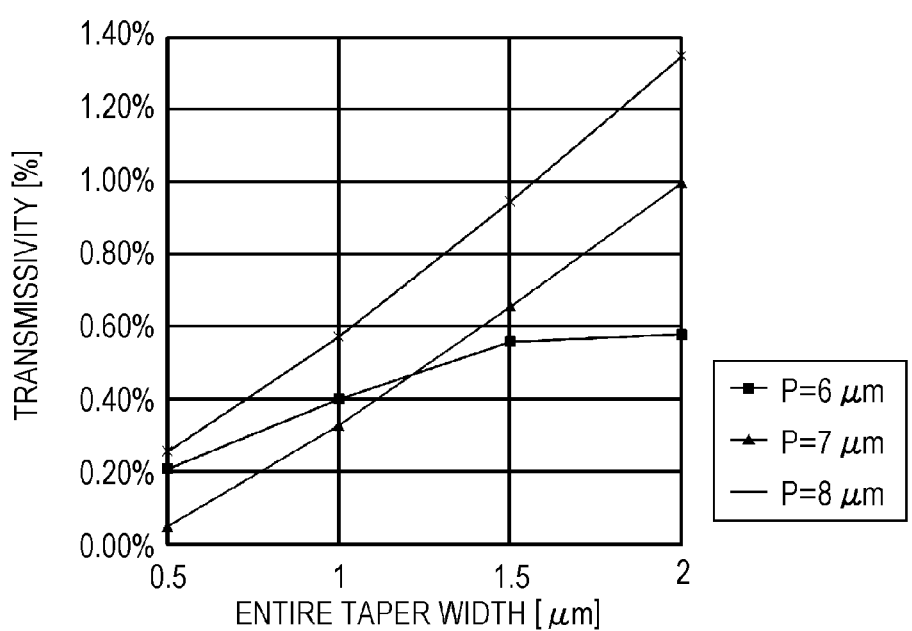
FIG. 3B is a graph showing light transmissivity simulation results of Embodiment 1.

The value of the light transmissivity simulation results for Comparative Example 1a shown in Table 1 were 32.546%, the value of the light transmissivity simulation results for Comparative Example 1b were 32.106%, and the value of the light transmissivity simulation results for Comparative Example 1c were 31.421%. Then, the value of the light transmissivity simulation results increases for Embodiments 1A to 1D increases compared to Comparative Example 1a, similarly the value of the light transmissivity simulation results increases for Embodiments 1E to 1H compared to Comparative Example 1b, and the value of the light transmissivity simulation results increases for Embodiment 1I to 1L compared to Comparative Example 1c (refer to FIG. 3B). That is, by conferring a taper on the branch convex portions, it is possible to improve the light transmissivity, and suppress the generation of dark lines.

Figure 5:
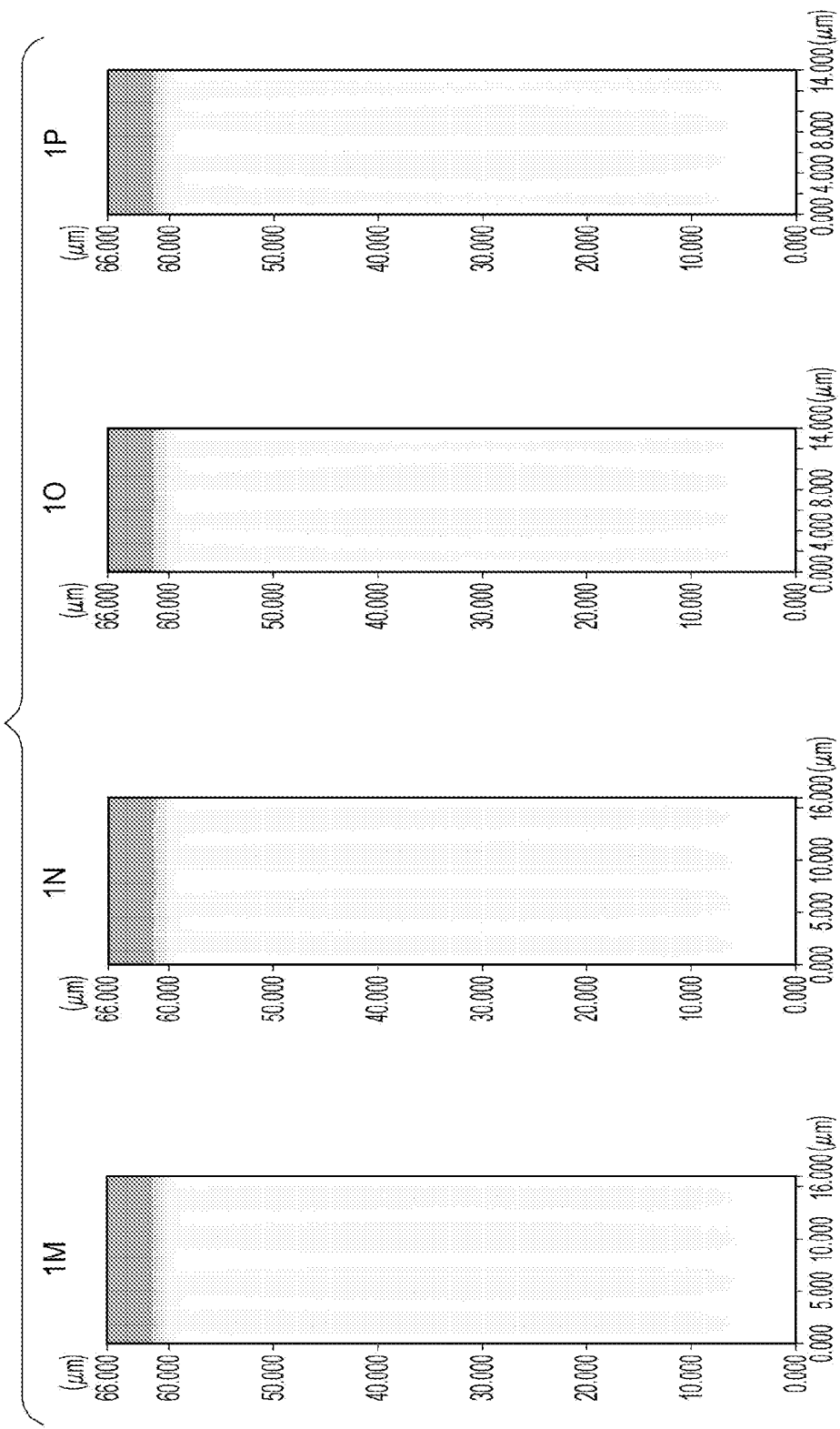
FIG. 5 is a diagram showing the results of a light transmissivity simulation on a branch convex portion of Embodiment 1.

In addition, as schematically shown in FIG. 7B, a light transmissivity simulation was performed with respect to Embodiments 1M to 1P and Comparative Examples 1d to 1e for two branch convex portions provided in a region of W (μm)×66 (μm). Moreover, the potential difference between the first electrode and the second electrode is assumed to be 7.5 volts. The results thereof are shown in FIG. 5 (Embodiment) and FIG. 6 (Comparative Example). Moreover, the parameters for Embodiments 1M to 1P and Comparative Examples 1d to 1e are shown in Table 2 below. The plurality of branch convex portions occupies the first quadrant.

TABLE 2

| | Example | | | |
|---|---|---|---|---|
| | 1M | 1N | 1O | 1P |
| W | 16.0 | | 14.0 | |
| Formation pitch P of branch convex portion | 8.0 | | 7.0 | |
| Distance $W_3$ between branch convex portions | 4.0 | | 3.5 | |
| Width $W_1$ of root portion of branch convex portion | 4.0 | | 3.5 | |
| Width $W_2$ of end portion of branch convex portion | 3.5 | 3.0 | 3.0 | 2.5 |
| Average width $W_{ave1}$ of branch convex portion | 3.75 | 3.5 | 3.25 | 3.0 |
| Overall taper width TP of branch convex portion | 0.5 | 1.0 | 0.5 | 1.0 |

| | Comparative Example | |
|---|---|---|
| | 1d | 1e |
| W | 14.0 | 16.0 |
| Formation pitch P of branch convex portion | 7.0 | 8.0 |
| Distance $W_3$ between branch convex portions | 3.5 | 4.0 |
| Width $W_1$ of root portion of branch convex portion | 3.5 | 4.0 |
| Width $W_2$ of end portion of branch convex portion | 3.5 | 4.0 |
| Average width $W_{ave1}$ of branch convex portion | 3.5 | 4.0 |
| Overall taper width TP of branch convex portion | 0 | 0 |

From FIG. 5, it is understood that the light transmissivity is even in the branch convex portions of Embodiments 1M to 1P upon which a taper is conferred. Meanwhile, from FIG. 6, in the branch convex portions to which the taper of Comparative Example 1d and Comparative Example 1e is not imparted, it is understood that alignment defects are viewed at locations approximately 20 μm and approximately 30 μm from the root portion, and the possibility of a pixel defect occurring is high compared to Embodiments 1M to 1P.

Figure 8A:
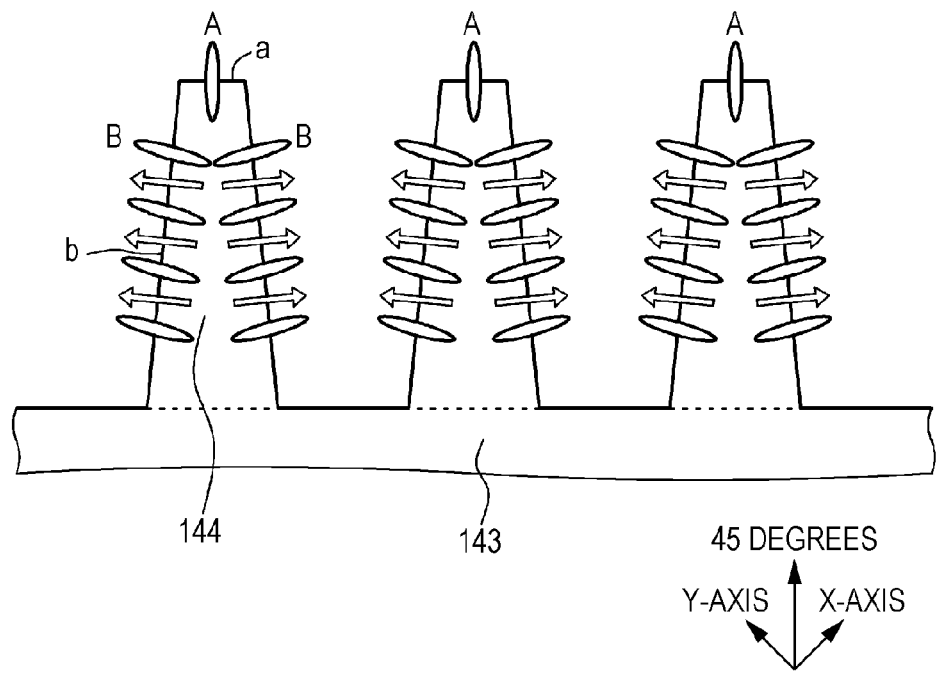
FIGS. 8A and 8B are schematic views for describing the behavior of liquid crystal molecules in branch convex portions of each of Embodiment 1 and Comparative Example 1.
Figure 8B:
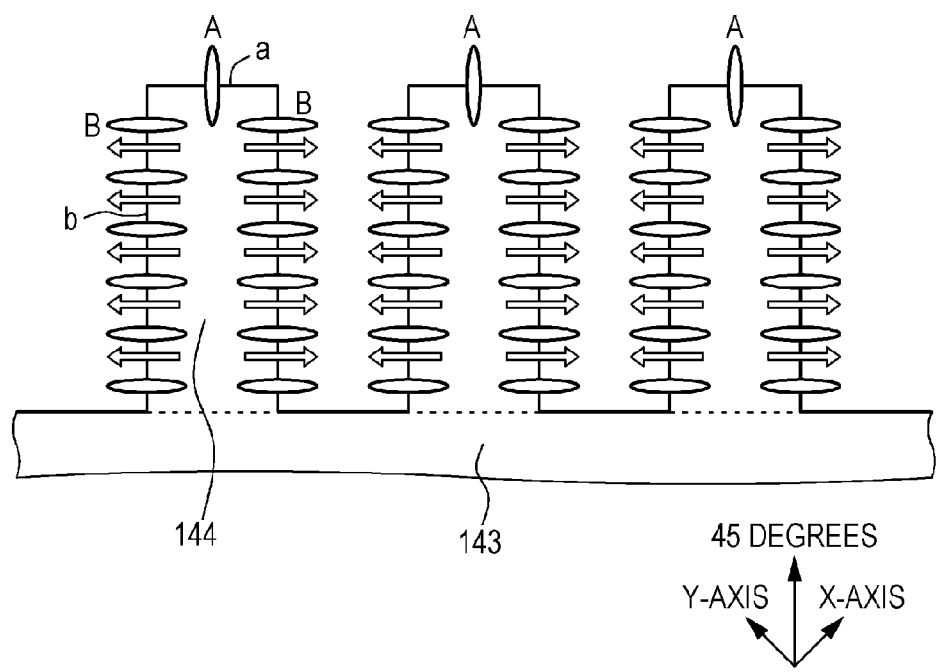

During manufacturing of the liquid crystal display device, a pretilt is imparted on the liquid crystal molecules in a state in which a voltage is applied to the electrode. At this time, as shown in FIGS. 8A and 8B, the liquid crystal molecules A positioned at tip edge portion a or in the vicinity thereof (referred to as "tip region", as a matter of convenience) have their long-axis directions (director) inclined towards the trunk convex portion. Then, in the liquid crystal layer, in a case where a region in the thickness direction including the liquid crystal molecules A is assumed, the motion of the liquid crystal molecules A is transmitted to all of the liquid crystal molecules (referred to a "liquid crystal molecules A", as a matter of convenience) of one pixel excepting the edge portion of the branch convex portions influenced by the local electric field which is a factor in the structure, and the directors of the liquid crystal molecules A' are inclined towards the trunk convex portion. Here, as shown in FIG. 8B, in Comparative Example 1 in which a taper is not conferred on the branch convex portions, as shown in FIG. 8A, the motion of the liquid crystal molecules A is more difficult to transmit to the liquid crystal molecules A', or a much longer time is necessary to transmit the motion of the liquid crystal molecules A to the liquid crystal molecules A' than in Embodiment 1 in which a taper is conferred on the branch convex portions. Accordingly, in Comparative Example 1, alignment defects more easily occur, and a longer time is necessary to impart a pretilt on the liquid crystal molecules than in Embodiment 1.

Figure 6:
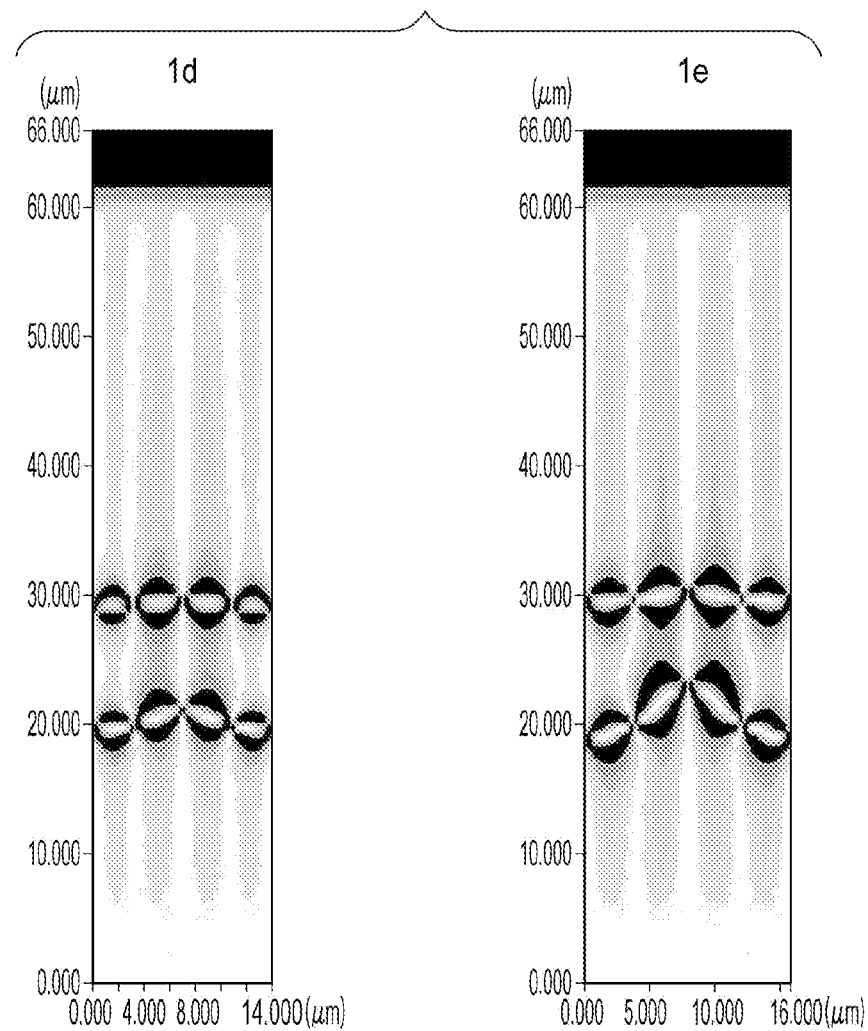
FIG. 6 is a diagram showing the results of a light transmissivity simulation on a branch convex portion of Comparative Example 1.

When an image is displayed by the liquid crystal display device, if a voltage is applied to the electrode, the liquid crystal molecules in the entire liquid crystal layer are changed such that the directors become parallel with respect to the first substrate and the second substrate. Moreover, in FIG. 8A and FIG. 8B, the directions of the electric field in the lateral edge portion are shown with white block arrows. Here, in the liquid crystal layer including liquid crystal molecules B positioned at the lateral edge portion b or in the vicinity thereof (referred to as the "lateral edge region", as a matter of convenience), in a case in which a column-like region is assumed in the thickness direction, rotation occurs in the liquid crystal molecules lined up in the thickness direction in the column-like region. That is, the direction of the directors of the liquid crystal molecules B positioned in the lateral edge region and the directions of the directors of the liquid crystal molecules (referred to as "liquid crystal molecules B'", as a matter of convenience) lined up in the thickness direction in the column-like region including the liquid crystal molecules B attain different states. Moreover, the angle formed by the directors of the liquid crystal molecules B and the directors of the liquid crystal molecules B' is set to β. Here, as shown in FIG. 8B, in Comparative Example 1 in which a taper is not conferred on the branch convex portion, since the range of the rotation angle of the liquid crystal molecules is wide (that is, since angle β is large), the proportion of the liquid crystal molecules having retardation in the X-axis direction or the Y-axis direction is small. Thereby, as shown in FIG. 6, the light transmissivity in the branch convex portion is susceptible to becoming uneven, and dark lines occur. Meanwhile, as shown in FIG. 8A, in Embodiment 1 in which a taper is conferred on the branch convex portion, since the range of the rotation angle of the liquid crystal molecules is narrow (that is, since angle β is small), the proportion of the liquid crystal molecules having retardation in the X-axis direction or the Y-axis direction is large. Thereby, as shown in FIG. 5, the light transmissivity in the branch convex portion is not susceptible to becoming uneven, and it is possible to suppress the occurrence of dark lines.

In a fine slit structure of the related art, in a slit in which an electrode is not provided, the liquid crystal molecules are difficult to align in a predetermined direction (do not easily fall) without influence of the electric field with respect to the liquid crystal molecules. Thereby, dark lines occur corresponding to the slit, and the light transmissivity is susceptible to lowering. In the Embodiments, since the liquid crystal molecules are influenced by the electric field in all regions in the pixel, the phenomenon of the occurrence of dark lines in the fine slit structure does not occur. In addition, in the fine slit structure of the related art, the area ratio of the electrode and the slit greatly influences the light transmissivity. On the other hand, in the Embodiments, due to their nature, since the slit is not present, such a problem does not occur.

As above, in the liquid crystal display device of Embodiment 1, a plurality of uneven portions is formed on the first electrode, and the width of a portion of a convex portion provided on the first electrode becomes narrower towards the tip portion. Thereby, it is possible to further decrease the occurrence of dark lines. That is, it is possible to realize high light transmissivity with improved uniformity, and possible to obtain, better voltage response characteristics. In addition, because it is possible to anticipate an improvement in initial alignment, as described above, when a pretilt is imparted on the liquid crystal molecules by irradiating uniform ultraviolet rays in a state in which an alternating current electric field with a rectangular waveform with respect to the liquid crystal cell, it is possible to achieve a reduction in the time for imparting the pretilt on the liquid crystal molecules. In addition, because a reduction in alignment defects is anticipated, the yield improves, and a reduction in the manufacturing costs of the liquid crystal display device is possible. Furthermore, because an improvement in light transmissivity is achieved, it is possible to achieve lower power consumption by the backlight, and improve the TFT reliability.

Figure 38B:
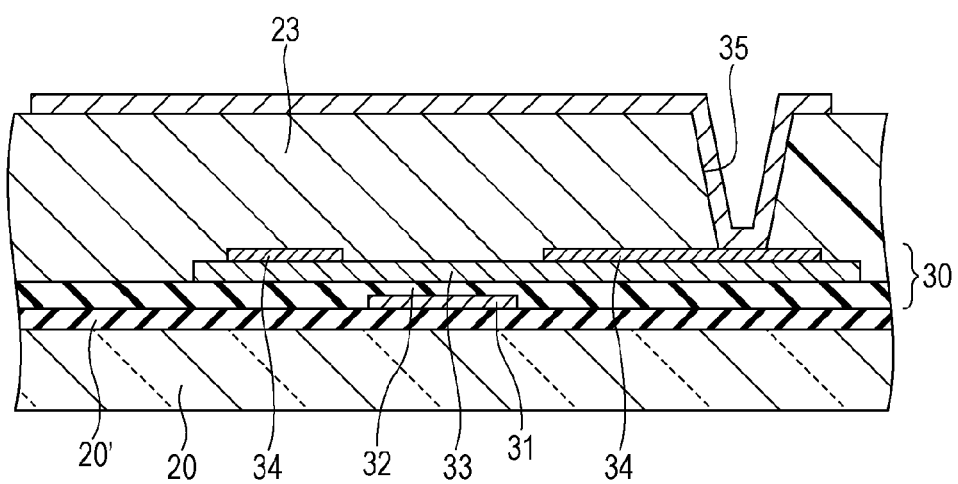

A color filter layer may be formed on the first substrate 20. Specifically, as above, after a TFT layer 30 is formed on the first substrate 20, a color filter layer 23 is formed on the TFT layer 30 in place of the planarizing layer 22 based on an existing method. Thereby, it is possible to obtain a Color Filter on Array (COA) structure. Then, after a connection hole 35 is formed in the color filter layer 23 above one source/drain electrode 34, a conductive material layer may be formed on the color filter layer 23 including the connection hole 35 (refer to FIG. 38B).

Embodiment 2

Figure 9:
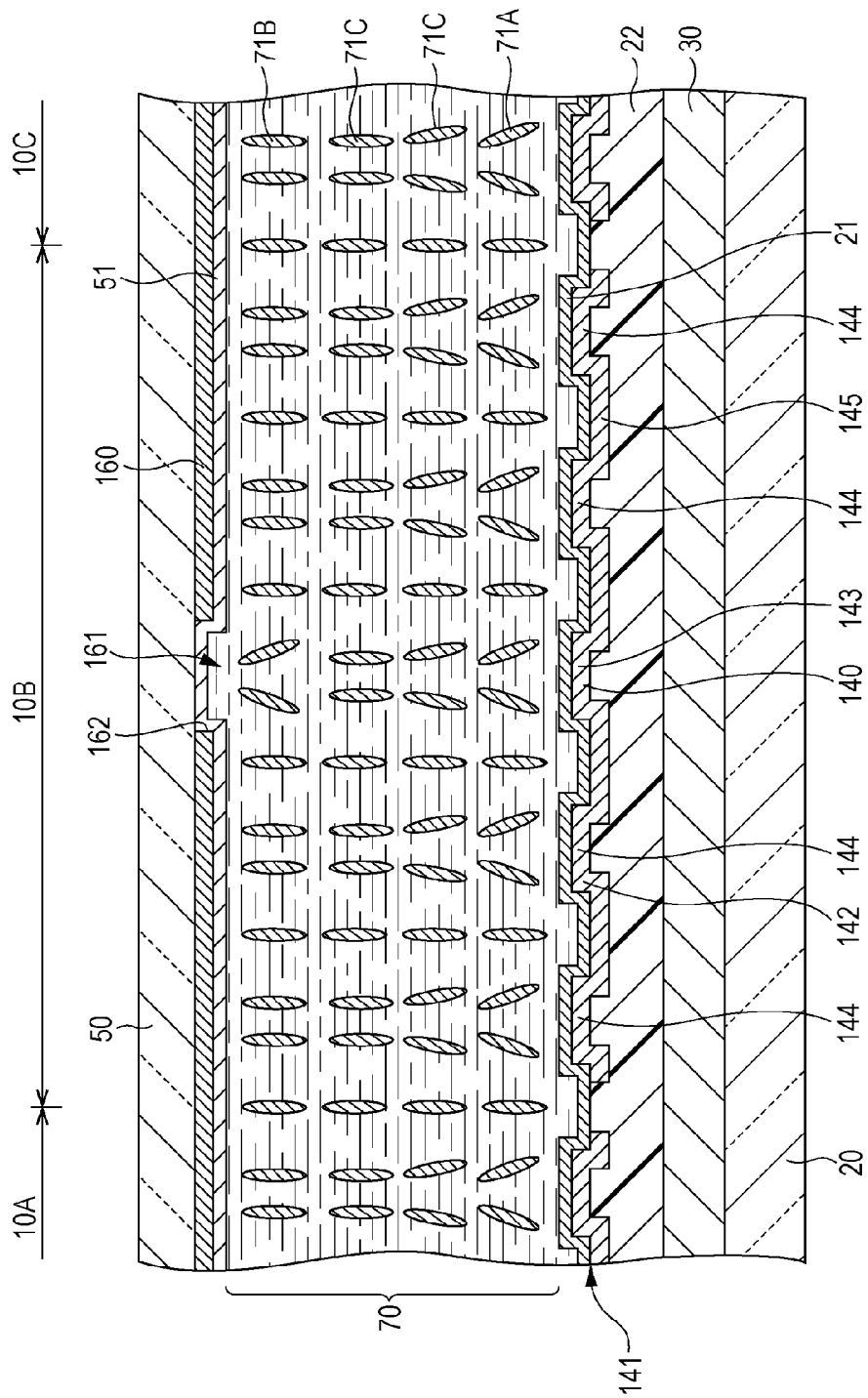
FIG. 9 is a schematic partial end face view of a liquid crystal display device of Embodiment 2.
Figure 10:
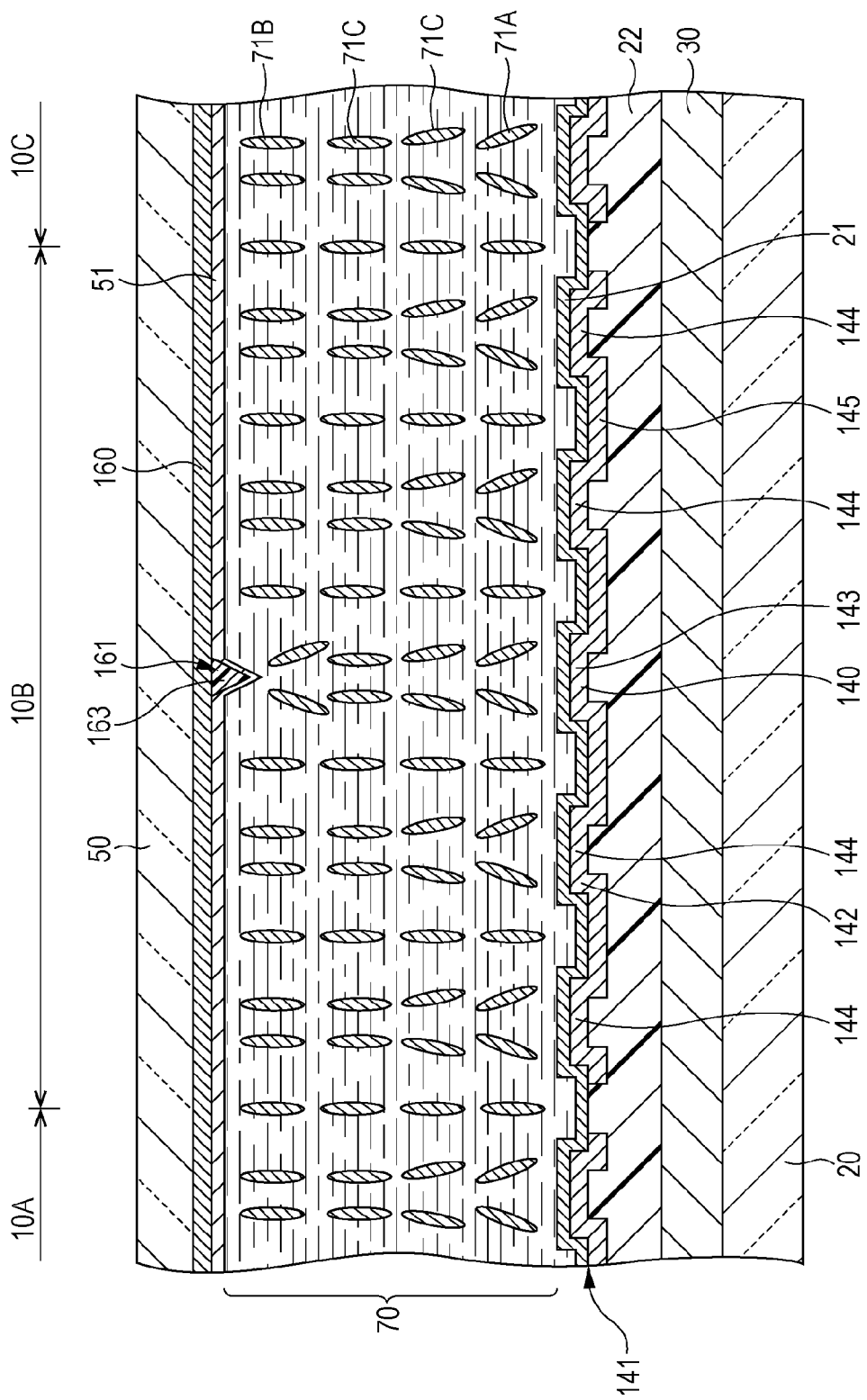
FIG. 10 is a schematic partial end face view of a modification example of a liquid crystal display device of Embodiment 2.
Figure 36B:
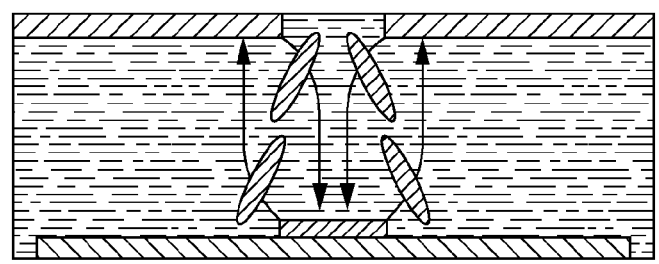
Figure 36C:
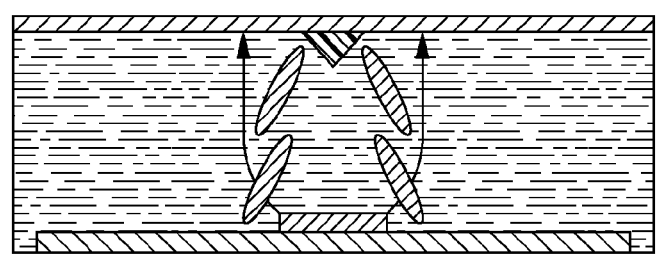

Embodiment 2 is a modification of Embodiment 1. A schematic partial end face view of the liquid crystal display device of Embodiment 2 is shown in FIG. 9 or FIG. 10. In addition, conceptual diagrams showing the behavior of liquid crystal molecules in the liquid crystal display device of Embodiment 2 are shown in FIG. 36B and FIG. 36C. Here, in the liquid crystal display device of Embodiment 2, an alignment regulating portion 161 is formed in the part of the second electrode 160 corresponding to the trunk convex portion 143.

Here, the alignment regulating portion 161, specifically, is formed of a 4.0 μm slit portion 162 provided on the second electrode 160 (refer to FIG. 9 and FIG. 36B) or is formed from a projection (rib) 163 provided on the second electrode (rib) 160 (refer to FIG. 10 and FIG. 36C). The projection 163, more specifically, is formed from a negative photoresist material and has a width of 1.4 μm and a height of 1.2 μm. The planar shape of the slit portion 162 or projection (rib) 163 is cross-shape, and the cross-sectional shape of the projection 163 is an isosceles triangle. A second electrode 160 is not formed on the slit portion 162 or projection 163.

An evaluation of the characteristics in a liquid crystal display device shown in FIG. 9 having an alignment regulating portion 161 formed of 4.0 μm slit portion 162 provided on the second electrode 160, and similar results to Embodiment 1 were obtained. In addition, an evaluation of the characteristics in a liquid crystal display device shown in FIG. 10 having an alignment regulating portion 161 formed of a projection (rib) 163 provided on the second electrode 160, and similar results to Embodiment 1 were obtained.

In the liquid crystal display device of Embodiment 2, since an alignment regulating portion 161 formed of a slit portion 162 is formed on a part of the second electrode 160 corresponding to the trunk convex portion 143, the electric field generated by the second electrode 160 is distorted in the vicinity of the alignment regulating portion 161. Alternatively, since the alignment regulating portion 161 formed of a projection (rib) 163 is formed, the direction in which the liquid crystal molecules fall is regulated in the vicinity of the projection 163. As a result, it is possible to strengthen the alignment regulating force with respect to the liquid crystal molecules in the vicinity of the alignment regulating portion 161, and it is possible to reliably regulate the tilt state of the liquid crystal molecules in the vicinity of the alignment regulating portion 161. Thereby, during image display, it is possible to reliably suppress the occurrence of the problem of dark lines occurring in a part of the image corresponding to the trunk convex portion. That is, it is possible to provide a liquid crystal display device able to realize high transmissivity with improved uniformity while maintaining good voltage response characteristics; possible to achieve cost reductions and reduced power consumption in the light source configuring a backlight, and further to achieve improvements in the reliability of a TFT. Moreover, it is possible to configure the alignment regulating portion 161 from the part of second electrode 160 that becomes projection-like.

Embodiment 3

Figure 11:
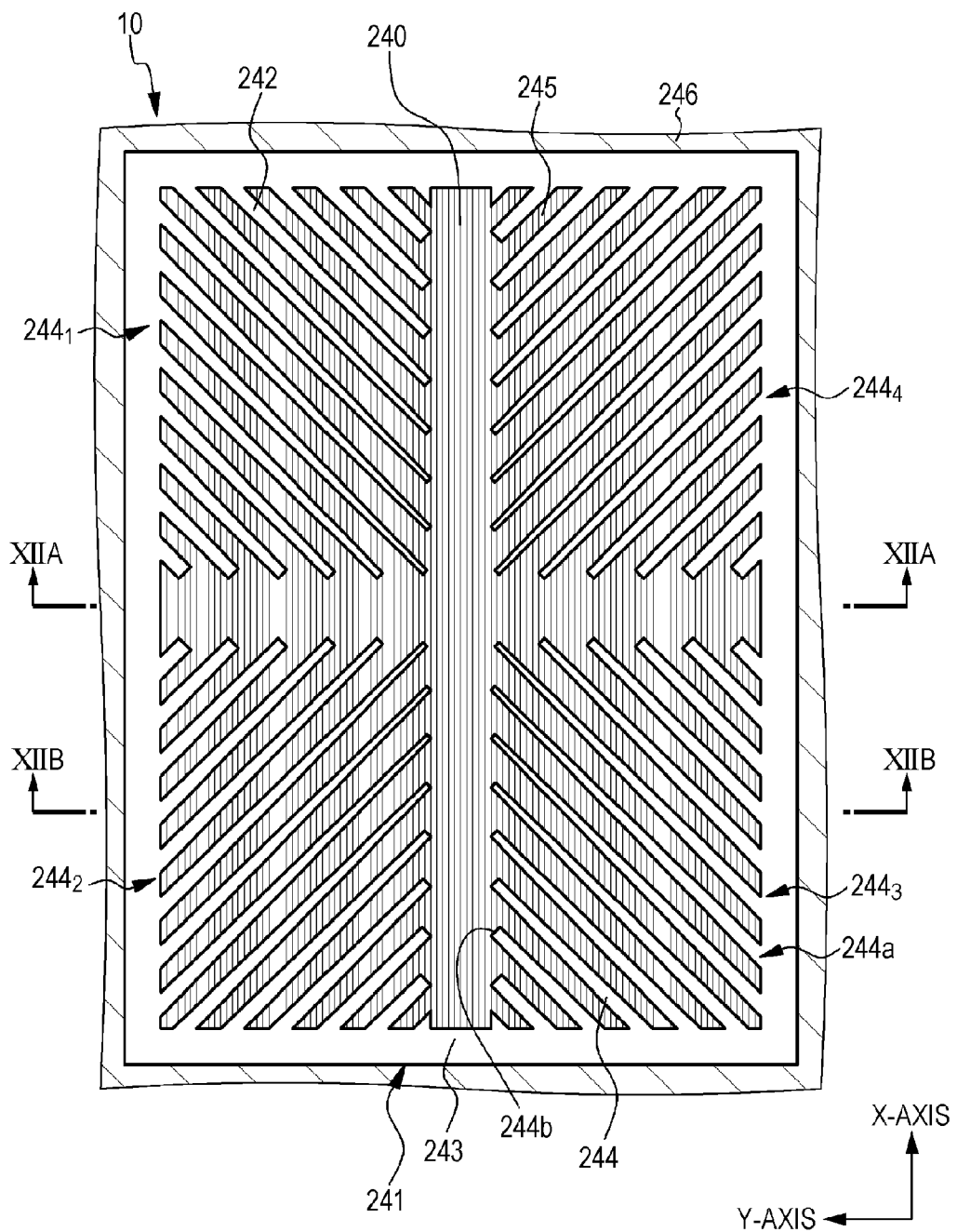
FIG. 11 is a schematic partial end face view of a modification example of a liquid crystal display device of Embodiment 3.
Figure 12A:
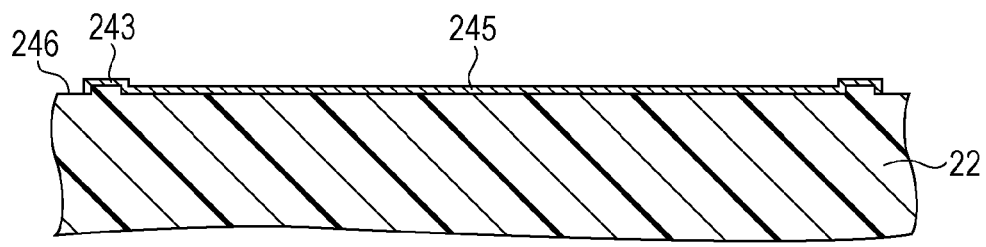
FIGS. 12A and 12B are schematic partial end face diagrams of a first electrode in the liquid crystal display device of Embodiment 3 taken along lines XIIA-XIIA and XIIB-XIIB in FIG. 11.
Figure 12B:
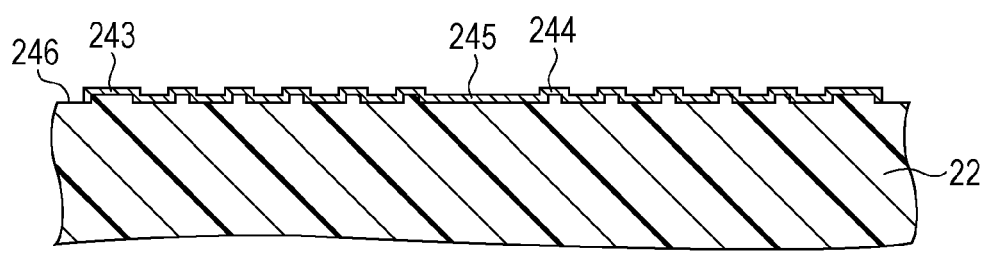
Figure 12C:
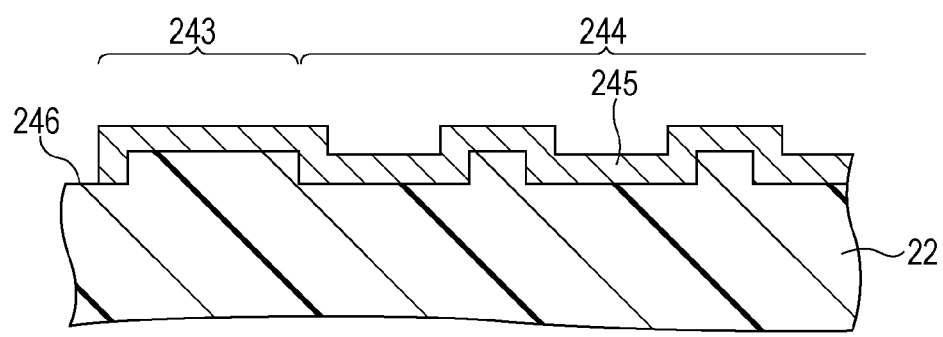
FIG. 12C is an enlarged schematic partial end face diagram of a portion of FIG. 12B.

Embodiment 3 is also a modification of Embodiment 1; however, the Embodiment relates to a liquid crystal display device according to second configuration of the present disclosure. A schematic plan view of a single pixel portion of a first electrode configuring the liquid crystal display device of Embodiment 3 is shown in FIG. 11, schematic partial end face views of a first electrode taken along line XIIA-XIIA and XIIB-XIIB in FIG. 11 are shown in FIG. 12A and FIG. 12B, and an enlarged schematic partial end face view of a portion of FIG. 12B is shown in FIG. 12C.

In Embodiment 3, the uneven portion 241 is configured of a trunk convex portion (main convex portion) 243 formed in a frame-shape at the pixel peripheral portion and a plurality of branch convex portions (sub-convex portions) 244 extending toward the pixel interior from the trunk convex portion 243. Then, even in the liquid crystal display device of Embodiment 3, the plurality of branch convex portions 244 corresponds to a portion of the convex portions provided on the first electrode, the width of the branch convex portion 244 is the widest at the part 244a of the branch convex portion joining the trunk convex portion 243, and becomes wide from the part 244a joining the trunk convex portion 243 towards the tip portion 244b. More specifically, the width of the branch convex portion 244 becomes narrower in a straight line from the part 244a joining the trunk convex portion 243 towards the tip portion 244b. Moreover, reference number 245 represents a concave portion.

Then, in the liquid crystal display device of Embodiment 3, when the (X,Y) coordinate system in which parallel straight lines passing through the central portion of the pixel to the pixel peripheral portion are defined respectively as the X-axis and Y-axis is assumed, a plurality of branch convex portions 244$_1$ occupying the first quadrant extends in parallel in a direction in which the value of the Y-coordinate increases when the value of the X-coordinate is increased, a plurality of branch convex portions 244$_2$ occupying the second quadrant extends in parallel in a direction in which the value of the Y-coordinate increases when the value of the X-coordinate is decreased, a plurality of branch convex portions 244$_3$ occupying the third quadrant extends in parallel in a direction in which the value of the Y-coordinate decreases when the value of the X-coordinate is decreased, and a plurality of branch convex portions 244$_4$ occupying the fourth quadrant extends in parallel in a direction in which the value of the Y-coordinate decreases when the value of the X-coordinate is increased.

Moreover, the plurality of branch convex portions 244$_1$ occupying the first quadrant is extended by the axial lines thereof forming a 45° angle with the X-axis, the plurality of branch convex portions 244$_2$ occupying the second quadrant is extended by the axial lines thereof forming a 135° angle with the X-axis, the plurality of branch convex portions 244$_3$ occupying the third quadrant is extended by the axial lines thereof forming a 225° angle with the X-axis, and the plurality of branch convex portions 244$_4$ occupying the fourth quadrant is extended by the axial lines thereof forming a 315° angle with the X-axis.

Since the configuration and structure of the liquid crystal display device of Embodiment 3 may be the same as the configuration and the structure of the liquid crystal display device of Embodiment 1 other than the above points, a detailed description will not be made.

Embodiment 4

Figure 13:
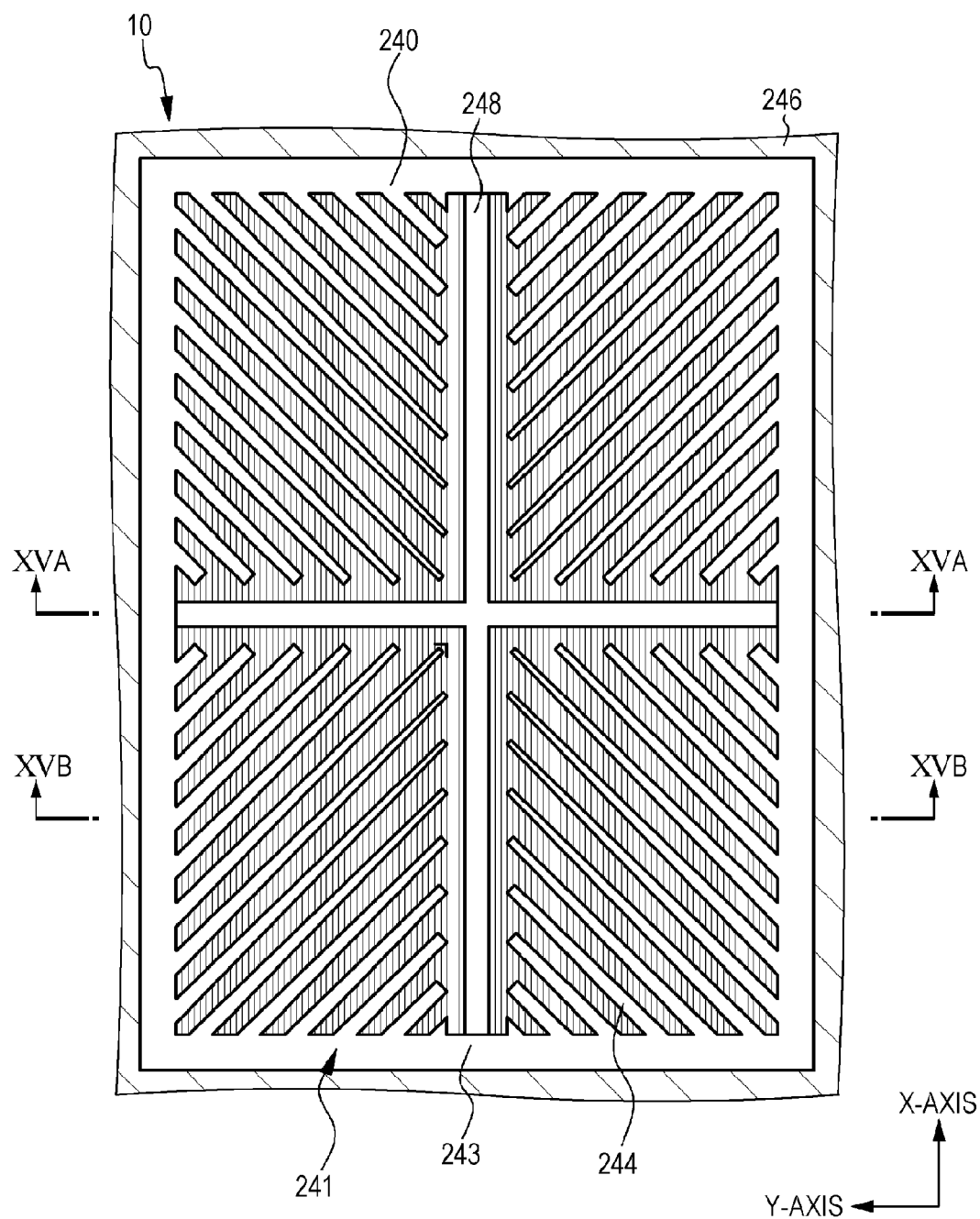
FIG. 13 is a schematic partial end face view of a liquid crystal display device of Embodiment 4.
Figure 14:
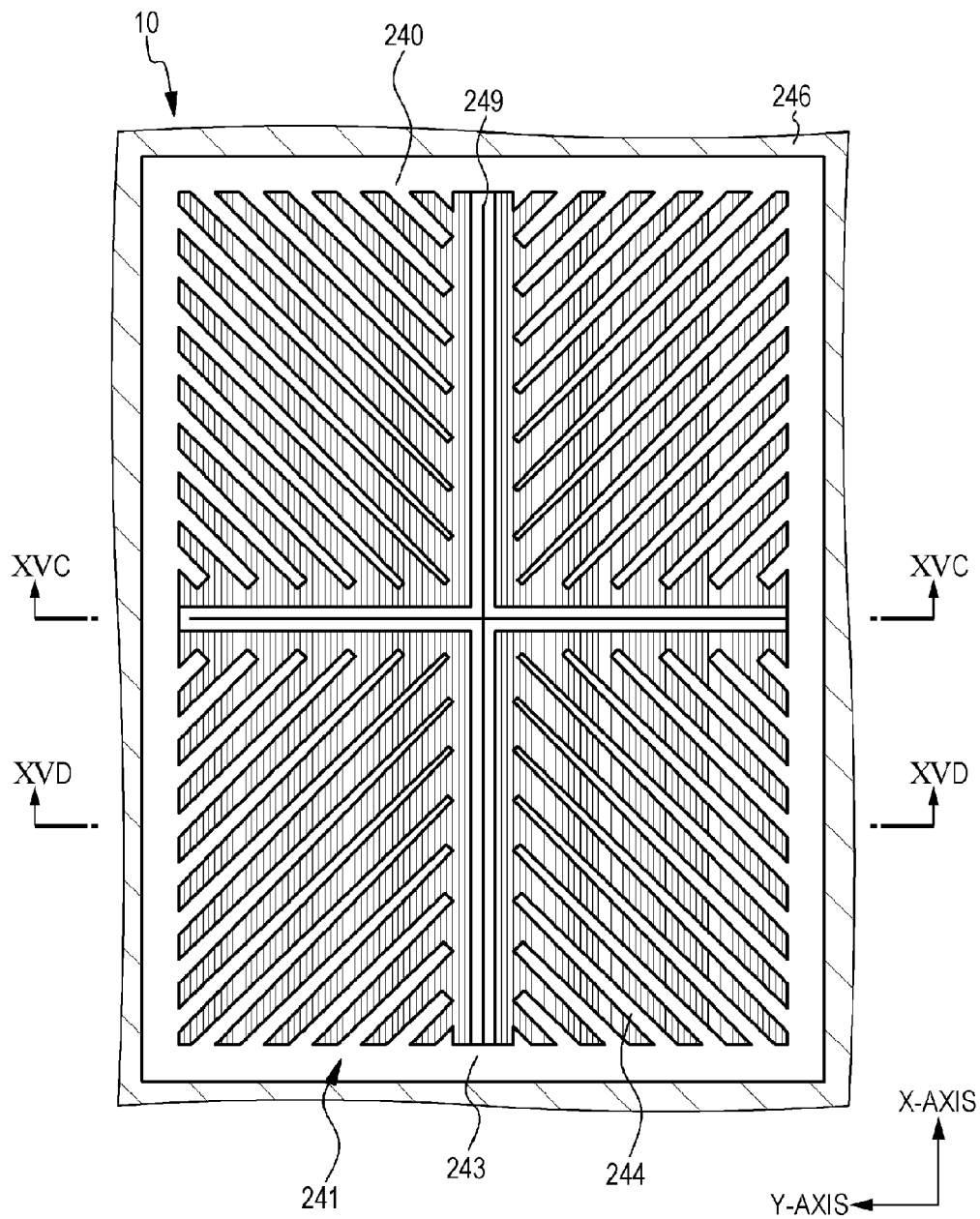
FIG. 14 is a schematic partial end face view of a modification example of a liquid crystal display device of Embodiment 4.
Figure 15A:
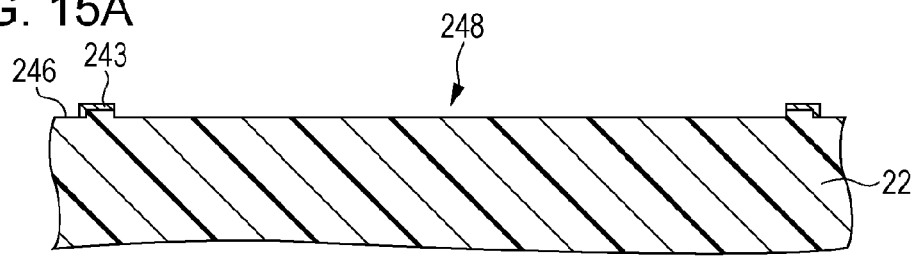
FIGS. 15A and 15B are schematic partial cross-sectional views of a first electrode in the liquid crystal display device of Embodiment 4 shown in FIG. 13 taken along lines XVA-XVA and XVB-XVB in FIG. 13.
Figure 15B:
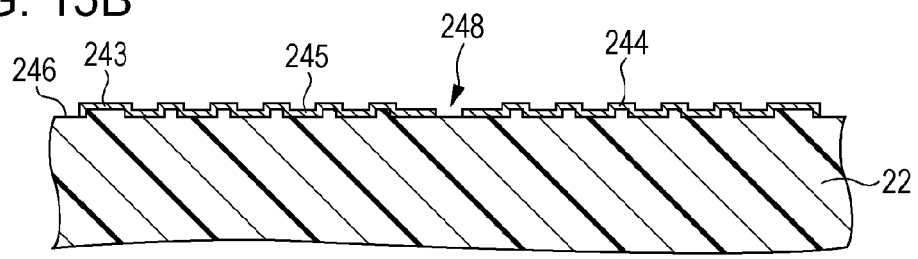
Figure 15C:
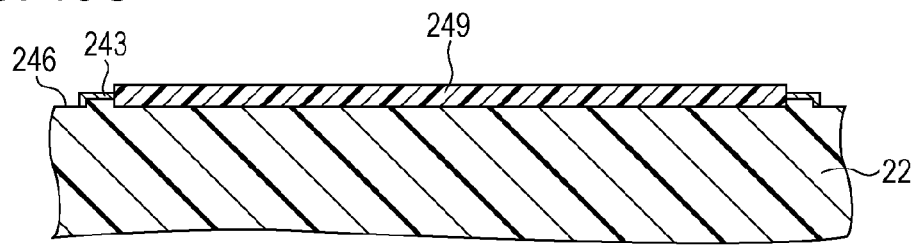
FIGS. 15C and 15D are schematic partial cross-sectional views of a first electrode in a modification example of the liquid crystal display device of Embodiment 4 shown in FIG. 14 taken along lines XVC-XVC and XVD-XVD in FIG. 14.
Figure 15D:
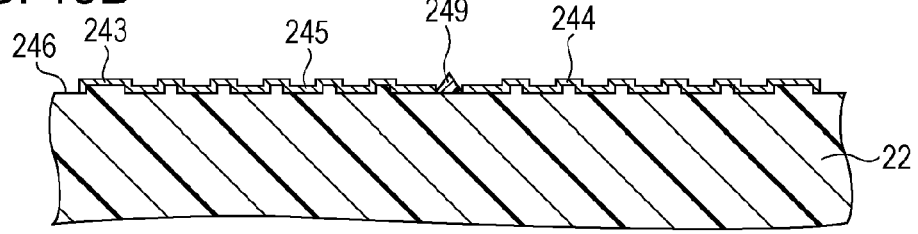

Embodiment 4 is a modification of Embodiment 3. A schematic plan view of a single pixel portion of the first electrode configuring the liquid crystal display device of Embodiment 4 is shown in FIG. 13 and FIG. 14. A schematic partial cross-sectional view of a first electrode taken along line XVA-XVA and XVB-XVB in FIG. 13 is shown in FIG. 15A and FIG. 15B, and a schematic partial cross-sectional view of a first electrode taken along lines XVC-XVC and XVD-XVD in FIG. 14 is shown in FIG. 15C and FIG. 15D.

In Embodiment 4, a slit portion 248 (refer to FIG. 13, FIG. 15A, and FIG. 15B) or a projection (rib) 249 (refer to FIG. 14, FIG. 15C and FIG. 15D) is formed parallel to the pixel peripheral portion passing through the central portion of the pixel on the first electrode 240. That is, a slit portion 248 or projection 249 is formed on a part of the cross-shaped concave portion provided in the central portion of the pixel. The planar shape of the slit portion 248 or the projection 249 is a cross-shape. The width of the slit portion 248 is set to 4.0 μm. In addition, the projection 249 is formed from a negative photoresist material and has a width of 1.4 μm and a height of 1.2 μm. The cross-sectional shape of the projection 249 is an isosceles triangle. A first electrode 240 is not formed on the slit portion 248 or projection 249.

Since the configuration and structure of the liquid crystal display device of Embodiment 4 may be the same as the configuration and the structure of the liquid crystal display device of Embodiment 3 other than the above points, a detailed description will not be made.

In the liquid crystal display device of Embodiment 4, since a slit portion or projection is formed parallel to the pixel peripheral portion passing through the central portion of the pixel is formed on the first electrode, distortion (in a case in which a slit portion is formed) of the electric field generated by the first electrode in the vicinity of the slit portion or the projection or the direction in which the liquid crystal molecules fall is regulated (in a case in which a projection is formed), compared to a case in which a flat uneven portion in which neither a slit portion nor a projection is present is formed on the first electrode. As a result, it is possible to strengthen the alignment regulating force with respect to the liquid crystal molecules in the vicinity of the slit portion or the projection, and it is possible to reliably regulate the tilt state of the liquid crystal molecules in the vicinity of the slit portion or the projection. Thereby, during image display, it is possible to reliably suppress the occurrence of the problem of dark lines occurring in a part of the image corresponding to the trunk convex portion. That is, it is possible to provide a liquid crystal display device able to realize high transmissivity with improved uniformity while maintaining good voltage response characteristics; possible to achieve cost reductions and reduced power consumption in the light source configuring a backlight, and further to achieve improvements in the reliability of a TFT. Moreover, the cross-shaped convex portion passing through the central portion of the pixel may be formed surrounding the concave portion. Such a cross-shaped convex portion may be provided by forming the cross-shaped convex portion on the lower side of the first electrode, or may be provided with the same method as the method of forming the uneven portion on the first electrode. Alternatively, instead of providing the slit portion or the projection (rib), a cross-shaped concave portion passing through the central portion of the may be provided.

Embodiment 5

Figure 16:
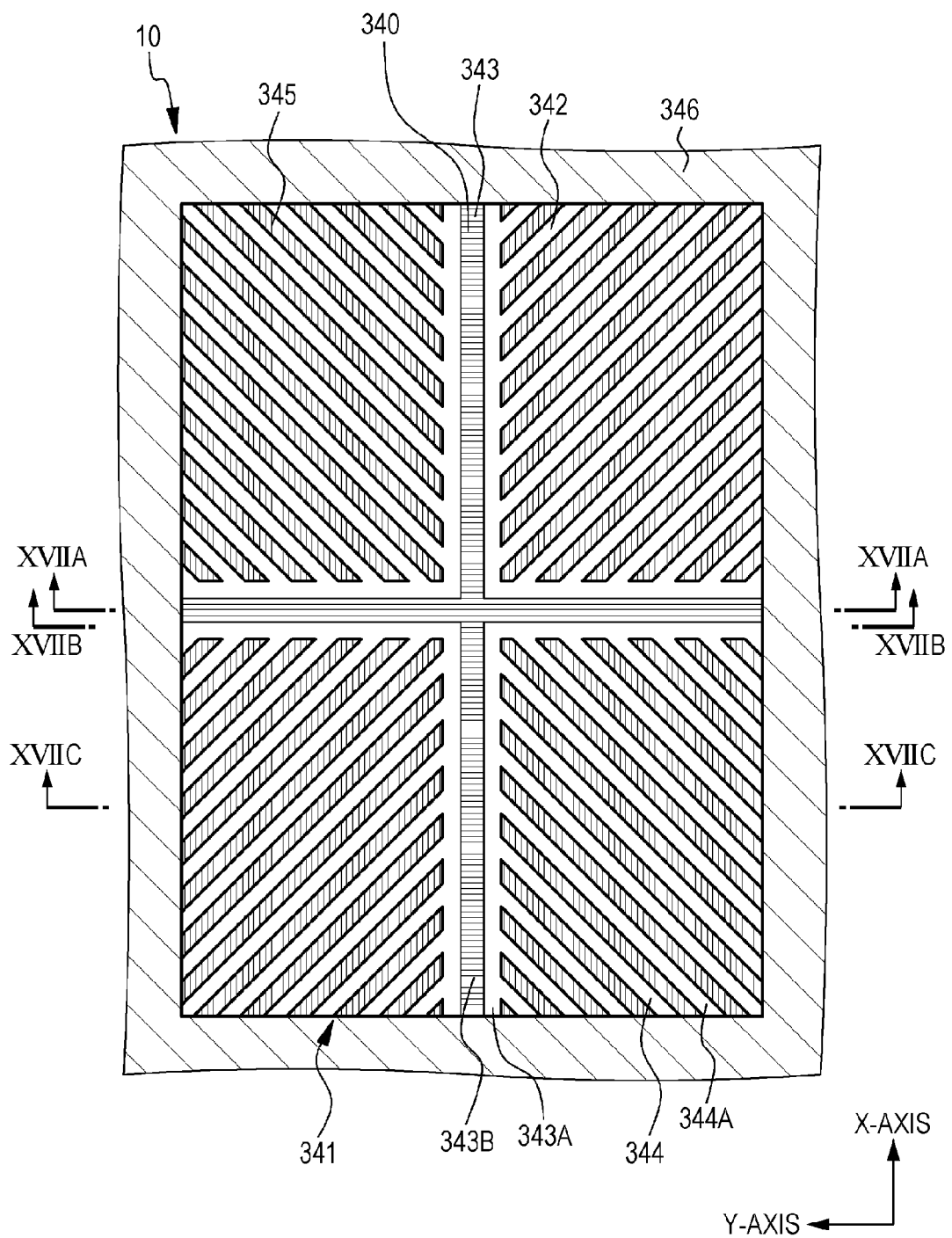
FIG. 16 is a schematic plan view of a single pixel portion of a first electrode configuring the liquid crystal display device of Embodiment 5.
Figure 17A:
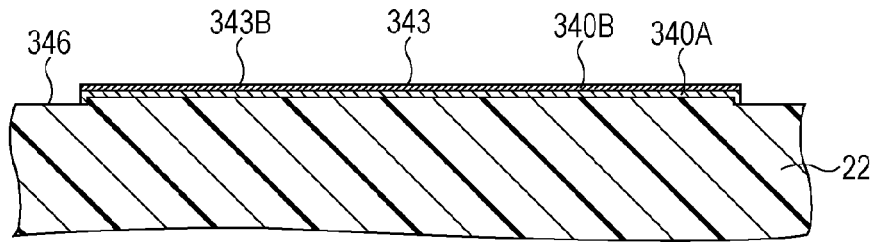
FIGS. 17A, 17B and 17C are schematic partial cross-sectional views of a first electrode in the liquid crystal display device of Embodiment 5 taken along lines XVIIA-XVIIA, XVIIB-XVIIB and XVIIC-XVIIC of FIG. 16.
Figure 17B:
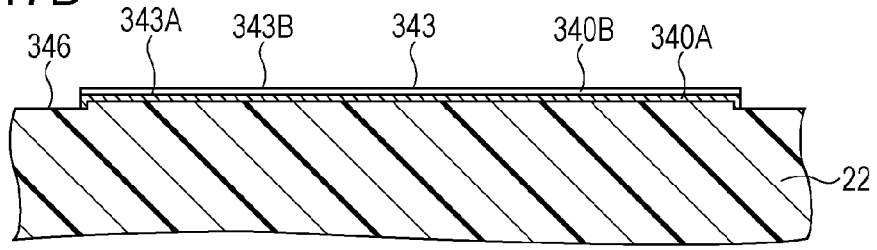
Figure 17C:
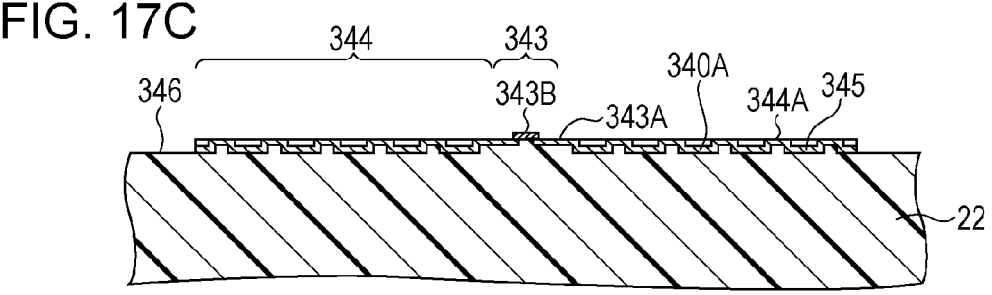
Figure 17D:
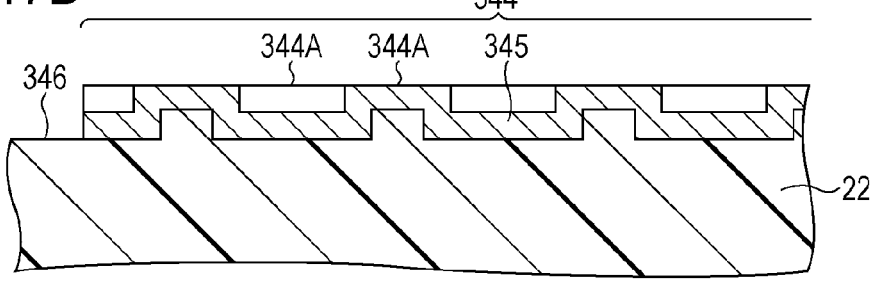
FIG. 17D is an enlarged schematic partial cross-sectional view of a portion of FIG. 17C.

Embodiment 5 relates to a liquid crystal display device according to the third configuration of the present disclosure, and more specifically, to a liquid crystal display device according to configuration 3-A of the present disclosure. A schematic plan view of a single pixel portion of a first electrode configuring the liquid crystal display device of Embodiment 5 is shown in FIG. 16, schematic partial cross-sectional views of a first electrode taken along lines XVIIA-XVIIA, XVIIB-XVIIB and XVIIC-XVIIC in FIG. 16 are shown in FIG. 17A, FIG. 17B and FIG. 17C, and an enlarged schematic partial cross-sectional view of a portion of FIG. 17C is shown in FIG. 17D. The schematic partial end face view of the liquid crystal display device of Embodiment 5 is substantially the same as in FIG. 1.

Moreover, in FIG. 16, FIG. 19, FIG. 20, FIG. 22, FIG. 23, FIG. 24, FIG. 25, FIG. 26, FIG. 28, FIG. 29, FIG. 30, FIG. 31, FIG. 33, and FIG. 34, for simplification of the diagrams, the width of the branch convex portion is drawn as fixed; however, in practice, a taper is conferred on the branch convex portions similarly to Embodiment 1 to Embodiment 4 described above. That is, the width of the branch convex portions is widest at the part of the branch convex portion joining the trunk convex portion, and becomes narrower from the part joining the trunk convex portion towards the tip portion.

In the liquid crystal display device of Embodiment 5, a plurality of uneven portions 341 (convex portions 342 and concave portions 345) are formed on the first electrode 340, and a plurality of step-difference portions is formed on the convex portions 342 provided on the first electrode 340. In addition, the uneven portion 341 is configured of a trunk convex portion (main convex portion) 343 extending in a cross-shape passing through the central portion of the pixel and a plurality of branch convex portions (sub-convex portions) 344 extending from the trunk convex portion 343 towards the pixel peripheral portion. The width of the branch convex portion 344 is the widest at the part of the branch convex portion joining the trunk convex portion 343, and becomes narrower from the part joining the trunk convex portion 343 towards the tip portion (specifically, becomes narrower in a straight line).

Here, the cross-sectional shape of the trunk convex portion 343 when the trunk convex portion 343 is cut along a virtual perpendicular plane orthogonal to the direction in which the trunk convex portion 343 extends has a cross-sectional shape in which the step-difference portions become lower towards the edge of the cross-sectional shape of the trunk convex portion 343 from the center of the cross-sectional shape of the trunk convex portion 343. Specifically, the top face of the trunk convex portion 343 is configured from a top face 343B of the central portion of the trunk convex portion 343 and a top face 343A positioned at both sides of top face 343B. In this way, two step-difference portions are present on the trunk convex portion 343, and when the concave portion 345 is taken as a standard, become higher in the order of top face 343A and the top face 343B. The top face of the branch convex portion 344 is indicated by the reference number 344A; however, the top face 343A of the trunk convex portion 343 and the top face 344A of the branch convex portion 344 are on the same level. In the diagrams, hatching is applied to the top face 343B of the trunk convex portion 343 extending in the lateral direction, and hatching is applied to the concave portion 345 extending in the vertical direction.

The step-difference portion in the trunk convex portion or the branch convex portions described later may be obtained by, for example, (a) formation of a resist material layer on the planarizing layer (or the color filter layer described later) as a base (the planarizing layer and the color filter layer are referred to by the collective name "planarizing layer or the like"), (b) formation of uneven portions in the resist material layer by exposure or development, (c) formation of uneven portions in the planarizing layer or the like by etchback of the resist material layer and the planarizing layer or the like, and (d) formation and patterning of a transparent conductive material layer on the planarizing layer or the like.

Alternatively, the step-difference portion in the trunk convex portion or the branch convex portions described later may be obtained by, for example, (a) formation of a resist material layer on an underlayer formed on the planarizing layer or the like, (b) formation of uneven portions in the resist material layer by exposure or development, (c) formation of uneven portions in an underlayer by etchback of the resist material layer and the planarizing layer or the like, and (d) formation and patterning of a transparent conductive material layer on the underlayer.

Alternatively, the step-difference portion in the trunk convex portion or the branch convex portions described later may be obtained by, for example, (a) formation of a patterned insulating layer on the planarizing layer or the like as a base, (b) formation and patterning of a transparent conductive material layer on the planarizing layer or the like and the insulating layer.

Alternatively, the step-difference portion in the trunk convex portion or the branch convex portions described later may be obtained by, for example, (a) formation of a transparent conductive material layer in the planarizing layer or the like as a base, (b) formation of a resist material layer on the transparent conductive material layer, (c) formation of uneven portions in the resist material layer by exposure or development, and (d) etchback of the resist material layer and the transparent conductive material layer.

Alternatively, the step-difference portion in the trunk convex portion or the branch convex portions described later may be obtained by, for example, (a) formation and patterning of a first transparent conductive material layer (refer to reference number 340A of FIG. 17A and FIG. 17B) in the planarizing layer or the like as a base, and (b) formation and patterning of a first transparent conductive material layer and a second transparent conductive material layer (refer to reference number 340B of FIG. 17A and FIG. 17B) having etching selectivity on the first transparent conductive material layer.

Alternatively, the step-difference portion in the trunk convex portion or the branch convex portions described later, by achieving optimization of the thickness of the planarizing layer, it is possible to form a convex portion on the planarizing layer with influence of the thicknesses of liquid crystal display device constituent elements (for example, various signal lines, supplementary capacitance electrodes, gate electrodes, source/drain electrodes, various wirings) formed on the first substrate or above the first substrate.

Description relating to the above trunk convex portion or branch convex portion may also be applied to other embodiments. In addition, the configuration and structure of the liquid crystal display device of Embodiment 5 may be the same as the configuration and the structure of the liquid crystal display device of Embodiment 1 other than the above points, a detailed description will not be made. Moreover, Embodiment 2 may also be applied to Embodiment 5.

Figure 18A:
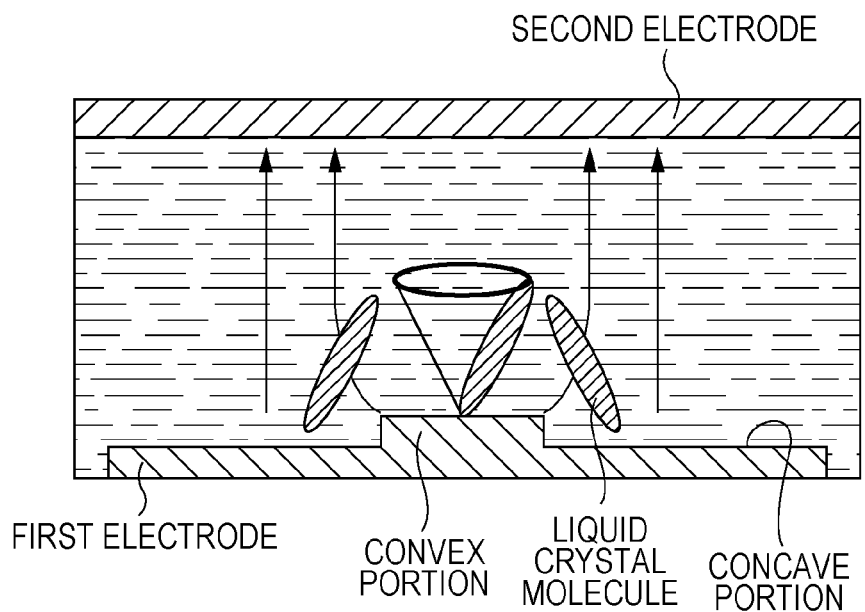
FIGS. 18A and 18B are schematic views for describing the behavior of liquid crystal molecules in each of a liquid crystal display device of the related art and a liquid crystal display device of Embodiment 5.
Figure 18B:
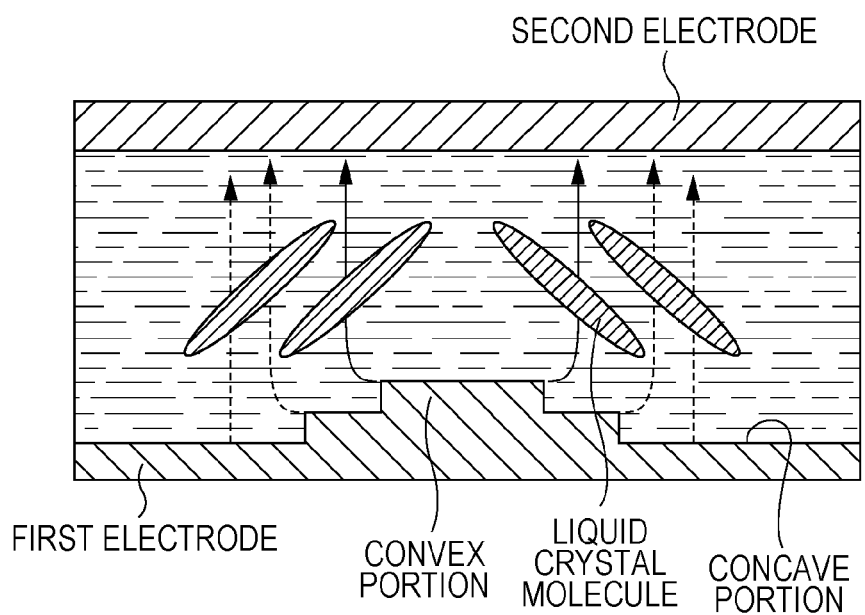

In a liquid crystal display device of the related art, a step-difference portion is not formed on the trunk convex portion. Thereby, as in the behavior of the liquid crystal molecules shown in the conceptual diagram in FIG. 18A, there are cases in which the alignment regulating force with respect to the liquid crystal molecules in the central portion of the trunk convex portion is weak and the tilt state of the liquid crystal molecules in the central portion of the trunk convex portion becomes uncertain. Meanwhile, in Embodiment 5, since a plurality of step-difference portions is formed in the trunk convex portion 343, that is, since a plurality of top faces 343A and 343B is formed on the trunk convex portion 343, the electric field in the central portion of the trunk convex portion 343 is the highest, and the electric field becomes weaker towards the edge portion of the trunk convex portion 343. Thereby, as in the behavior of the liquid crystal molecules shown in the conceptual diagram in FIG. 18B, it is possible to strengthen the alignment regulating force with respect to the liquid crystal molecules in the central portion of the trunk convex portion 343, and it is possible to reliably regulate the tilt state of the liquid crystal molecules in the central portion of the trunk convex portion 343. Thereby, during image display, it is possible to reliably suppress the occurrence of the problem of dark lines occurring in a part of the image corresponding to the central portion of the trunk convex portion 343. That is, it is possible to provide a liquid crystal display device able to realize high transmissivity with improved uniformity while maintaining good voltage response characteristics; possible to achieve cost reductions and reduced power consumption in the light source configuring a backlight, and further to achieve improvements in the reliability of a TFT.

Embodiment 6

Figure 19:
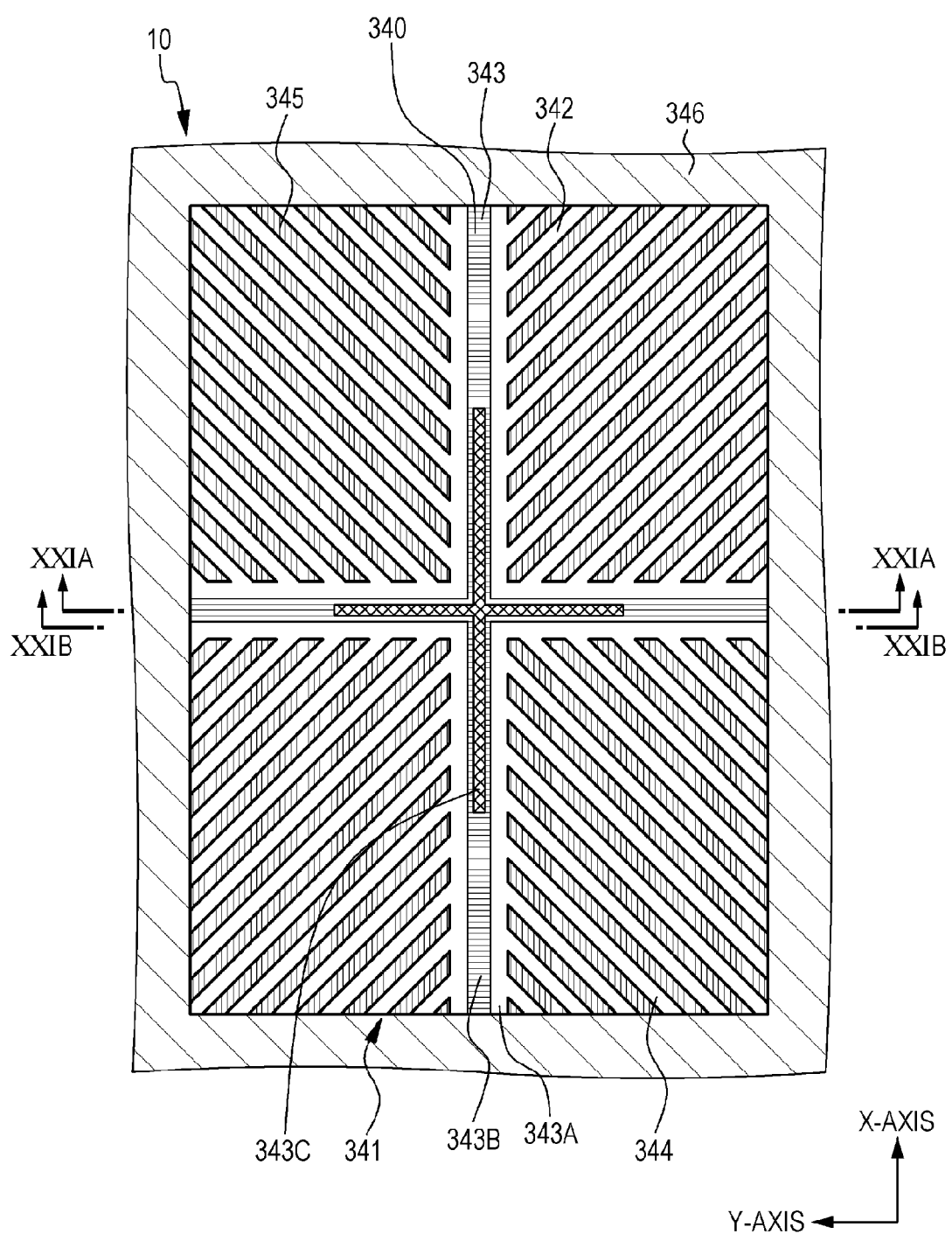
FIG. 19 is a schematic plan view of a single pixel portion of a first electrode configuring the liquid crystal display device of Embodiment 6.
Figure 21A:
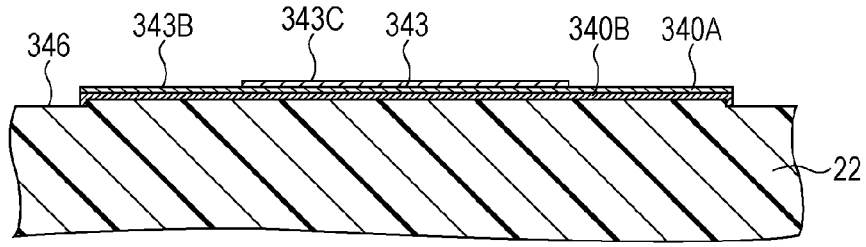
FIGS. 21A and 21B are schematic partial end face diagrams of a first electrode in the liquid crystal display device of Embodiment 6 taken along lines XXIA-XXIA and XXIB-XXIB of FIG. 19.
Figure 21B:
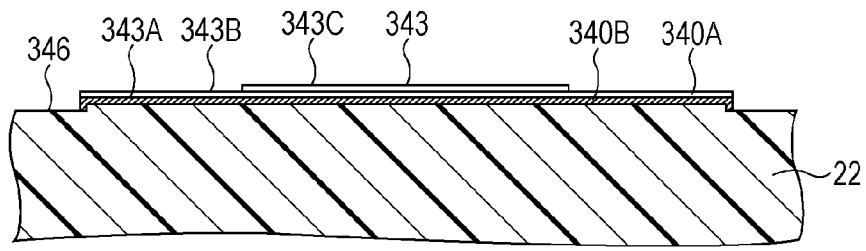

Embodiment 6 is a modification of Embodiment 5. A schematic plan view of a single pixel portion of a first electrode configuring the liquid crystal display device of Embodiment 6 is shown in FIG. 19, and schematic partial cross-sectional views of a first electrode taken along lines XXIA-XXIA and XXIB-XXIB in FIG. 19 are shown in FIG. 21A, and FIG. 21B.

In Embodiment 6, the top face of the trunk convex portion 343 is configured from a top face 343C of the central portion of the trunk convex portion 343, a top face 343B positioned on both sides of the top face 343C and a top face 343A positioned at the outside of top face 343B. In this way, three step-difference portions are present on the trunk convex portion 343, and when, the concave portion 345 is taken as a standard, become higher in the order of the top face 343A, the top face 343B and the top face 343C. In addition, the cross-sectional shape of the trunk convex portion 343 when the trunk convex portion 343 is cut along a virtual perpendicular plane parallel to the direction in which the trunk convex portion 343 extends has a cross-sectional shape (top face 343B and top face 343A) in which the step-difference portions become lower from the central portion (top face 343C) of the cross-sectional shape of the trunk convex portion 343 towards the end portion of the cross-sectional shape of the trunk convex portion 343. Moreover, in the diagrams, cross-hatching is applied to the top face 343C.

Since the configuration and structure of the liquid crystal display device of Embodiment 6 may be the same as the configuration and the structure of the liquid crystal display device of Embodiment 5 other than the above points, a detailed description will not be made.

Embodiment 7

Figure 20:
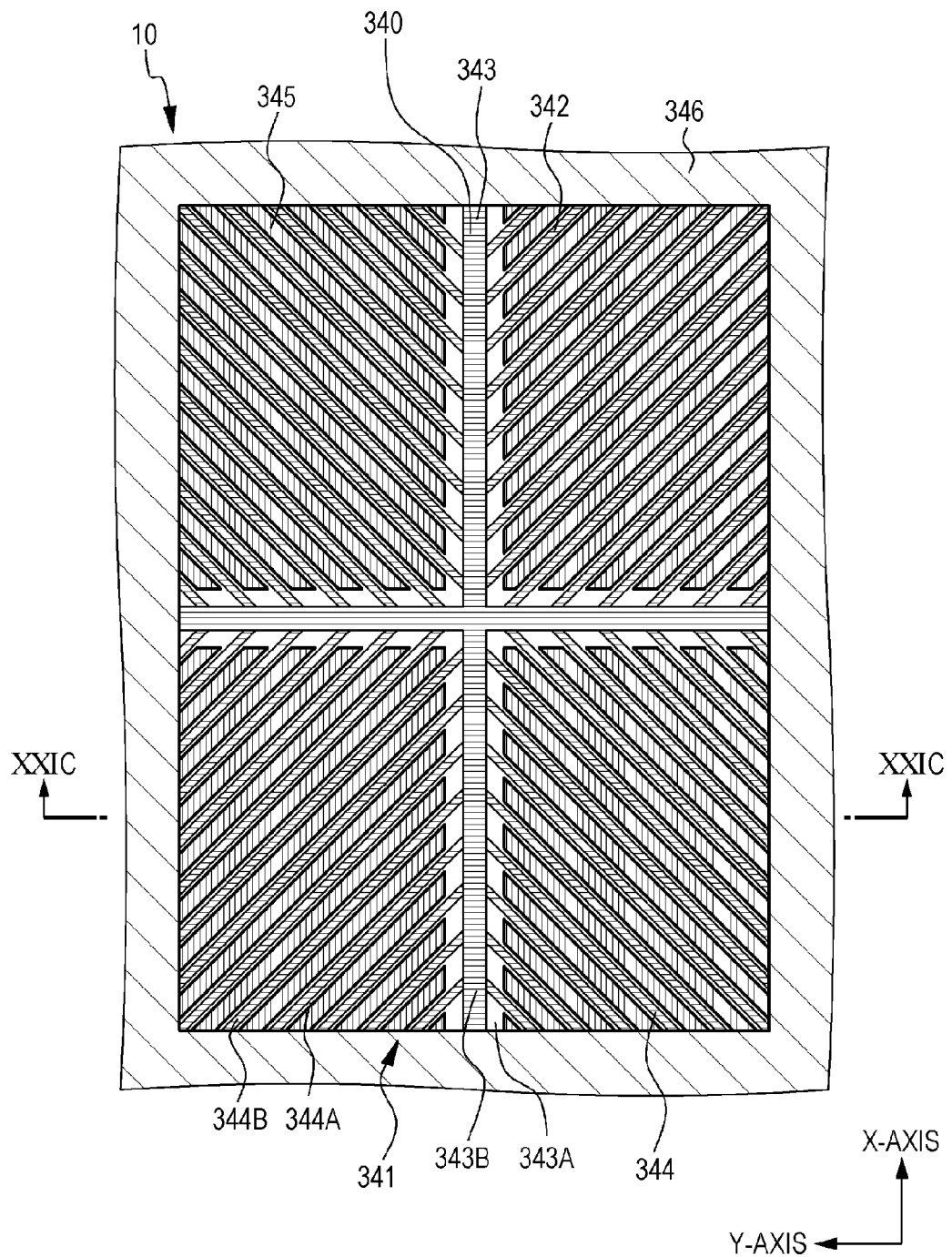
FIG. 20 is a schematic plan view of a single pixel portion of a first electrode configuring the liquid crystal display device of Embodiment 7.
Figure 21C:
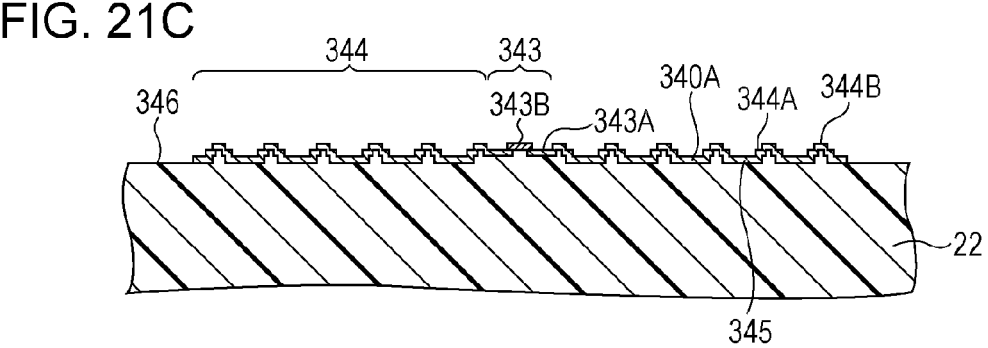
FIG. 21C is a schematic partial end face view of a first substrate in the liquid crystal display device of Embodiment 7 taken along line XXIC-XXIC in FIG. 20.
Figure 21D:
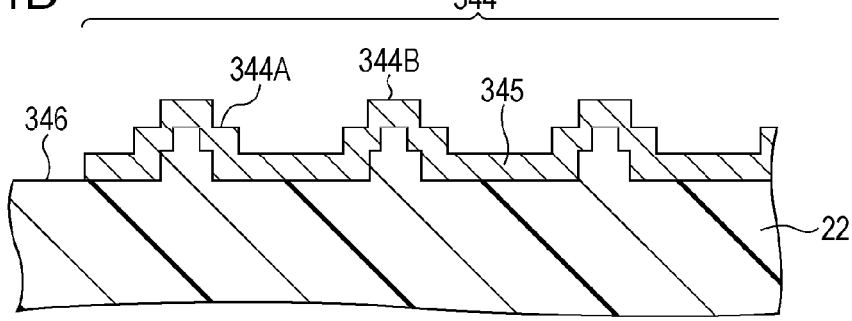
FIG. 21D is an enlarged schematic partial end face view of one portion of FIG. 21C.

Embodiment 7 is also a modification of Embodiment 5. A schematic plan view of a single pixel portion of a first electrode configuring the liquid crystal display device of Embodiment 7 is shown in FIG. 20, a schematic partial end face view of a first electrode taken along the lines XXIC-XXIC in FIG. 20 is shown in FIG. 21C and an enlarged schematic partial end face view of a portion of FIG. 21C is shown in FIG. 21D.

In Embodiment 7, the cross-sectional shape of the branch convex portion 344 when the branch convex portion 344 is cut along a virtual perpendicular plane orthogonal to the direction in which the branch convex portion 344 extends has a cross-sectional shape in which the step-difference portions become lower towards the edge of the cross-sectional shape of the branch convex portion 344 from the center of the cross-sectional shape of the branch convex portion 344. Specifically, the top face of the branch convex portion 344 is configured of a top face 344B extending from the trunk convex portion 343 and a top face 344A positioned on both sides of the top face 344B. In this way, two step-difference portions are present on the branch convex portion 344, and when the concave portion 345 is taken as a standard, become higher in the order of top face 344A and the top face 344B. Moreover, in the diagrams, hatching is applied to the top face 344B extending in the lateral direction. In addition, in FIG. 20, FIG. 22 and FIG. 28, the border between the trunk convex portion and the branch convex portions is represented by a solid line. The height difference between the top face 343B and the top face 343A of the branch convex portion 344 is set to an average of 0.20 μm. The top face 343B of the trunk convex portion 343 and the top face 344B of the branch convex portion 344 are on the same level.

Since the configuration and structure of the liquid crystal display device of Embodiment 7 may be the same as the configuration and the structure of the liquid crystal display device of Embodiment 5 other than the above points, a detailed description will not be made.

Figure 22:
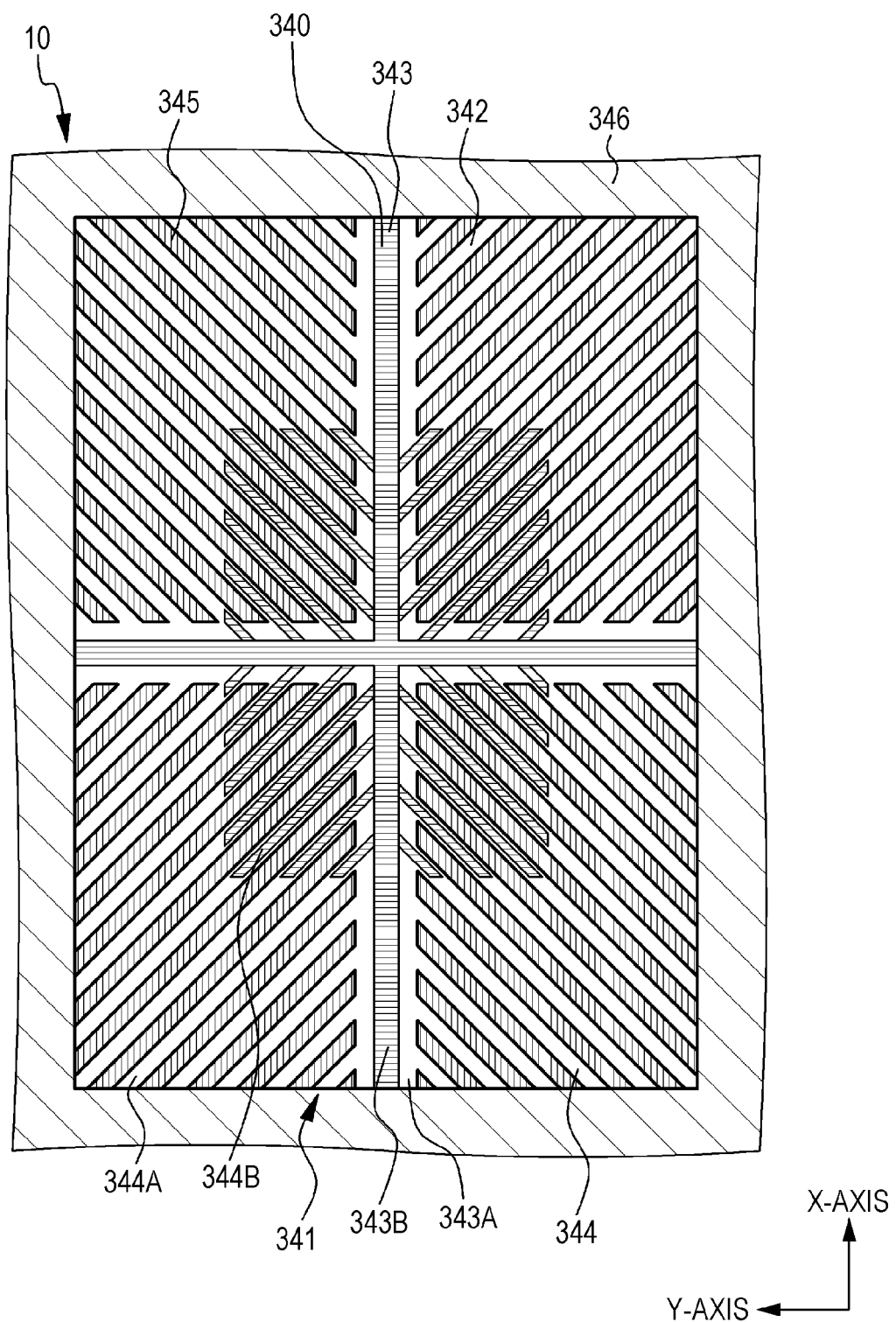
FIG. 22 is a schematic plan view of a single pixel portion of a first electrode configuring the liquid crystal display device of Embodiment 7.
Figure 23:
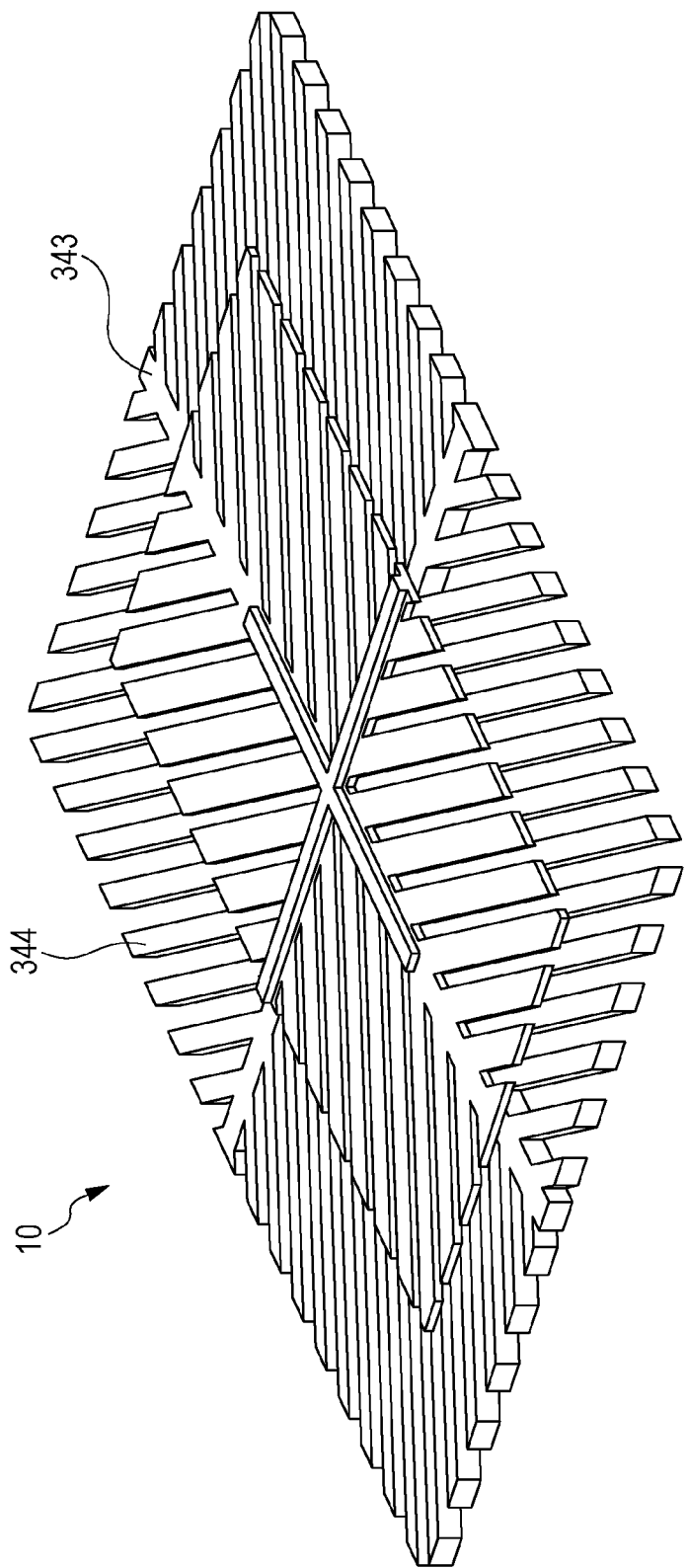
FIG. 23 is a schematic perspective view of another modification example of a single pixel portion of a first electrode configuring the liquid crystal display device of Embodiment 7.

Moreover, as shown by the schematic plan view of a single pixel portion of a first electrode configuring the liquid crystal display device in FIG. 22, the cross-sectional shape of the branch convex portion 344 when the branch convex portion 344 is cut along a virtual perpendicular plane parallel to the direction in which the branch convex portion 344 extends has a cross-sectional shape in which the step-difference portions become lower from the trunk convex portion side of the cross-sectional shape of the branch convex portion 344 towards the end portion of the cross-sectional shape of the branch convex portion 344. In addition, as shown by the schematic perspective view of a single pixel portion of the first electrode configuring the liquid crystal display device in FIG. 23, the trunk convex portion 343 described in Embodiment 6 may be combined therewith.

Embodiment 8

Figure 24:
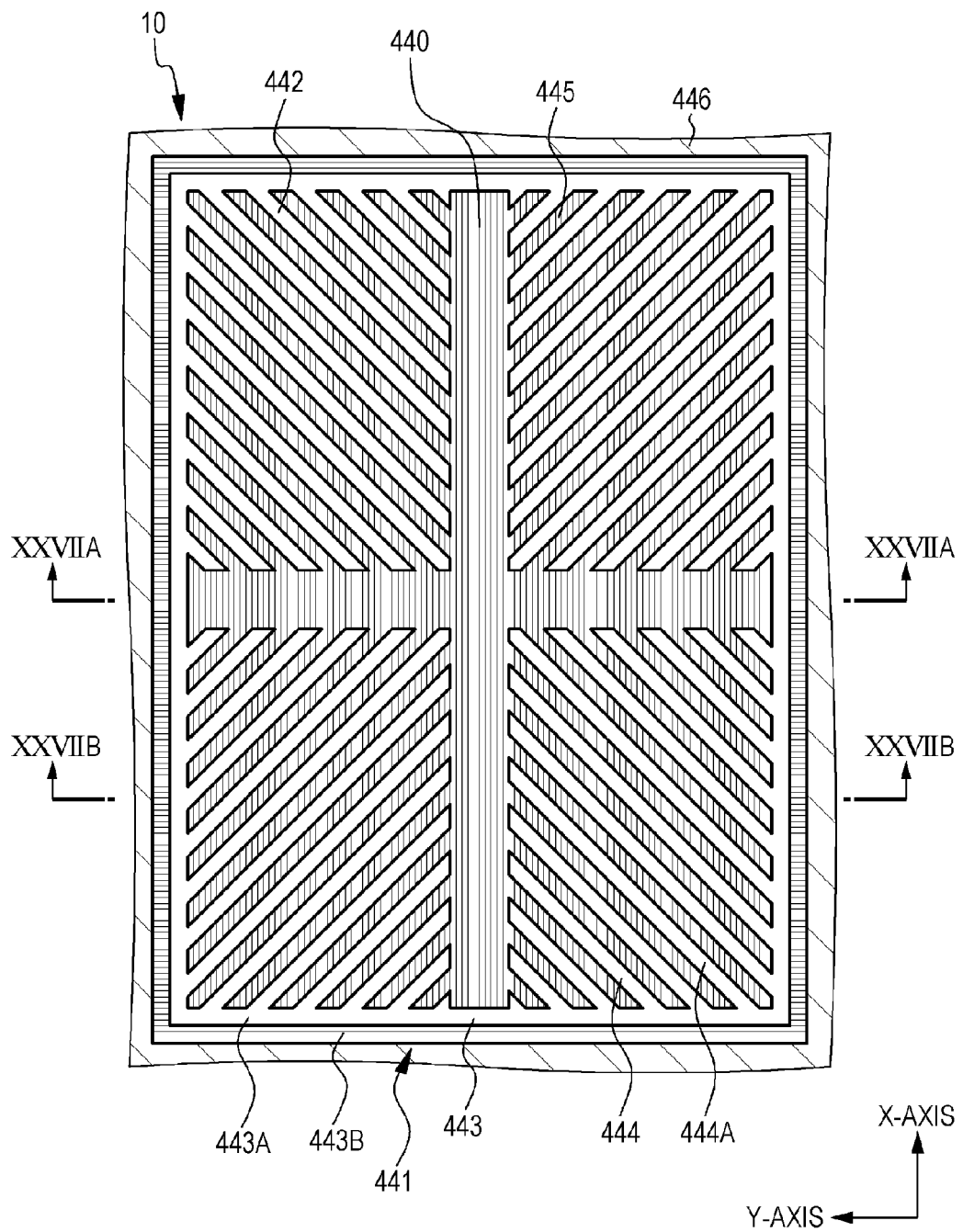
FIG. 24 is a schematic plan view of a single pixel portion of a first electrode configuring the liquid crystal display device of Embodiment 8.
Figure 25:
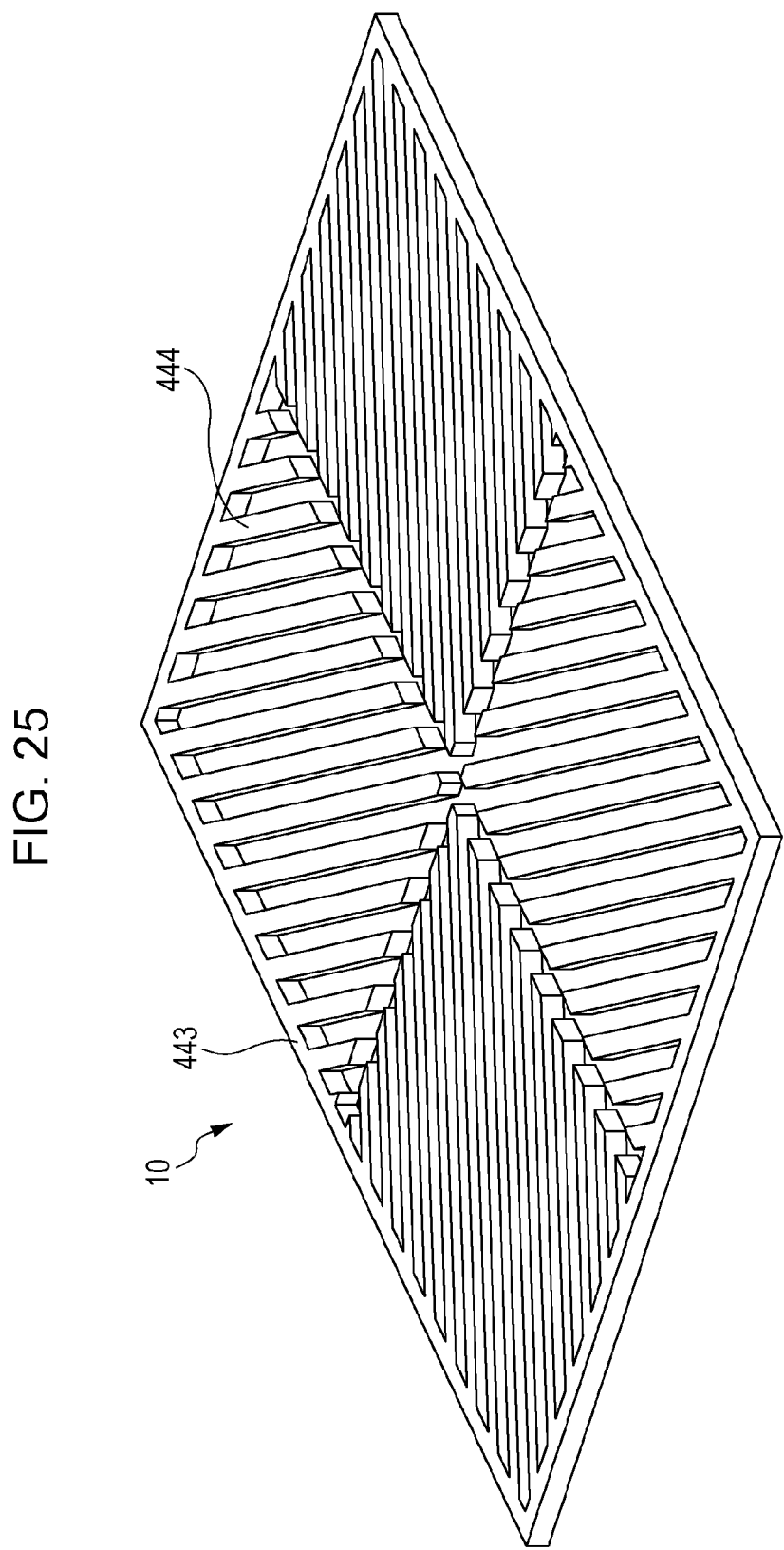
FIG. 25 is a schematic perspective view of a single pixel portion of a first electrode configuring a liquid crystal display device of Embodiment 8 shown in FIG. 24.
Figure 27A:
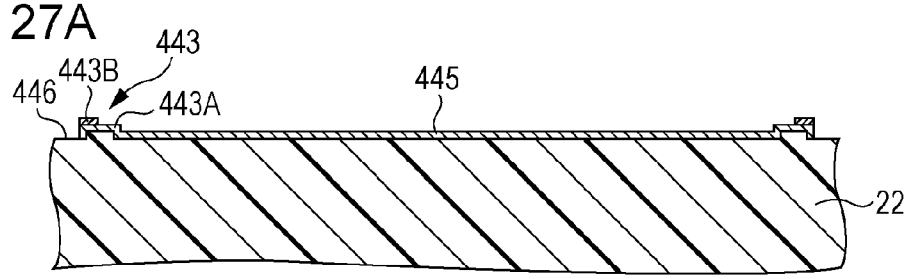
FIGS. 27A and 27B are schematic partial end face diagrams of a first electrode in the liquid crystal display device of Embodiment 8 taken along lines XXVIIA-XXVIIA and XXVIIB-XXVIIB in FIG. 24.
Figure 27B:
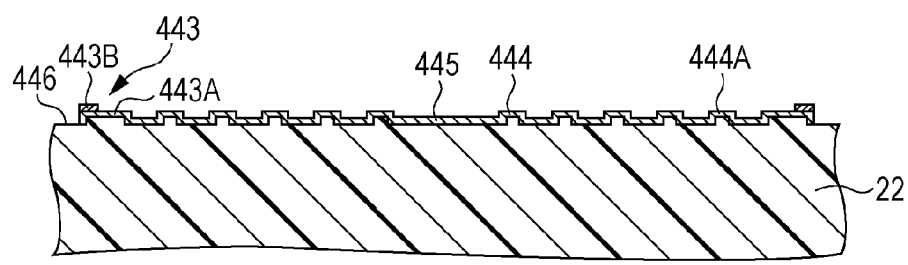
Figure 27C:
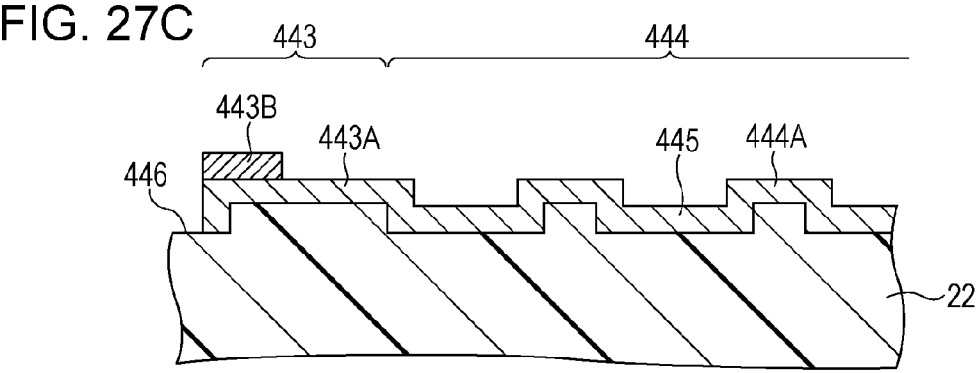
FIG. 27C is an enlarged schematic partial end face diagram of a portion of FIG. 27B.

Embodiment 8 is also a modification of Embodiment 5; however, the embodiment relates to a liquid crystal display device according to configuration 3-B of the present disclosure. A schematic plan view of a single pixel portion of a first electrode configuring the liquid crystal display device of Embodiment 8 is shown in FIG. 24, a schematic perspective view is shown in FIG. 25, schematic partial end face views of a first electrode taken along the lines XXVIIA-XXVIIA and XXVIIB-XXVIIB in FIG. 24 are shown in FIG. 27A and FIG. 27B, and an enlarged schematic partial end face view of a portion of FIG. 27B is shown in FIG. 27C.

Also the liquid crystal display device of Embodiment 8, a plurality of uneven portions 441 (convex portions 442 and concave portions 445) is formed on the first electrode 440, and a plurality of step-difference portions is formed on the convex portions 442 provided on the first electrode 440. Specifically, in the liquid crystal display device of Embodiment 8, the uneven portion 441 is configured from a trunk convex portion (main convex portion) 443 formed in a frame-shape at the pixel peripheral portion and a plurality of branch convex portions (sub-convex portions) 444 extending toward the pixel interior from the trunk convex portion 443. The width of the branch convex portion 444 is the widest at the part of the branch convex portion joining the trunk convex portion 443, and becomes narrower from the part joining the trunk convex portion 443 towards the end portion (specifically, becomes narrower in a straight line).

Here, the cross-sectional shape of the trunk convex portion 443 when the trunk convex portion 443 is cut along a virtual perpendicular plane orthogonal to the direction in which the trunk convex portion 443 extends has a cross-sectional shape in which the step-difference portions become lower from the edge of the outside of the cross-sectional shape of the trunk convex portion 443 towards the edge of the inside of the cross-sectional shape of the trunk convex portion 443. Specifically, the top face of the trunk convex portion 443 is configured of a top face 443B in the vicinity of the edge portion of the outside and a top face 443A in the vicinity of the edge portion of the inside of the trunk convex portion 443. In this way, two step-difference portions are present on the trunk convex portion 443, and when the concave portion 445 is taken as a standard, become higher in the order of the top face 443A and the top face 443B. Moreover, the top face of the branch convex portion 444 is indicated by the reference number 444A; however, the top face 443A of the trunk convex portion 443 and the top face 444A of the branch convex portion 444 are on the same level. In the diagrams, hatching extending in the lateral direction is applied to the top face 443B of the trunk convex portion 443, and hatching extending in the vertical direction is applied to the concave portion 445. The shape of a part of the concave portion positioned at the central portion of the pixel is substantially cross-shaped.

In addition, the configuration and structure of the liquid crystal display device of Embodiment 8 may be the same as the configuration and the structure of the liquid crystal display device described in Embodiment 3 or Embodiment 5 other than the above points. Moreover, Embodiment 4 may also be applied to Embodiment 8.

In Embodiment 8, since a plurality of step-difference portions is formed in the trunk convex portion 443, the electric field is the highest at the edge portion of the outside of the trunk convex portion 443, and the electric field becomes low towards the edge portion of the inside of the trunk convex portion 443. As a result, it is possible to strengthen the alignment regulating force with respect to the liquid crystal molecules in the trunk convex portion 443, and it is possible to reliably regulate the tilt state of the liquid crystal molecules in the trunk convex portion 443. Thereby, during image display, it is possible to reliably suppress the occurrence of the problem of dark lines occurring in a part of the image corresponding to the trunk convex portion 443. That is, it is possible to provide a liquid crystal display device able to realize high transmissivity with improved uniformity while maintaining good voltage response characteristics; possible to achieve cost reductions and reduced power consumption in the light source configuring a backlight, and further to achieve improvements in the reliability of a TFT.

Embodiment 9

Figure 26:
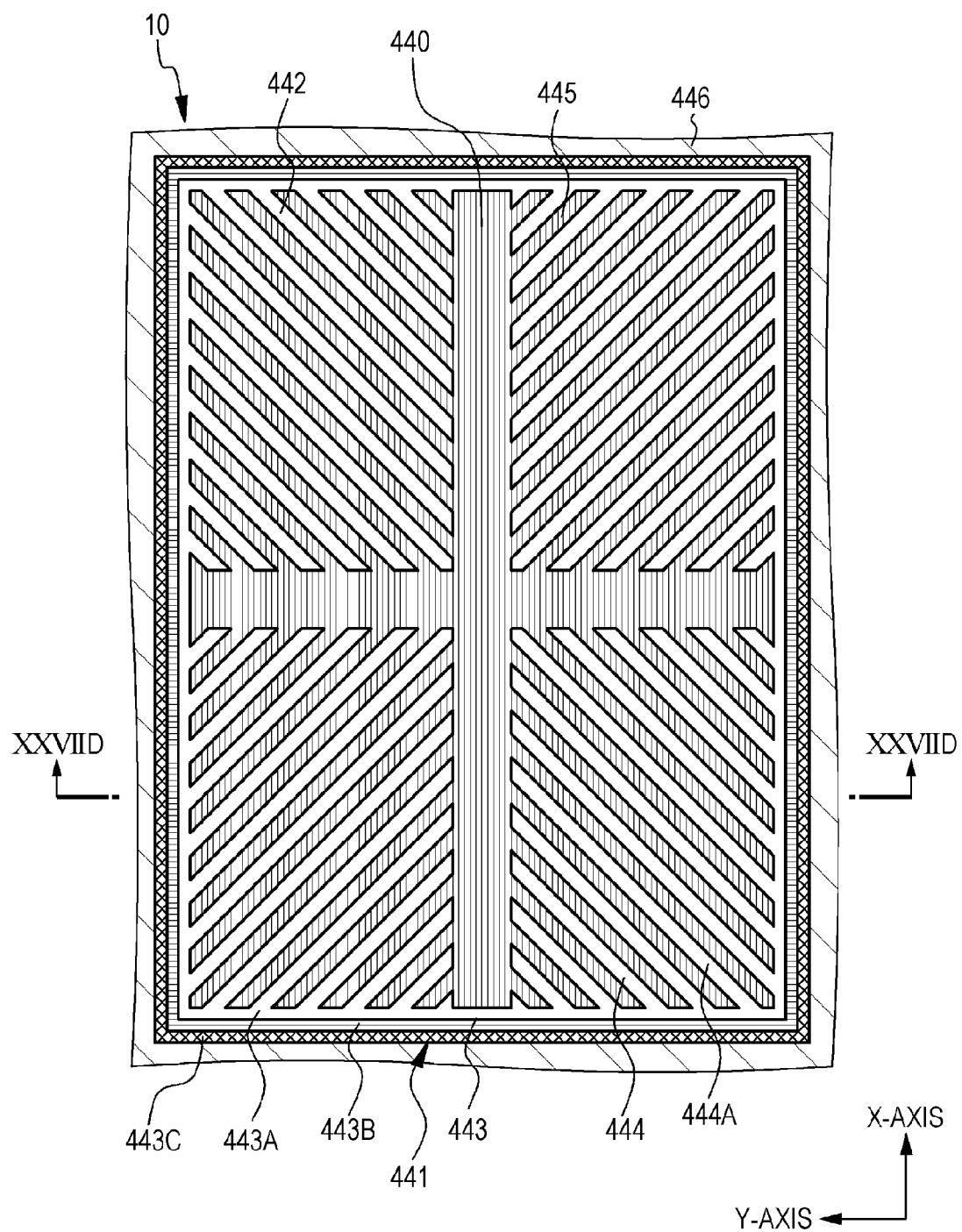
FIG. 26 is a schematic plan view of a single pixel portion of a first electrode configuring the liquid crystal display device of Embodiment 9.
Figure 27D:
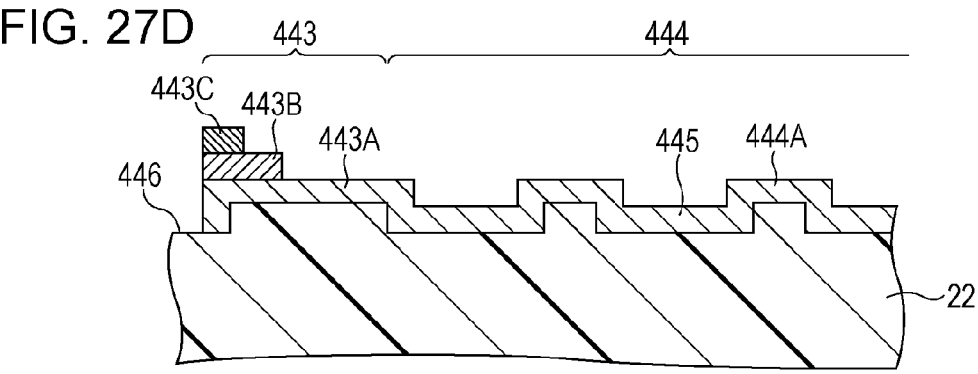
FIG. 27D is an enlarged schematic partial end face view of a portion of a first electrode in a liquid crystal display device of Embodiment 9 taken along line XXVIIID-XXVIIID in FIG. 26.

Embodiment 9 is a modification of Embodiment 8. A schematic plan view of a single pixel portion of the first electrode configuring the liquid crystal display device of the Embodiment 9 is shown in FIG. 26, and an enlarged schematic partial end face view of a first electrode taken along line XXVIID-XXIIVD in FIG. 26 is shown in FIG. 27D.

In Embodiment 9, the top face of the trunk convex portion 443 is configured of a top face 443C in the vicinity of the edge portion of the outside of the trunk convex portion 443, along with the top face 443B and top face 443A towards the edge portion of the inside. In so doing, three step-difference portions are present on the trunk convex portion 443, and when the concave portion 445 is taken as a standard, becomes higher in top face 443A, the top face 443B and the top face 443C. Moreover, in the diagrams, cross-hatching is applied to the top face 443C. The height difference between the top face 443C and the top face 443B of the trunk convex portion 443 and the height difference between the top face 443B and the top face 443A are set to an average of 0.20 μm.

Since the configuration and structure of the liquid crystal display device of Embodiment 9 may be the same as the configuration and the structure of the liquid crystal display device of Embodiment 8 other than the above points, a detailed description will not be made.

Embodiment 10

Figure 28:
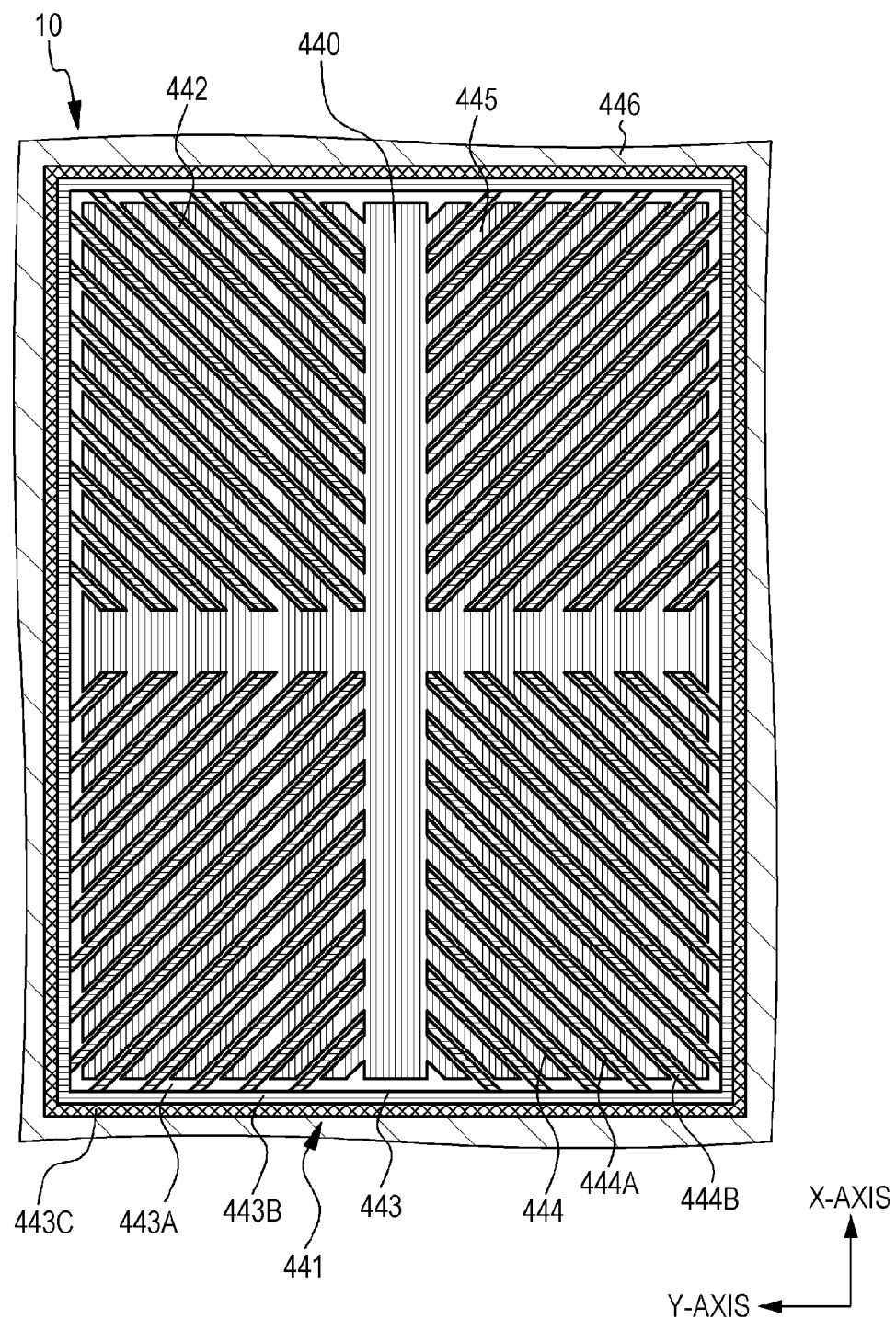
FIG. 28 is a schematic plan view of a single pixel portion of a first electrode configuring the liquid crystal display device of Embodiment 10.

Embodiment 10 is a modification of Embodiment 9. A schematic plan view of a single pixel portion of a first electrode configuring the liquid crystal display device of Embodiment 10 is shown in FIG. 28.

In Embodiment 10, the cross-sectional shape of the branch convex portion 444 when the branch convex portion 444 is cut along a virtual perpendicular plane orthogonal to the direction in which the branch convex portion 444 extends has a cross-sectional shape in which the step-difference portions become lower from the center of the cross-sectional shape of the branch convex portion 444 towards the edge of the cross-sectional shape of the branch convex portion 444. Specifically, the top face of the branch convex portion 444 is configured of a top face 444B extending from a top face 443B of the trunk convex portion 443 and a top face 444A positioned on both sides of the top face 444B. Then, when the concave portion 445 is taken as a standard, two step-difference portions are present in the branch convex portion 444, and become higher in the top face 444A and the top face 444B. Moreover, in the diagrams, hatching is applied to the top face 444B extending in the lateral direction. The height difference between the top face 443B and the top face 443A of the branch convex portion 444 is set to an average of 0.28 μm. The top face 443B of the trunk convex portion 443 and the top face 444B of the branch convex portion 444 are on the same level.

Figure 29:
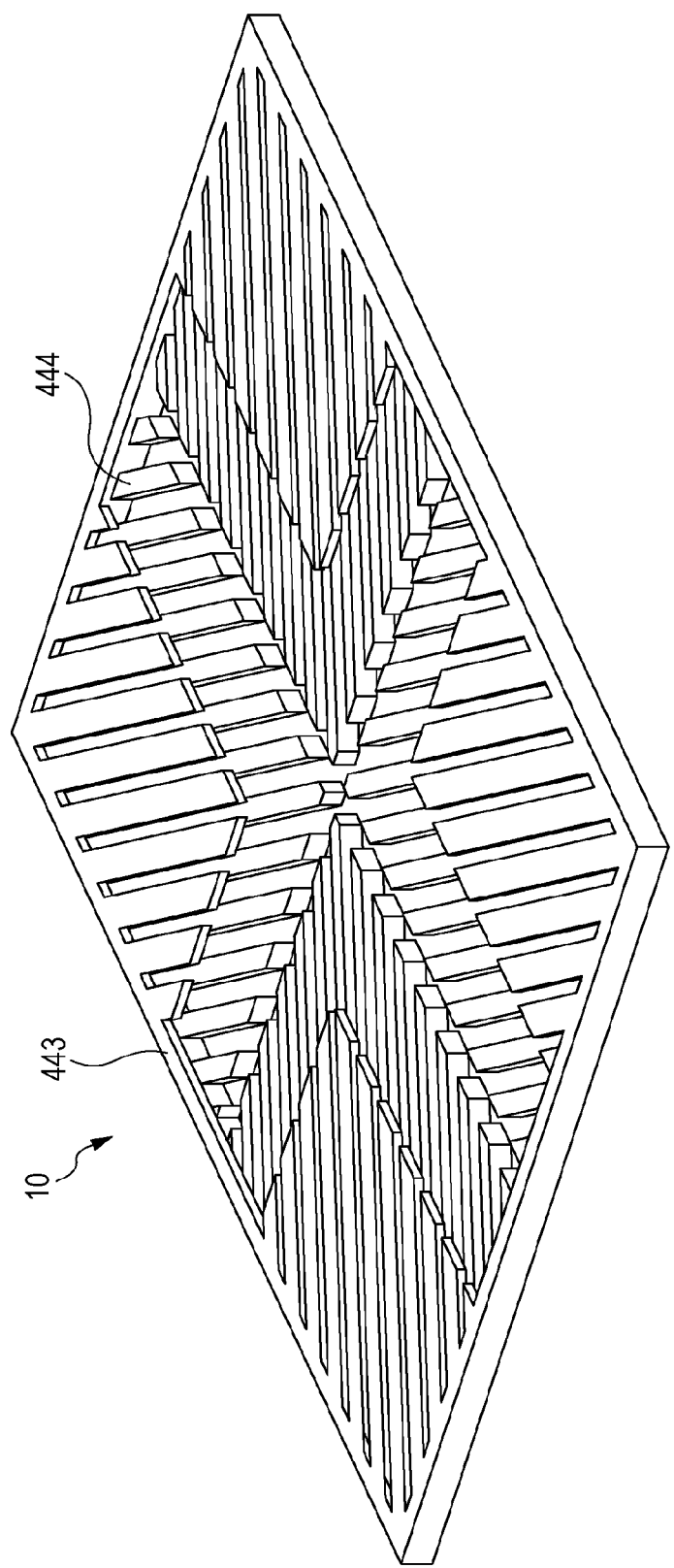
FIG. 29 is a schematic perspective view of a modification example of a single pixel portion of a first electrode configuring the liquid crystal display device of Embodiment 10.

Moreover, as shown by the schematic plan view of a single pixel portion of a first electrode configuring the liquid crystal display device of Embodiment 10 in FIG. 29, the cross-sectional shape of the branch convex portion 444 when the branch convex portion 444 is cut along a virtual perpendicular plane parallel to the direction in which the branch convex portion 444 extends has a cross-sectional shape in which the step-difference portions become lower from the trunk convex portion side of the cross-sectional shape of the branch convex portion 444 towards the end portion of the cross-sectional shape of the branch convex portion 444.

Since the configuration and structure of the liquid crystal display device of Embodiment 10 may be the same as the configuration and the structure of the liquid crystal display device of Embodiment 8 other than the above points, a detailed description will not be made. Moreover, similarly to Embodiment 8, the top face of the trunk convex portion 443 is configured from a top face 443B and a top face 443A positioned at both sides of the top face 443B.

Embodiment 11

Figure 30:
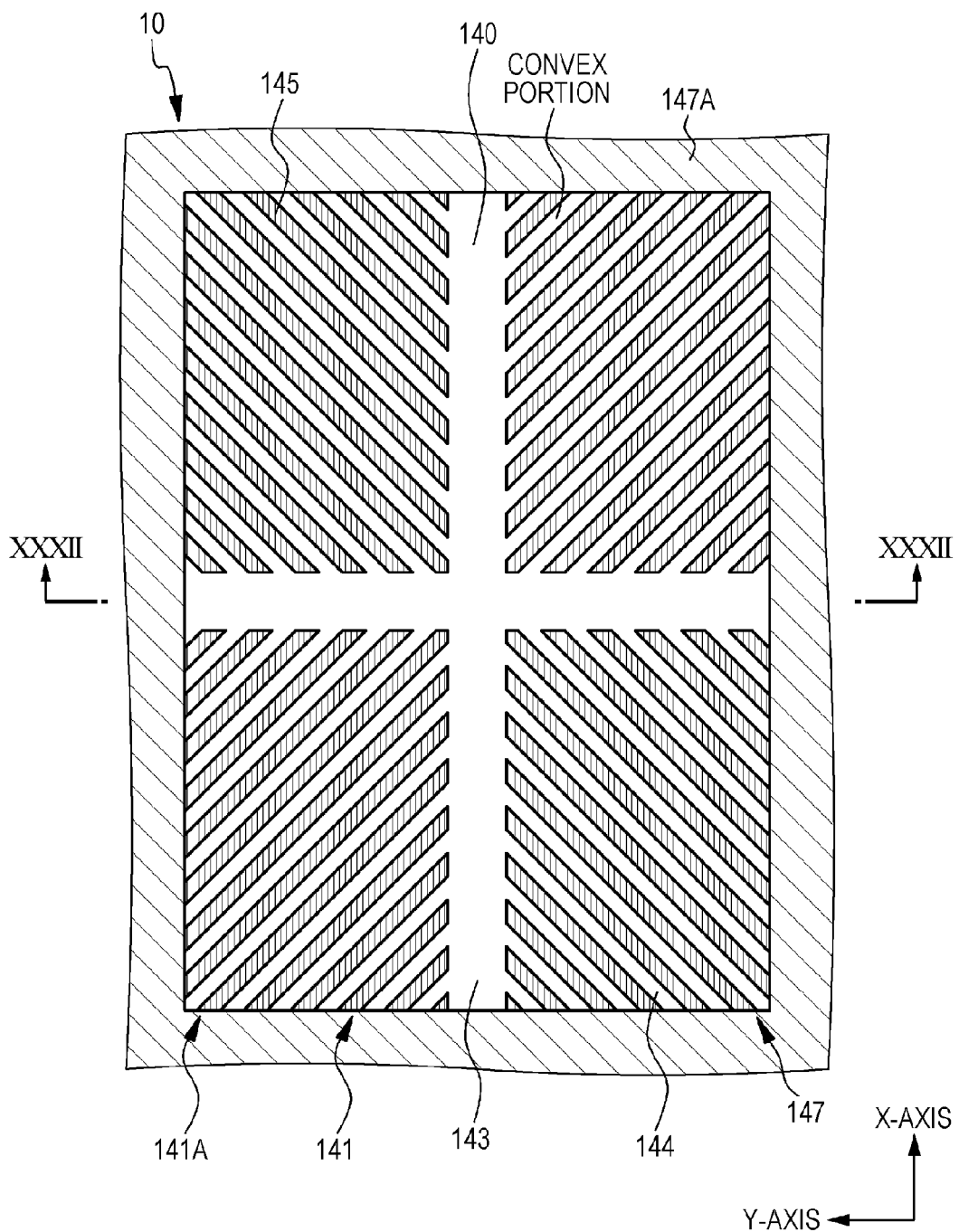
FIG. 30 is a schematic plan view of a single pixel portion of a first electrode configuring the liquid crystal display device of Embodiment 11.
Figure 31:
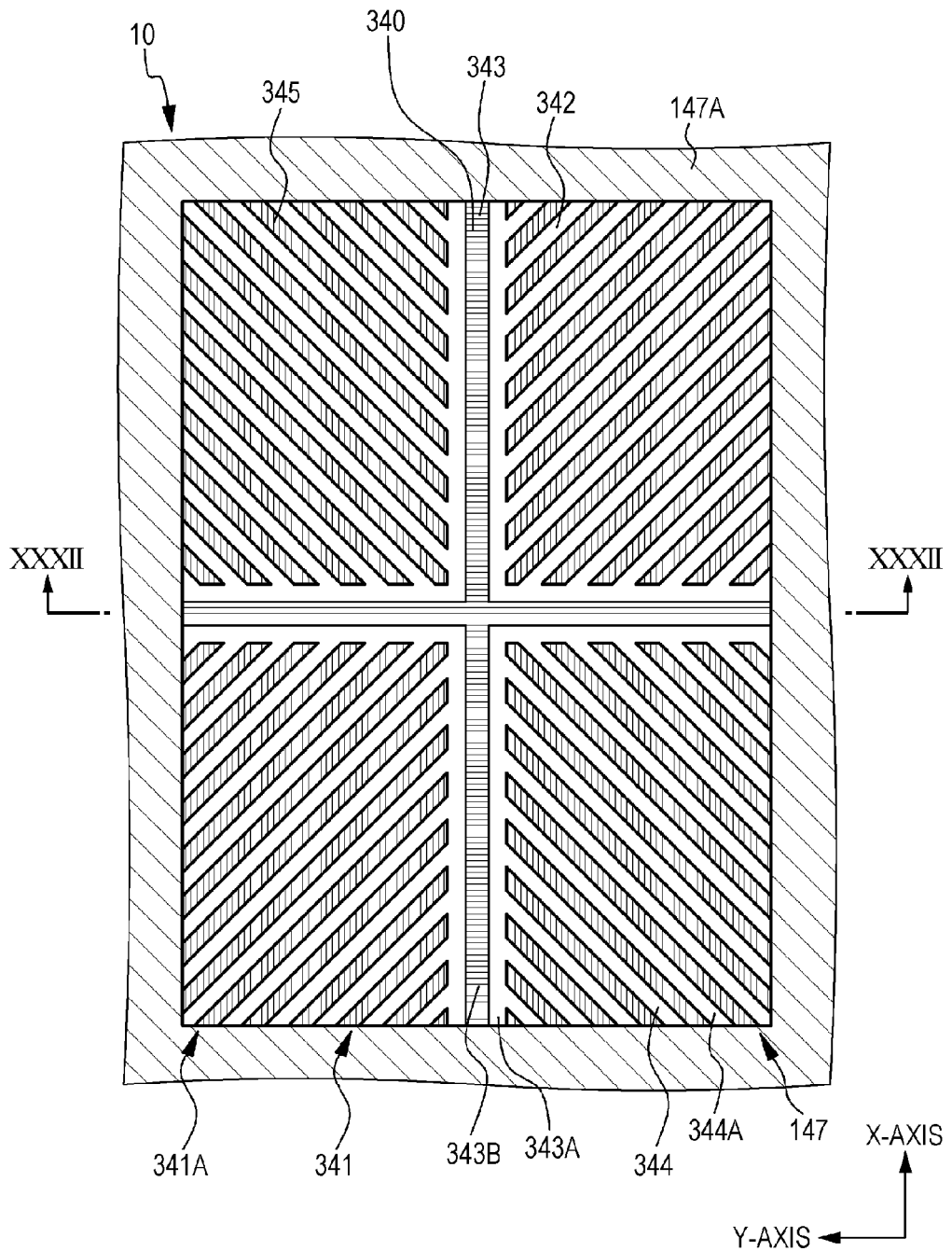
FIG. 31 is a schematic plan view of a single pixel portion of a first electrode configuring the liquid crystal display device of Embodiment 11.
Figure 32A:
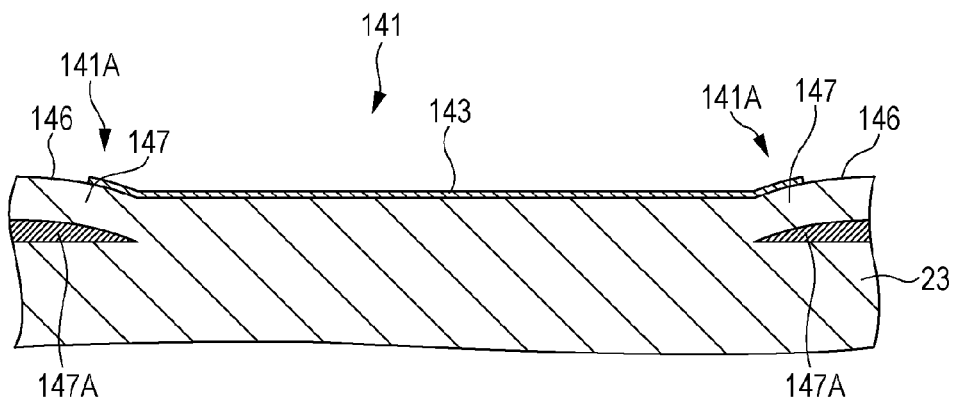
FIGS. 32A and 32B are each schematic partial cross-sectional views of a first electrode in a liquid crystal display device of Embodiment 11 taken along lines XXXIIA-XXXIIA in FIG. 30 and XXXIIA-XXXIIA in FIG. 31.
Figure 32B:
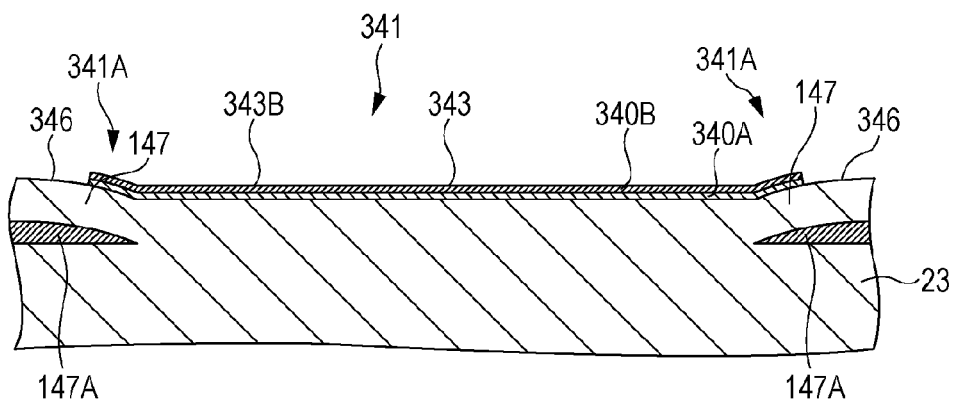

Embodiment 11 is a modification of the liquid crystal display device described in Embodiments 1 and 2, and Embodiments 5 to 7, or relates to a liquid crystal display device according to configuration 4-A of the present disclosure. A schematic plan view of a single pixel portion of the first electrode configuring the liquid crystal display device of Embodiment 11 is shown in FIG. 30; however the example shown in FIG. 30 is a modification of Embodiment 1. Alternatively, a schematic plan view of a single pixel portion of the first electrode configuring the liquid crystal display device of Embodiment 11 is shown in FIG. 31; in the liquid crystal display device (modification of Embodiment 5), a plurality of uneven portions 341 is formed, and a plurality of step-difference portions is formed on the first electrode 340. A schematic partial cross-sectional view of the first electrode along the lines XXXIIA-XXXIIA in FIG. 30 and XXXIIA-XXXIIA in FIG. 31 is shown in FIG. 32A and FIG. 32B.

In a liquid crystal display device of Embodiment 11, a plurality of uneven portions 141 and 341 is formed on the first electrodes 140 and 340, a convex structure 147 is formed from a part of a first substrate positioned between a pixel 10 and a pixel 10 across a part of the first substrate corresponding to the pixel peripheral portion, and the peripheral portions 141A and 341A of the uneven portions 141 and 341 are formed on the convex structure 147. Here, the convex structure 147, specifically, is formed based on a black matrix 147A formed on a color filter layer 23. The black matrix 147A is formed of a photo-curable resin to which carbon is added. In FIG. 31, the height difference between the top face 343B and the top face 343A of the trunk convex portion 343 is set to an average of 0.20 μm. In addition, the height from the planarizing layer 22 to the end portion of the uneven portions 141, 341 is an average of 0.3 μm.

In the liquid crystal display device of Embodiment 11 or Embodiment 12 described later, since the peripheral portions 141A, 241A, 341A and 441A of the uneven portions 141, 241, 341 and 441 are formed on the convex structure 147, a much stronger electric field occurs at the peripheral portions of the uneven portions compared to a case in which the peripheral portions of the uneven portions are parallel. As a result, it is possible to strengthen the alignment regulating force with respect to the liquid crystal molecules in the peripheral portions 141A, 241A, 341A and 441A of the uneven portions 141, 241, 341, and 441, and possible to reliably regulate the tilt state of the liquid crystal molecules in the peripheral portions 141A, 241A, 341A and 441A of the uneven portions 141, 241, 341, and 441. Therefore, it is possible to maintain good voltage response characteristics.

Moreover, the convex structure is not limited to being formed based on a black matrix; and may be configured from liquid crystal display device constituent elements, for example, various signal lines or supplementary capacitance electrodes, gate electrodes, source/drain electrodes and various wirings formed on the first substrate 20 or above the first substrate 20. Next, in this case, by optimizing the thickness of the planarizing layer 22, it is possible to form the convex structure on the planarizing layer 22 with influence of the thicknesses of the liquid crystal display device constituent elements.

Embodiment 12

Figure 33:
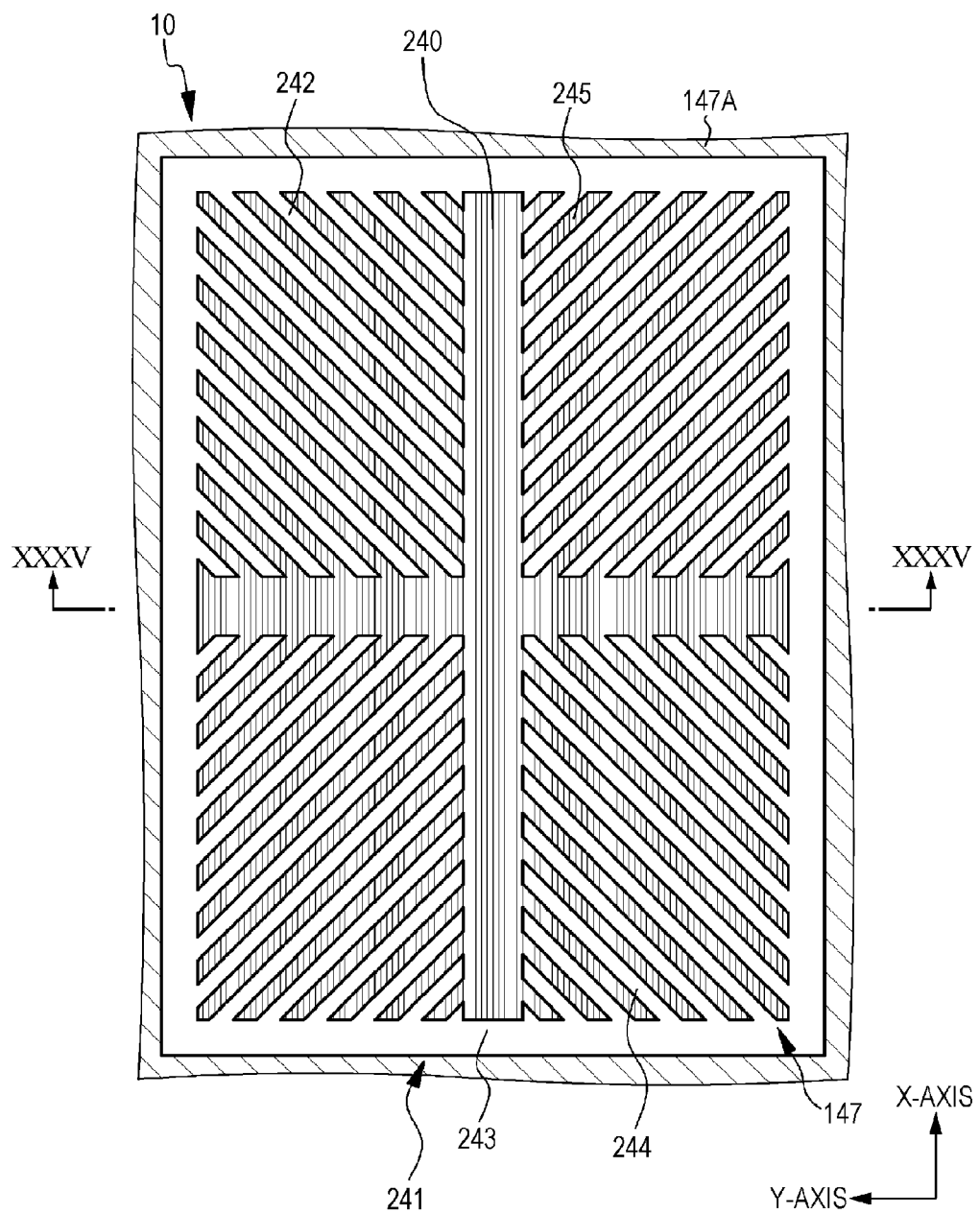
FIG. 33 is a schematic plan view of a single pixel portion of a first electrode configuring the liquid crystal display device of Embodiment 12.
Figure 34:
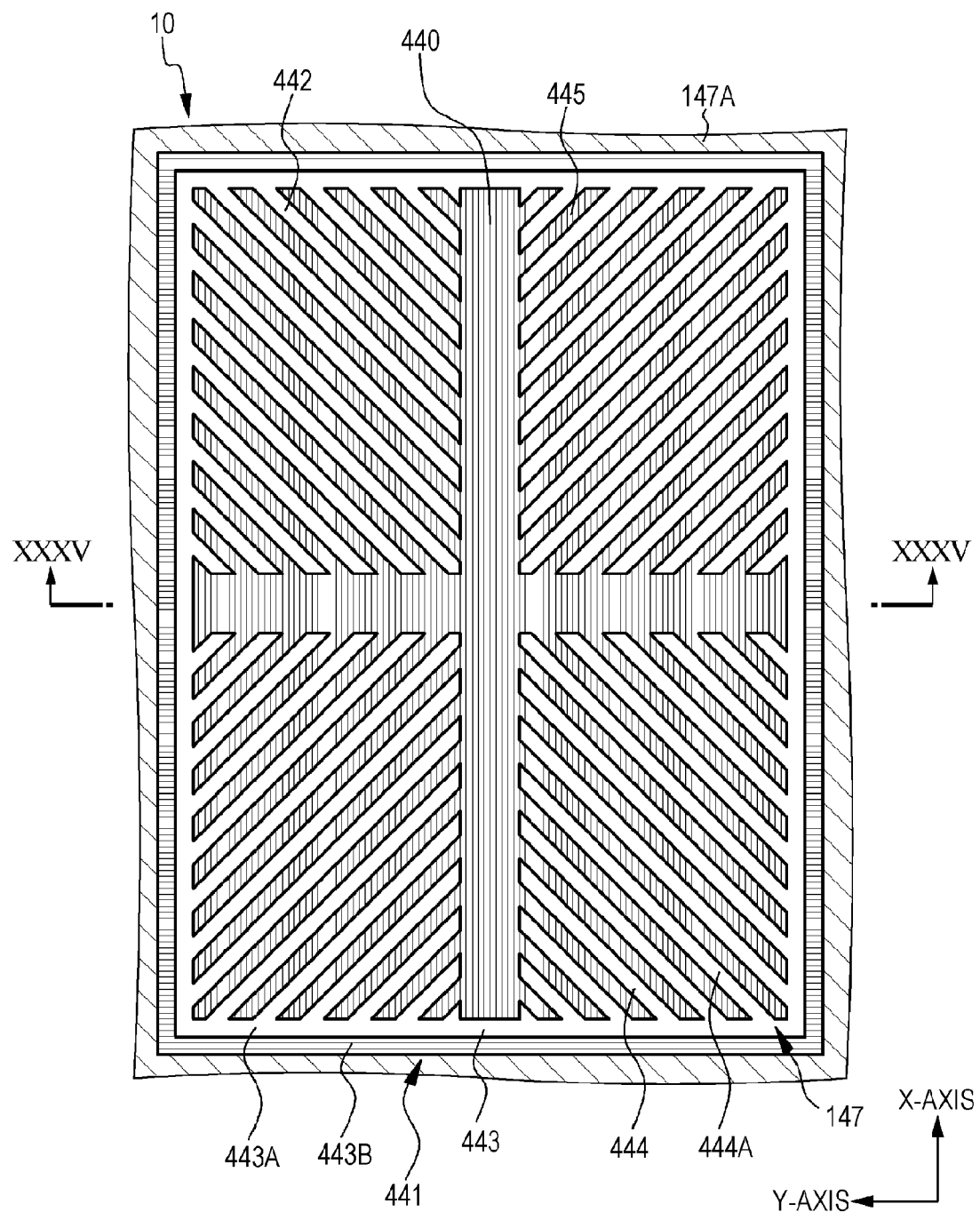
FIG. 34 is a schematic plan view of a single pixel portion of a first electrode configuring the liquid crystal display device of Embodiment 12.
Figure 35A:
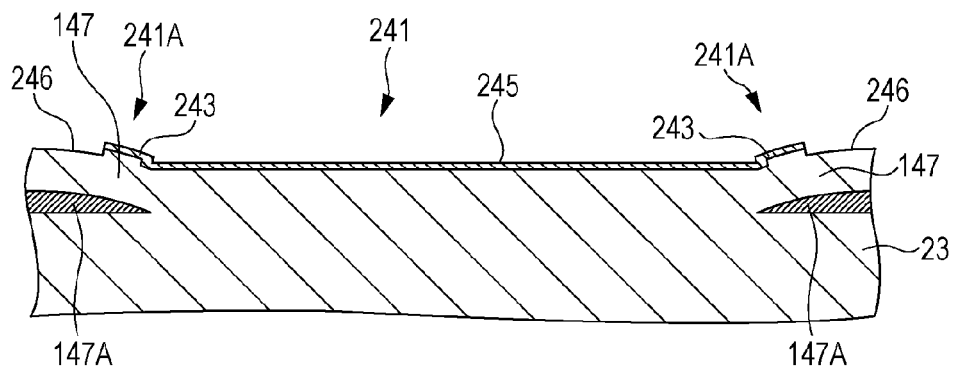
FIGS. 35A and 35B are each schematic partial cross-sectional views of a first electrode in a liquid crystal display device of Embodiment 12 taken along lines XXXVA-XXXVA in FIG. 33 and XXXVA-XXXVA in FIG. 34.
Figure 35B:
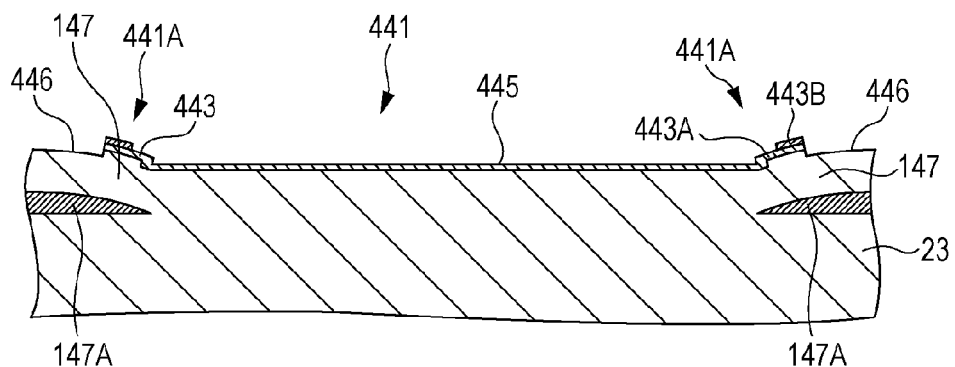

Embodiment 12 is a modification of the liquid crystal display device described in Embodiments 3 and 4, and Embodiments 8 to 10, or relates to a liquid crystal display device according to configuration 4-B of the present disclosure. A schematic plan view of a single pixel portion of the first electrode configuring the liquid crystal display device of Embodiment 12 is shown in FIG. 33; however, the example shown in FIG. 33 is a modification of Embodiment 3. Alternatively, a schematic plan view of a modification example of a single pixel portion of the first electrode configuring the liquid crystal display device of Embodiment 12 is shown in FIG. 34; in the liquid crystal display device (modification of Embodiment 8), a plurality of uneven portions 441 is formed, and a plurality of step-difference portions is formed on the first electrode 440. A schematic partial cross-sectional view of the first electrode along the line XXXVA-XXXVA in FIG. 33 and FIG. 34 is shown in FIG. 35A and FIG. 35B.

In a liquid crystal display device of Embodiment 12, a plurality of uneven portions 241 and 441 is formed on the first electrodes 240 and 440, similar to Embodiment 11, a convex structure 147 is formed from a part of a first substrate positioned between a pixel 10 and a pixel 10 across a part of the first substrate corresponding to the pixel peripheral portion, and the peripheral portions 241A and 441A of the uneven portions 241 and 441 are formed on the convex structure 147.

Above, the present disclosure has been described based on preferable Embodiments; however, the present disclosure is not limited to these embodiments, and various modifications are possible. The planar shape of the branch convex portion is not limited to the V-shape described in the Embodiments, and, for example, may employ a pattern stripe-shaped or ladder shaped or the like, and various patterns in which the branch convex portions extend towards a plurality of directions. In a case in which the branch convex portions are viewed as a whole, the planar shape of the end portions of the branch convex portion may be a straight line or may be a step-shaped. Furthermore, the cross-sectional shape of the end portion of each branch convex portion may be a straight line shape, may be configured from a combination of line segments, or may draw a curve, such as an arc. A black matrix may be formed such that a projection image of a part of the first substrate positioned between pixels and a projection image of the black matrix are overlapped from on the end portion of the uneven portion.

In the Embodiments, a VA mode liquid crystal display device (liquid crystal display element) was described; however, the present disclosure is not necessarily limited thereto, and other display modes, such as an ECB mode (positive liquid crystal mode with horizontal alignment: without twist), an In Plane Switching (IPS) mode, an Fringe Field Switching (FFS) mode or an Optically Compensated Bend (OCB) mode may be also be applied. In this case, the same effects are also obtained. However, in the present disclosure, in the VA mode, a particularly high effect of improving the response characteristics may be exhibited than in the IPS mode or FFS mode, when compared to modes not subjected to the pretilt process. In addition, in the Embodiments, description was made of a transmissive-type liquid crystal display device (liquid crystal display element); however, the present disclosure is not necessarily limited to the transmissive-type, and, for example, a reflective-type may be used. In a case in which the reflective-type is used, the pixel electrodes are formed of an electrode material having light reflectivity, such as aluminum or the like.

Moreover, the present disclosure may take the configurations as below.

1 Liquid Crystal Display Device

A liquid crystal display device includes a plurality of pixels arranged in a matrix, each pixel having:

a first substrate and a second substrate;

a first electrode formed on an opposing face of the first substrate opposing the second substrate;

a first alignment film covering the first electrode and the opposing face of the first substrate;

a second electrode formed on the opposing face of the second substrate opposing the first substrate;

a second alignment film covering the second electrode and the opposing face of the second substrate, and a liquid crystal which is provided between a first alignment film and the second alignment film layer and includes liquid crystal molecules, wherein a pretilt is imparted on the liquid crystal molecules, a plurality of uneven portions is formed on the first electrode, and a width of a portion of a convex portion provided on the first electrode becomes narrower toward the tip portion.

2 Liquid Crystal Display Device—First Configuration

The liquid crystal display device according to 1, in which the uneven portions are configured from trunk convex portions extending through the central portion of the pixel in a cross-shape, and a plurality of branch convex portions extending from the trunk convex portion towards the pixel peripheral portion, the plurality of branch convex portions corresponds to one portion of convex portions provided on the first electrode, and the width of the branch convex portions is widest at the part of the branch convex portion joining the trunk convex portion, and becomes narrower from the part joining the trunk convex portion toward the tip portion.

3 The liquid crystal display device according to 2, in which the width of the branch convex portions becomes narrower in a straight line from the part joining the trunk convex portion towards the tip portion.

4 The liquid crystal display device according to 2 or 3, in which an alignment regulating portion is formed at the part of the second electrode corresponding to the trunk convex portion.

5 Liquid Crystal Display Device—Second Configuration

The liquid crystal display device according to 1, in which the uneven portions are configured of a trunk convex portion formed in a frame-shape at a pixel peripheral portion, and a plurality of branch convex portions extending from the trunk convex portion towards the pixel interior, the plurality of branch convex portions corresponds to one portion of convex portions provided on the first electrode, and the width of the branch convex portions is widest at the part of the branch convex portion joining the trunk convex portion, and becomes narrower from the part joining the trunk convex portion toward the tip portion.

6 The liquid crystal display device according to 5, in which the width of the branch convex portions becomes narrower in a straight line from the part joining the trunk convex portion towards the tip portion.

7 The liquid crystal display device according to 5 or 6, wherein a slit portion or a projection is formed parallel to the pixel peripheral portion passing through the central portion of the pixel, on the first electrode.

8 Liquid Crystal Display Device—Third Configuration

The liquid crystal display device according to 1, wherein a plurality of step-difference portions is formed at the convex portion provided on the first electrode.

9 Liquid Crystal Display Device—Fourth Configuration

A liquid crystal display device according to 1, in which a convex structure is formed from a part of a first substrate positioned between pixels across a part of the first substrate corresponding to a pixel peripheral portion, and a peripheral portion of an uneven portion is formed on the convex structure.

10 Liquid Crystal Display Device—Third Configuration

The liquid crystal display device according to 1, wherein a plurality of step-difference portions is formed at the convex portion provided on the first electrode.

11 Liquid Crystal Display Device—Configuration 3-A

The liquid crystal display device according to 10, in which the uneven portion is configured of a trunk convex portion extending in a cross-shape passing through the central portion of the pixel and a plurality of branch convex portions extending from the trunk convex portion towards the pixel peripheral portion.

12 The liquid crystal display device according to 11, in which the cross-sectional shape of the trunk convex portion when the trunk convex portion is cut along a virtual perpendicular plane orthogonal to the direction in which the trunk convex portion extends has a cross-sectional shape in which the step-difference portions become lower from the center of the cross-sectional shape of the trunk convex portion towards the edge of the cross-sectional shape of the trunk convex portion.

13 The liquid crystal display device according to 11 or 12, in which the cross-sectional shape of the trunk convex portion when the trunk convex portion is cut along a virtual perpendicular plane parallel to the direction in which the trunk convex portion extends has a cross-sectional shape in which the step-difference portions become lower from the central portion of the cross-sectional shape of the trunk convex portion towards the end portion of the cross-sectional shape of the trunk convex portion.

14 The liquid crystal display device according to any one of 11 to 13, in which the cross-sectional shape of the branch convex portions when the branch convex portion is cut along a virtual perpendicular plane orthogonal to the direction in which the branch convex portion extends has a cross-sectional shape in which the step-difference portions become lower from the center of the cross-sectional shape of the branch convex portion towards the edge of the cross-sectional shape of the branch convex portion.

15 The liquid crystal display device according to any one of 11 to 14, in which the cross-sectional shape of the branch convex portions when the branch convex portion is cut along a virtual perpendicular plane parallel to the direction in which the branch convex portions extend has a cross-sectional shape in which the step-difference portions become lower from trunk convex portion side of the cross-sectional shape of the branch convex portion towards the end portion of the cross-sectional shape of the branch convex portion.

16 The liquid crystal display device according to any one of 11 to 15, in which an alignment regulating portion is formed at the part of the second electrode corresponding to the trunk convex portion.

17 Liquid Crystal Display Device—Configuration 3-B

The liquid crystal display device according to 10, in which the uneven portion is configured of a trunk convex portion formed in a frame-shape at the pixel peripheral portion and a plurality of branch convex portions extending from the trunk convex portion towards the pixel interior.

18 The liquid crystal display device according to 17, in which the cross-sectional shape of the trunk convex portion when the trunk convex portion is cut along a virtual perpendicular plane orthogonal to the direction in which the trunk convex portion extends has a cross-sectional shape in which the step-difference portions become lower from the edge of the outside of the cross-sectional shape of the trunk convex portion towards the edge of the inside of the cross-sectional shape of the trunk convex portion.

19 The liquid crystal display device according to 17 or 18, in which the cross-sectional shape of the branch convex portions when the branch convex portion is cut along a virtual perpendicular plane orthogonal to the direction in which the branch convex portions extend has a cross-sectional shape in which the step-difference portions become lower from the center of the cross-sectional shape of the branch convex portion towards the edge of the cross-sectional shape of the branch convex portion.

20 The liquid crystal display device according to any one of 17 to 19, in which the cross-sectional shape of the branch convex portions when the branch convex portion is cut along a virtual perpendicular plane parallel to the direction in which the branch convex portions extend has a cross-sectional shape in which the step-difference portions become lower from trunk convex portion side of the cross-sectional shape of the branch convex portion towards the end portion of the cross-sectional shape of the branch convex portion.

21 The liquid crystal display device according to any one of 17 to 20, in which a slit portion or a projection is formed parallel to the pixel peripheral portion passing through the central portion of the pixel on the first electrode.

22 The liquid crystal display device according to any one of 11 to 21, in which a convex structure is formed of a part of a first substrate positioned between pixels across a part of the first substrate corresponding to a pixel peripheral portion, and a peripheral portion of an uneven portion is formed on the convex structure.

23 Liquid Crystal Display Device—Fourth Configuration

The liquid crystal display device according to 10, in which a convex structure is formed from a part of a first substrate positioned between pixels across a part of the first substrate corresponding to a pixel peripheral portion, and a peripheral portion of an uneven portion is formed on the convex structure.

24 Liquid Crystal Display Device—Configuration 4-A

The liquid crystal display device according to 23, in which the uneven portion is configured from a trunk convex portion extending in a cross-shape passing through the central portion of the pixel and a plurality of branch convex portions extending from the trunk convex portion towards the pixel peripheral portion.

25 The liquid crystal display device according to 24, in which an alignment regulating portion is formed at the part of the second electrode corresponding to the trunk convex portion.

26 Liquid Crystal Display Device—Configuration 4-B

The liquid crystal display device according to 23, in which the uneven portion is configured of a trunk convex portion formed in a frame-shape at the pixel peripheral portion and a plurality of branch convex portions extending from the trunk convex portion towards the pixel interior.

27 The liquid crystal display device according to 26, in which a slit portion or a projection is formed parallel to the pixel peripheral portion passing through the central portion of the pixel, on the first electrode.

28 Method of Manufacturing Liquid Crystal Display Device

A method of manufacturing a liquid crystal display device, the method including forming a first electrode on a first substrate, and forming a first alignment film on an opposite face of the first substrate opposing a second substrate and on the first electrode;

forming a second electrode on the second substrate, and forming a second alignment film on an opposite face of the second substrate opposing the first substrate and on the second electrode;

arranging the first substrate and the second substrate such that the first alignment film and second alignment film are opposed, and sealing a liquid crystal layer between the first alignment film and the second alignment film; and aligning the liquid crystal molecules by applying a predetermined electric field.

29 The method of manufacturing a liquid crystal display device according to 28, in which aligning liquid crystal molecules by applying the predetermined electric field includes aligning the liquid crystal molecules and imparting a pretilt by an alignment control material being reacted while applying a predetermined electric field with respect to a liquid crystal layer including liquid crystal molecules and an alignment control material.

30 The method of manufacturing a liquid crystal display device according to 28, in which aligning the liquid crystal molecules by applying a predetermined electric field includes the liquid crystal molecules being aligned and a pretilt being imparted by the alignment control material being reacted while applying the predetermined electric field with respect to the liquid crystal layer in a state in which an alignment film including the alignment control material is formed on an opposing face of at least one substrate and on an electrode.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display device comprising a plurality of pixels arranged in a matrix, each pixel having:
    a first substrate and a second substrate;
    a first electrode formed on an opposing face of the first substrate opposing the second substrate;
    a first alignment film covering the first electrode and the opposing face of the first substrate;
    a second electrode formed on the opposing face of the second substrate opposing the first substrate;
    a second alignment film covering the second electrode and the opposing face of the second substrate, and
    a liquid crystal layer which is provided between a first alignment film and the second alignment film and includes liquid crystal molecules,
    wherein a pretilt is imparted on the liquid crystal molecules,
    a plurality of uneven portions is formed on the first electrode, and
    a width of a portion of a convex portion provided on the first electrode becomes narrower toward the tip portion.

2. The liquid crystal display device according to claim 1,
    wherein the uneven portions are configured from trunk convex portions extending through the central portion of the pixel in a cross-shape, and a plurality of branch convex portions extending from the trunk convex portion towards the pixel peripheral portion,
    the plurality of branch convex portions corresponds to one portion of convex portions provided on the first electrode, and
    the width of the branch convex portions is widest at the part of the branch convex portion joining the trunk convex portion, and becomes narrower from the part joining the trunk convex portion toward the tip portion.

3. The liquid crystal display device according to claim 2, wherein the width of the branch convex portions becomes narrower in a straight line from the part joining the trunk convex portion towards the tip portion.

4. The liquid crystal display device according to claim 2, wherein an alignment regulating portion is formed at the part of the second electrode corresponding to the trunk convex portion.

5. The liquid crystal display device according to claim 1,
wherein the uneven portions are configured of trunk convex portions formed in a frame-shape at a pixel peripheral portion, and a plurality of branch convex portions extending from the trunk convex portions towards the pixel interior,
the plurality of branch convex portions corresponds to one portion of convex portions provided on the first electrode, and
the width of the branch convex portions is the widest at the part of the branch convex portion joining the trunk convex portion, and becomes narrower from the part joining the trunk convex portion toward the tip portion.

6. The liquid crystal display device according to claim 5, wherein the width of the branch convex portions becomes narrower in a straight line from the part joining the trunk convex portion towards the tip portion.

7. The liquid crystal display device according to claim 5, wherein a slit portion or a projection is formed parallel to the pixel peripheral portion passing through the central portion of the pixel, on the first electrode.

8. The liquid crystal display device according to claim 1, wherein a plurality of step-difference portions is formed at the convex portion provided on the first electrode.

9. A liquid crystal display device according to claim 1, wherein a convex structure is formed from a part of a first substrate positioned between pixels across a part of the first substrate corresponding to a pixel peripheral portion, and
a peripheral portion of the uneven portions is formed on the convex structure.

* * * * *